(12) United States Patent
Bannai et al.

(10) Patent No.: US 7,843,470 B2
(45) Date of Patent: Nov. 30, 2010

(54) SYSTEM, IMAGE PROCESSING APPARATUS, AND INFORMATION PROCESSING METHOD

(75) Inventors: Yuichi Bannai, Koganei (JP); Hiroyuki Yamamoto, Chigasaki (JP); Eiita Ono, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 213 days.

(21) Appl. No.: 11/340,550

(22) Filed: Jan. 27, 2006

(65) Prior Publication Data

US 2006/0170652 A1 Aug. 3, 2006

(30) Foreign Application Priority Data

Jan. 31, 2005 (JP) ............................. 2005-023935
Apr. 8, 2005 (JP) ............................. 2005-112109

(51) Int. Cl.
*G09G 5/14* (2006.01)

(52) U.S. Cl. ..................................................... 345/633

(58) Field of Classification Search ................. 345/632, 345/633
See application file for complete search history.

(56) References Cited

U.S. PATENT DOCUMENTS

| 5,414,439 | A * | 5/1995 | Groves et al. ................... 345/7 |
| 6,694,194 | B2 | 2/2004 | Oda et al. ....................... 700/9 |
| 6,708,142 | B1 | 3/2004 | Baillot et al. ................... 703/2 |
| 6,970,166 | B2 | 11/2005 | Kuroki et al. ............... 345/428 |
| 6,972,734 | B1 | 12/2005 | Ohshima et al. |

(Continued)

FOREIGN PATENT DOCUMENTS

EP 1 213 686 6/2002

(Continued)

OTHER PUBLICATIONS

Istvan Barakonyi, Tamer Fahmy, Dieter Schmalstieg; Remote Collaboration Using Augmented Reality Videoconferencing; May 2004; Source ACM International Conference Proceeding Series; Proceedings of Graphics Interface 2004; vol. 62; pp. 89-96.*

(Continued)

*Primary Examiner*—Jeffery A Brier
(74) *Attorney, Agent, or Firm*—Fitzpatrick, Cella, Harper & Scinto

(57) ABSTRACT

A system includes a first acquisition unit adapted to acquire a first position/orientation of a first viewpoint of a first observer, a first manipulation unit used by the first observer to manipulate a virtual object, and a second manipulation unit used by a second observer to manipulate the virtual object. A generation unit generates an image of the virtual object viewed from the first viewpoint based on the first position/orientation, and generates an image of the second manipulation unit based on a relative position of the second manipulation unit from a second viewpoint position of the second observer, a second acquisition unit acquires an image of a physical space viewed from the first viewpoint, and a combining unit combines the images generated by the generation unit and the image acquired by the second acquisition unit. In addition, an output unit outputs the combined image to a first head mounted display worn by the first observer and a second head mounted display worn by the second observer, with the manipulation results by the first manipulation unit and the second manipulation unit being reflected in the image of the virtual object.

6 Claims, 40 Drawing Sheets

U.S. PATENT DOCUMENTS

| | | | |
|---|---|---|---|
| 2002/0010734 A1* | 1/2002 | Ebersole et al. | 709/201 |
| 2002/0049510 A1 | 4/2002 | Oda et al. | 700/114 |
| 2002/0057280 A1 | 5/2002 | Anabuki et al. | 345/633 |
| 2002/0075286 A1* | 6/2002 | Yonezawa et al. | 345/679 |
| 2003/0032484 A1 | 2/2003 | Ohshima et al. | 463/43 |
| 2004/0109009 A1* | 6/2004 | Yonezawa et al. | 345/632 |
| 2004/0189675 A1* | 9/2004 | Pretlove et al. | 345/633 |
| 2005/0024388 A1* | 2/2005 | Takemoto | 345/633 |
| 2005/0212801 A1 | 9/2005 | Kuroki et al. | 345/428 |

FOREIGN PATENT DOCUMENTS

| | | |
|---|---|---|
| EP | 1 306 809 | 5/2003 |
| JP | 2005-049996 A | 2/2000 |
| JP | 2000-353248 A | 12/2000 |
| JP | 2002-132487 | 5/2002 |
| JP | 2003-279310 | 10/2003 |
| JP | 2004-139231 * | 5/2004 |
| WO | WO 02/073287 | 9/2002 |

OTHER PUBLICATIONS

Mark Billinghurst; Hirokazu Kato; Collaborative Augmented Reality; Jul. 2002; Source Communications of the ACM; Special Issue: How the virtual inspires the real; vol. 45 , Issue 7; pp. 64-70.*

Mark Billinghurst, Hirokazu Kato; Collaborative Mixed Reality; conference held on Mar. 9-11, 1999; In Proceedings of the First International Symposium on Mixed Reality (ISMR'99). Mixed Reality—Merging Real and Virtual Worlds, pp. 261-284.*

Fuhrmann, A. Loffelmann, H. Schmalstieg, D. Gervautz, M.; Collaborative Visualization in Augmented Reality; Jul.-Aug. 1998; Computer Graphics and Applications, IEEE; vol. 18 , Issue: 4; pp. 54-59.*

Homepage of the First International Symposium on Mixed Reality (ISMR'99); conference held on Mar. 9-11, 1999; http://www.ime.cmc.osaka-u.ac.jp/CONFERENCE/ismr/99/; webpage caputered on Mar. 10, 2008.*

Homepage of the International Symposium on Mixed and Augmented Reality (ISMAR); http://www.augmented-reality.org/iwar/; webpage caputered on Mar. 10, 2008.*

W. Barfield, et al., "Fundamentals of Wearable Computers and Augmented Reality", Lawrence Eribaum Associates, pp. 557-563 (2001).

Hirokazu Kato, et al., "A Mixed Reality 3D Conferencing Application", Human Interface Technology Laboratory, HITL-University of Washington, [Online] Aug. 19, 1999, XP-002473407, retrieved from the Internet: URL:http://web.archive.org/web/19990819111552/http://www.hitl.washington.edu/publications/r-99-1/>.

* cited by examiner

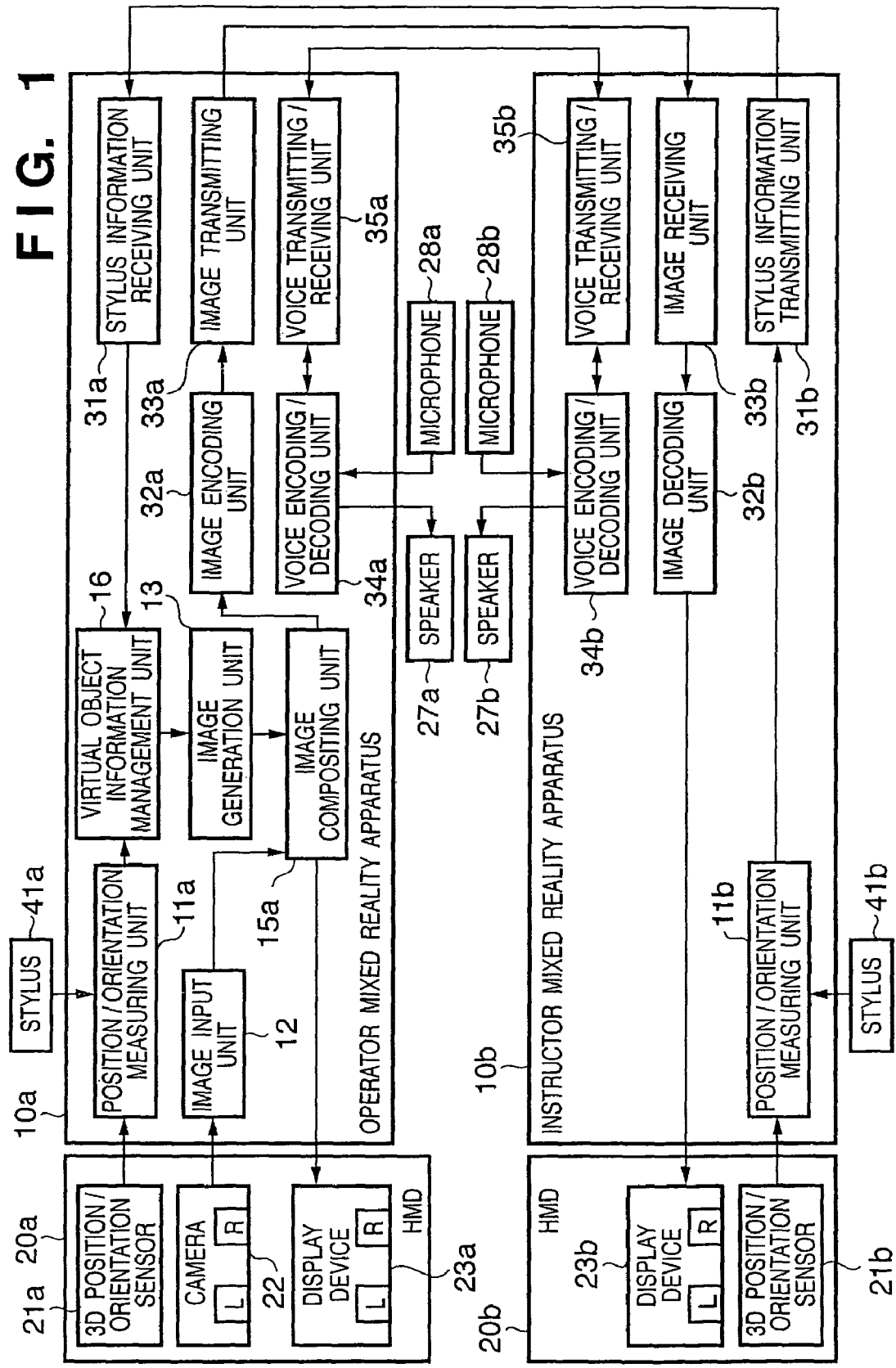

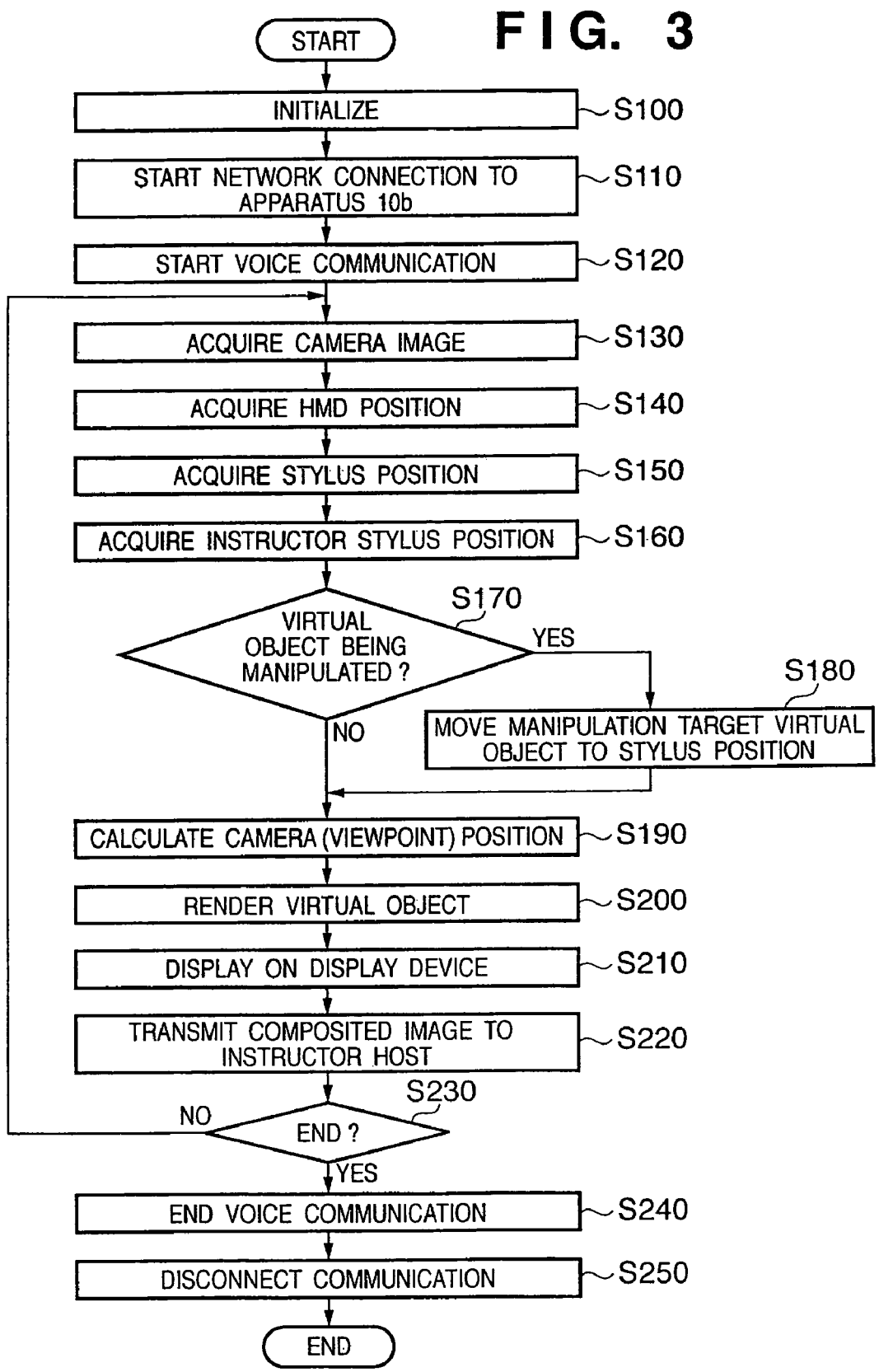

FIG. 11

| OPERATOR MANIPULATION OBJECT ID | null |
|---|---|
| INSTRUCTOR MANIPULATION OBJECT ID | VIRTUAL OBJECT C |

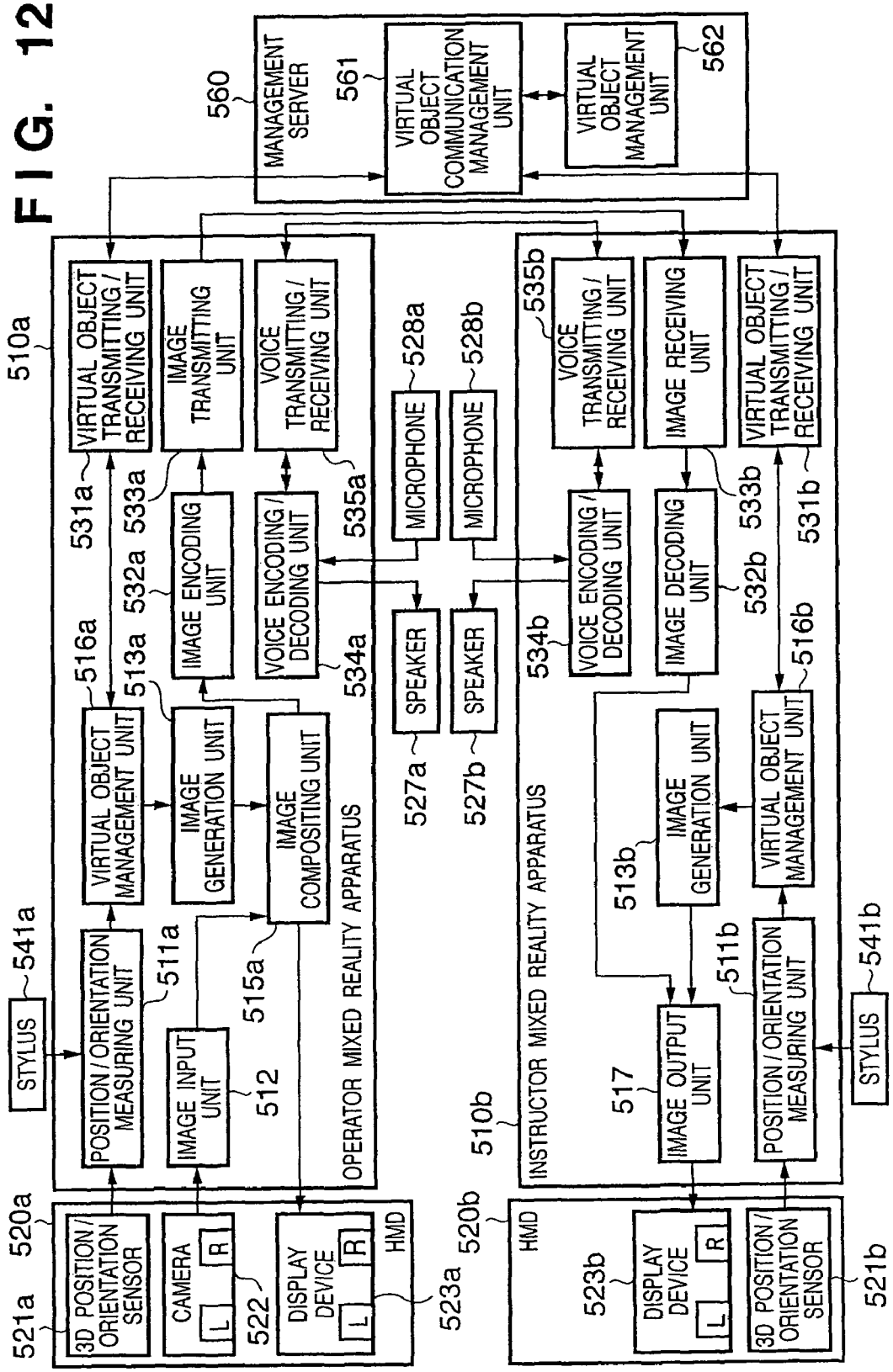

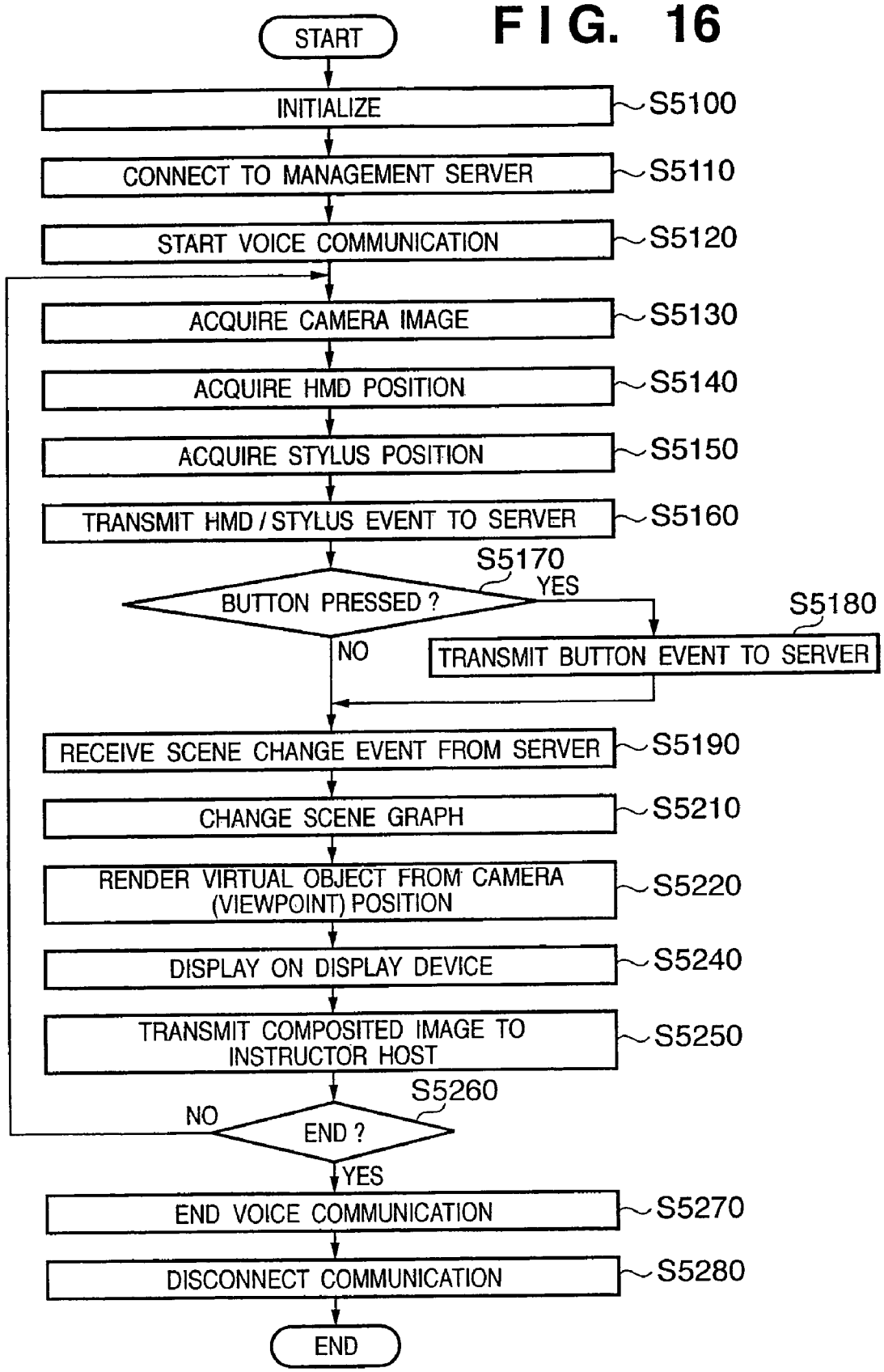

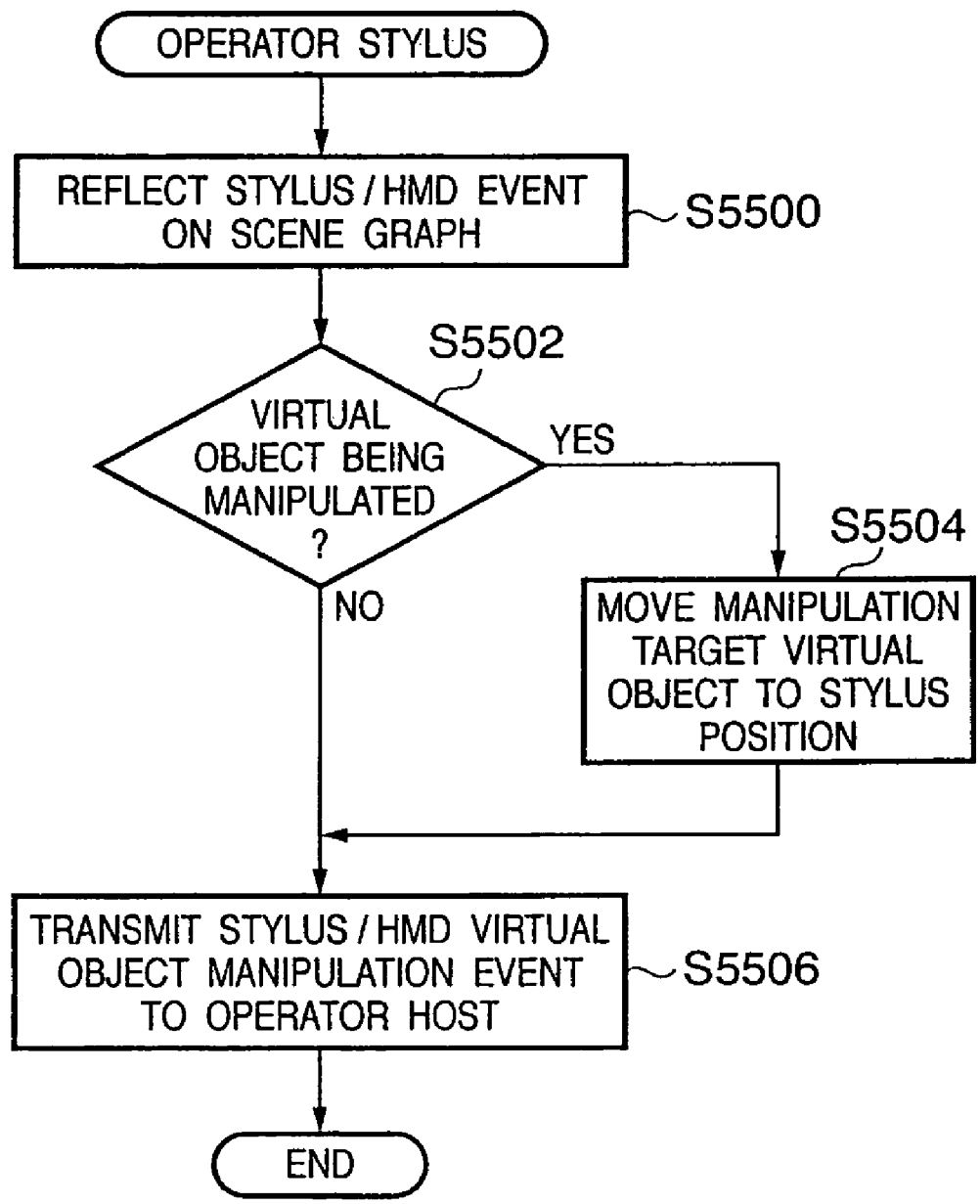

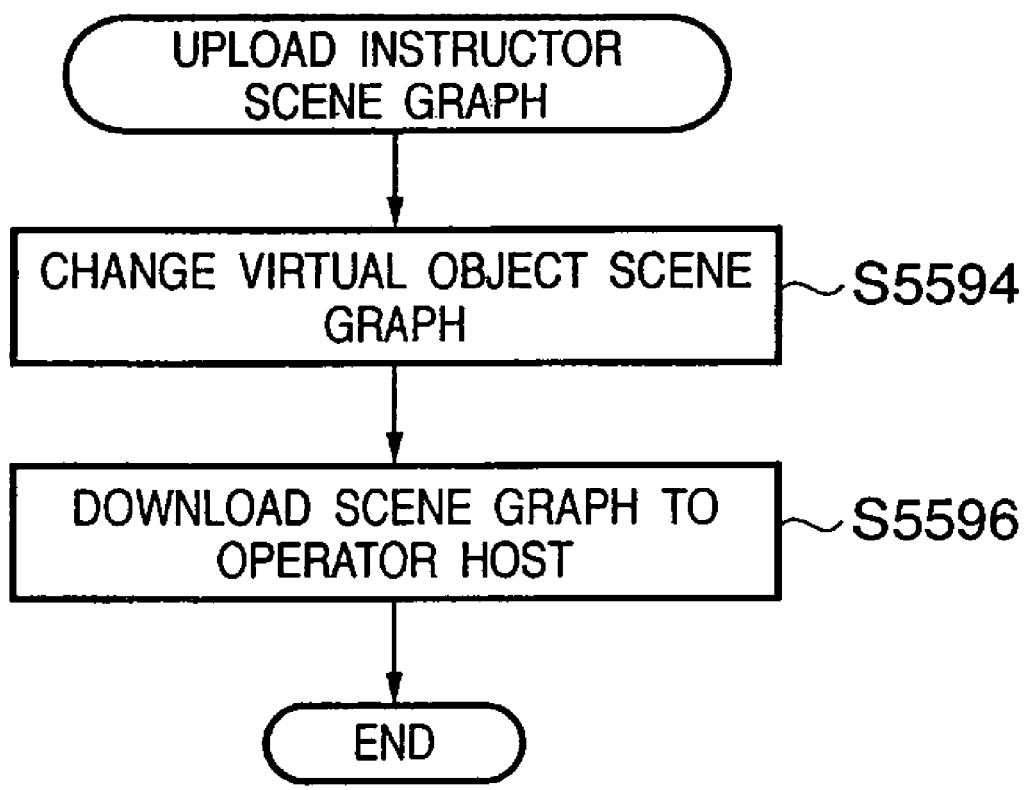

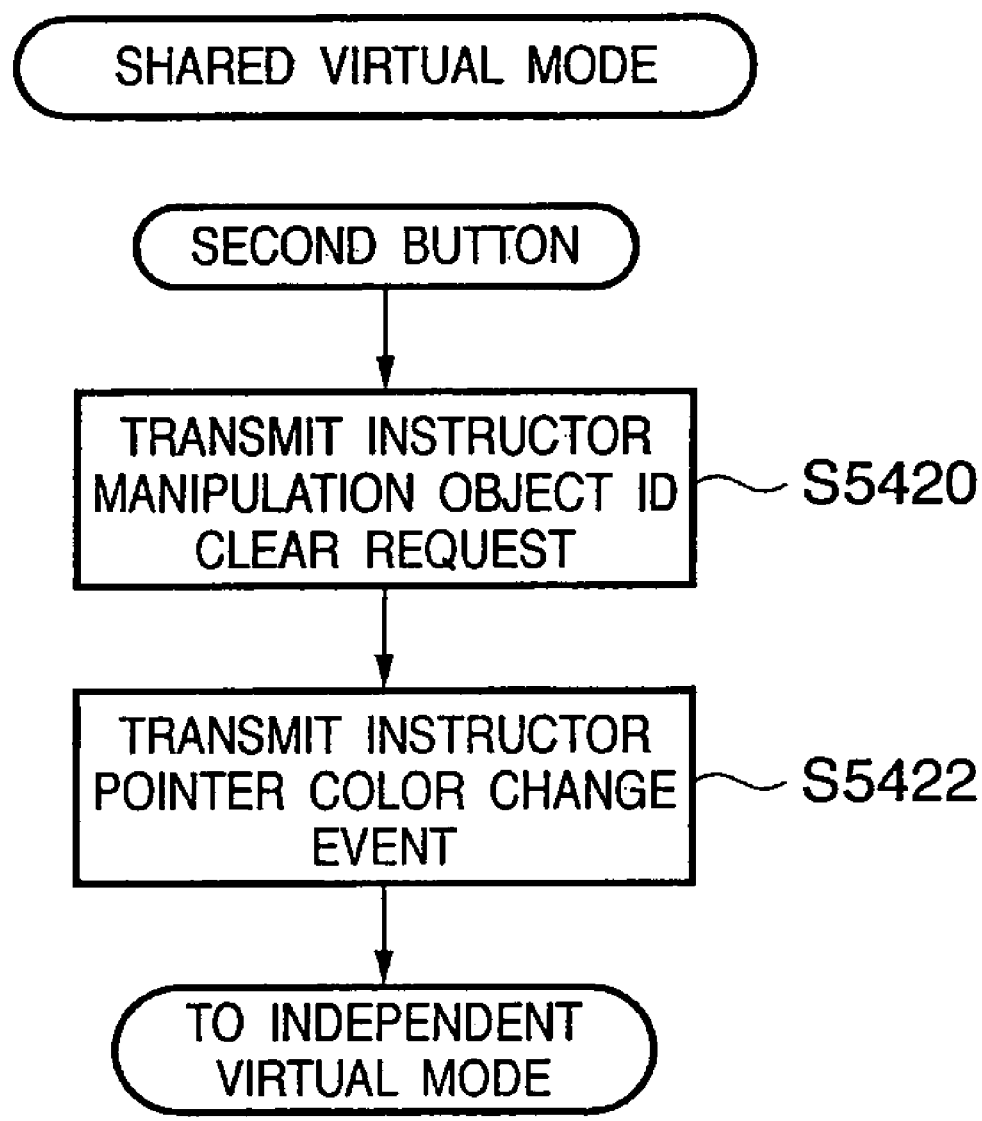

FIG. 23

| OPERATOR MANIPULATION OBJECT ID | null |
|---|---|
| INSTRUCTOR MANIPULATION OBJECT ID | VIRTUAL OBJECT C |

SYSTEM, IMAGE PROCESSING APPARATUS, AND INFORMATION PROCESSING METHOD

FIELD OF THE INVENTION

The present invention relates to a technique of providing an image of a mixed reality space formed by compositing a physical space and a virtual space.

BACKGROUND OF THE INVENTION

In recent years, technology development related to mixed reality (MR) is flourishing for the purpose of seamless merging between a physical world and a virtual world. MR has received a great deal of attention as a technique of reinforcing VR for the sake of coexistence of a physical world and a virtual reality (VR) world which can be experienced conventionally only in a situation separated from the physical space.

A typical device to implement mixed reality is a HMD (Head Mounted Display). This device implements mixed reality by compositing the physical space and virtual space and displaying them on the HMD.

In a system for supporting conferences or various cooperative operations between participants in remote sites by using VR, a world separated from the physical world is built in a computer and shared, as described above. On the other hand, a remote control system based on MR can support operations in a work space formed by superimposing a virtual world on the physical world.

An example of a remote control technique using a HMD is Japanese Patent Laid-Open No. 2002-132487 (US-2002-0049510). In the technique disclosed in this prior art, an operator wears a HMD with a camera. The operator and an instructor in a remote site share an image from the camera. An instruction of the instructor is superimposed on the camera image to instruct an operation. In this technique, the operator's camera is a stereo camera so that he/she and the instructor can observe the same 3D image. A hand of the instructor pointing to the operation target in the image can be extracted by chromakey composition and composited with the image from the camera. In this system, no coordinates are set in the operator space. For this reason, any virtual object except the operation target can be neither laid out at an arbitrary position of the operator space nor pointed to cause interaction. Additionally, if the viewpoint position of the operator moves, the image of the hand also moves even when the instructor does not move his/her hand.

Another example of a technique of giving an instruction from a remote site to an operator who wears an optical see-through HMD with a camera, like the above-described known technique, is Block Party (Edited by W. Barfield and T. Caudell, "Fundamentals of Wearable Computers & Augmented Reality", pp. 557-563 Lawrence Erlbaum Associates, Publishers, (2001)). Block party has a function of superimposing a CG image on a work space that the operator sees through the optical see-through HMD. The instructor grasps the progress of operation on the basis of images from the camera on the operator's head and supports the operation while manipulating the CG of the 3D model of the operation target. In this system, the camera image of the operator is not stereoscopic. No CG image is superimposed, either. The instructor sees the camera image displayed on the monitor screen of a desktop and manipulates the CG by using a 3D graphics editor. For this reason, he/she can hardly perceive the operator space as a seamless space and has no means for three-dimensionally pointing the camera image of the operator. In addition, the operator has no function of pointing or manipulating the CG.

In a system disclosed in U.S. Pat. No. 6,708,142, participants are sensed by stereo cameras, and the stereoscopic images are transmitted to other participants in remote sites so that the participants who wear HMDs can observe and manipulate a 3D image together with a virtual object shared between them. In this example, a participant is sensed by two stereo cameras, and the plurality of remaining participants can observe the 3D image. Since the position of the operator and the position of the hand to manipulate the virtual object are measured, manipulation of the virtual object is possible. However, the stereoscopic image observed by the participants includes the image of the participants without the background and the image of the VR space by the virtual object and has no information of the real space of the participants.

SUMMARY OF THE INVENTION

As described above, since the viewpoint of the instructor is restricted by the viewpoint of the operator in the prior arts, any operation instruction cannot be given smoothly.

The present invention has been made in consideration of the above-described problems, and has as its object to make it possible to transmit an image observed by an operator to an instructor in a remote site and cause the instructor to seamlessly perceive the operator space and give a three-dimensional operation instruction while observing the image.

It is another object of the present invention to provide a technique of transmitting, to an instructor in a remote site, a HMD image observed by an operator in an operator mixed reality space where a real object and a virtual object are registered, and causing the operator and instructor to seamlessly point the real object and virtual object as the operation targets in the operator mixed reality space while observing the HMD image.

It is still another object of the present invention to solve the above-described problems by preparing a mode to make the instructor viewpoint free from the operator viewpoint and allowing to give an operation instruction smoothly.

In order to achieve an object of the present invention, for example, a system of the present invention comprises the following arrangement.

That is, a system characterized by comprising:

first acquisition unit adapted to acquire a position/orientation of a viewpoint of a first observer;

generation unit adapted to generate an image of a virtual space viewed from the viewpoint having the position/orientation acquired by the first acquisition unit;

first manipulation unit used by the first observer to manipulate a virtual object;

second manipulation unit used by a second observer to manipulate the virtual object, the second observer remote-controlling the manipulation of the virtual object by the first observer;

second acquisition unit adapted to acquire an image of a physical space viewed from the viewpoint; and output unit adapted to output an image formed by superimposing the image generated by the generation unit on the image acquired by the second acquisition unit to a head mounted display worn by the first observer and a head mounted display worn by the second observer, wherein the generation unit generates the image of the virtual space on which manipulation results by the first manipulation unit and the second manipulation unit are reflected.

In order to achieve an object of the present invention, for example, an image processing apparatus of the present invention comprises the following arrangement.

That is, an image processing apparatus characterized by comprising:

first acquisition unit adapted to acquire a position/orientation of a viewpoint of a first observer;

generation unit adapted to generate an image of a virtual space viewed from the viewpoint having the position/orientation acquired by the first acquisition unit;

second acquisition unit adapted to acquire an image of a physical space viewed from the viewpoint; and output unit adapted to output an image formed by superimposing the image generated by the generation unit on the image acquired by the second acquisition unit to a head mounted display worn by the first observer and a head mounted display worn by a second observer who remote-controls manipulation of the virtual object by the first observer;

wherein the generation unit generates the image of the virtual space on which manipulation results by first manipulation unit used by the first observer to manipulate the virtual object and the second manipulation unit used by the second observer to manipulate the virtual object are reflected.

In order to achieve an object of the present invention, for example, an image processing method of the present invention comprises the following arrangement That is, an information processing method of generating a 3D composited image by compositing a physical image and a virtual image representing a virtual object, characterized by comprising:

acquiring a right physical image and a-left physical image from a viewpoint of a first observer;

acquiring a position/orientation of the viewpoint of the first observer;

acquiring a position/orientation of a first pointing unit used by the first observer to manipulate a virtual object;

acquiring a position/orientation of a second pointing unit used by a second observer to manipulate the virtual object;

controlling information of the virtual object on the basis of one of the position/orientation of the first pointing unit and the position/orientation of the second pointing unit;

generating a right virtual image and a left virtual image corresponding to the position/orientation of the viewpoint of the first observer on the basis of the controlled information of the virtual object;

generating a right composited image and a left composited image by compositing the physical images and the virtual images; and presenting the composited image to the first observer and the second observer.

In order to achieve an object of the present invention, for example, an information processing method of the present invention comprises the following arrangement.

That is, an information processing method of causing a second user to share a mixed reality space image in which a virtual object is superimposed on a space where a first user exists, characterized by comprising:

a mixed reality space image acquisition step of acquiring a mixed reality space image based on an image of a first image sensing unit worn by the first user and a virtual object image based on a position/orientation of the first image sensing unit;

an event information acquisition step of acquiring event information by the first user for the virtual object;

a second user viewpoint position/orientation information acquisition step of acquiring viewpoint position/orientation information of the second user; and a generation step of generating a virtual object image corresponding to the event information on the basis of the viewpoint position/orientation information of the second user, wherein the method has a first mode to present a first image to the second user and a second mode to present the virtual object image to the second user.

In order to achieve an object of the present invention, for example, an information processing system of the present invention comprises the following arrangement.

That is, an information processing system for sharing, from a remote site, an operator mixed reality space in which a virtual object is superimposed on a space where an operator exists, characterized by comprising:

stereoscopic image transmitting unit adapted to transmit a stereoscopic image of the operator mixed reality space from a viewpoint of the operator to an instructor;

virtual object sharing means for causing the operator and the instructor to share the virtual object: and stereoscopic means for presenting the stereoscopic image to the operator and the instructor, wherein the system has a mode to cause the instructor to share the stereoscopic image from the operator viewpoint and a mode to allow the instructor to manipulate the virtual object from a viewpoint separated from the operator viewpoint.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a block diagram showing the functional configuration of a system according to the first embodiment of the present invention;

FIG. 3 is a flowchart of processing executed by an operator mixed reality apparatus 10a;

FIG. 11 is a view showing a structure example of a table which registers piece of information representing whether the operator or instructor is manipulating a virtual object, and if so, which virtual object is being manipulated;

FIG. 12 is a block diagram showing the functional configuration of a mixed reality remote control system according to the fifth embodiment;

FIG. 16 is a flowchart of operator processing of an operator mixed reality apparatus according to the fifth embodiment;

FIGS. 19A to 19H are flowcharts of reception event processing of a management server according to the fifth embodiment;

FIGS. 20A to 20D are flowcharts of part of instructor processing of an instructor mixed reality apparatus and reception event processing of a management server according to the sixth embodiment;

FIG. 23 is a view showing an example of an operator/instructor manipulation object ID table.

DETAILED DESCRIPTION OF THE PREFERRED EMBODIMENTS

Figure 2A:
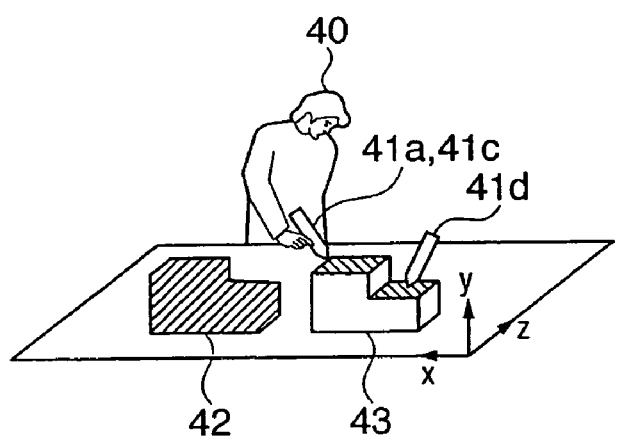
FIG. 2A is a view showing a space where an operator is doing an operation by manipulating a virtual object.

Preferred embodiments of the present invention will now be described in detail in accordance with the accompanying drawings.

First Embodiment

<System Configuration>

FIG. 1 is a block diagram showing the functional configuration of a system according to this embodiment of the present invention. As shown in FIG. 1, the system according to this embodiment includes an operator mixed reality apparatus 10a on the upper side of FIG. 1 and an instructor mixed reality apparatus 10b shown on the lower side of FIG. 1. These apparatuses can communicate data to each other through a network such as the Internet or a LAN. The network can be either wired or wireless.

Head mounted displays (to be referred to as HMDs hereinafter) 20a and 20b are connected to the apparatuses 10a and 10b, respectively. An operator wears the HMD 20a, and an instructor wears the HMD 20b. Speakers 27a and 27b and microphones 28a and 28b are connected to the apparatuses 10a and 10b, respectively, so that the operator and instructor can communicate by voice.

Styluses 41a and 41b are connected to the apparatuses 10a and 10b, respectively. Manipulation of a virtual object (to be described later) is done by the operator using the stylus 41a or the instructor using the stylus 41b. Each stylus has buttons and a magnetic sensor (not shown) to measure a magnetic change corresponding to the position/orientation of the stylus in a world coordinate system (a coordinate system having the origin at a point in the physical space and three axes, i.e., x-, y-, and z-axes perpendicularly crossing each other at the origin). A signal which instructs to press or cancel press of a button or a measurement result (signal) is input to the operator mixed reality apparatus 10a (instructor mixed reality apparatus 10b).

The operator HMD 20a will be described next. The operator HMD 20a comprises a 3D position/orientation sensor 21a, camera 22, and display device 23a.

The 3D position/orientation sensor 21a is a magnetic sensor which measures a magnetic change corresponding to the position/orientation of the sensor in the world coordinate system by a known measurement technique. The measurement result (signal) is input to the operator mixed reality apparatus 10a.

In this embodiment, the camera 22 is a stereo camera. In FIG. 1, L represents the left camera, and R represents the right camera. Images sensed by the left and right cameras are input to the operator mixed reality apparatus 10a.

The display device 23a displays a stereoscopic image. In FIG. 1, L represents the left display device, and R represents the right display device. Images to be displayed on the left and right display devices are output from the operator mixed reality apparatus 10a.

The position/orientation relationship between the 3D position/orientation sensor 21a and the camera 22 is fixed. The fixed position/orientation relationship is measured in advance and held as bias data on the side of the operator mixed reality apparatus 10a. More specifically, the bias data contains bias data representing the position/orientation relationship between the left camera and the 3D position/orientation sensor 21a and bias data representing the position/orientation relationship between the right camera and the 3D position/orientation sensor 21a.

The operator mixed reality apparatus 10a will be described next. The operator mixed reality apparatus 10a comprises a position/orientation measuring unit 11a, image input unit 12, image generation unit 13, image compositing unit 15a, virtual object information management unit 16, stylus information receiving unit 31a, image encoding unit 32a, image transmitting unit 33a, voice encoding/decoding unit 34a, and voice transmitting/receiving unit 35a.

The position/orientation measuring unit 11a receives a signal output from the 3D position/orientation sensor 21a and a signal output from the stylus 41a, A/D-converts the signals, and outputs them to the virtual object information management unit 16 as data (data representing the position/orientation of the 3D position/orientation sensor 21a in the world coordinate system, data representing the position/orientation of the stylus 41a in the world coordinate system, and data representing press of a button provided on the stylus 41a).

Stylus information (information about the stylus 41b) output from the instructor mixed reality apparatus 10b is input to the virtual object information management unit 16 through the stylus information receiving unit 31a.

Hence, the virtual object information management unit 16 outputs, to the image generation unit 13, the data received from the position/orientation measuring unit 11a and the stylus information received from the instructor mixed reality apparatus 10b through the stylus information receiving unit 31a.

The virtual object information management unit 16 also manages the floor control(manipulation right) for each virtual object (to be described later).

The image generation unit 13 generates an image of a virtual space viewed from the operator viewpoint (right camera and left camera) by using the bias data and the "data representing the position/orientation of the 3D position/orientation sensor 21a in the world coordinate system" input from the position/orientation measuring unit 11a. That is, the image generation unit 13 generates an image of the virtual space viewed from the right camera and an image of the virtual space viewed from the left camera. Processing of generating an image of a virtual space viewed from a viewpoint with a predetermined position/orientation is a known technique, and a description thereof will be omitted here.

At least one virtual object is present in the virtual space. Each virtual object can be manipulated by using the stylus 41a or 41b, as will be described later in detail. If one of virtual objects is manipulated by the stylus 41a or 41b, the image generation unit 13 reflects the manipulation result on the manipulated virtual object.

A "pointer representing the stylus 41b" is arranged in the virtual space. This pointer will be described later.

The image generation unit 13 generates the image of the virtual space and outputs it to the image compositing unit 15a.

The image compositing unit 15a generates a "mixed reality space image viewed from the right camera (right mixed reality space image)" by superimposing the "virtual space image viewed from the right camera" input from the image generation unit 13 on a "physical space image sensed by the right camera" input through the image input unit 12. The image compositing unit 15a also generates a "mixed reality space image viewed from the left camera (left mixed reality space image)" by superimposing the "virtual space image viewed from the left camera" input from the image generation unit 13 on a "physical space image sensed by the left camera" input through the image input unit 12.

The generated left mixed reality space image is output to the left display device of the display device 23a. The right mixed reality space image is output to the right display device of the display device 23a. Hence, the mixed reality space image viewed from the left camera is displayed on the left display device, and the mixed reality space image viewed from the right camera is displayed on the right display device.

The images (left mixed reality space image and right-mixed reality space image) are compression-coded by the image encoding unit 32a and transmitted from the image transmitting unit 33a to the instructor mixed reality apparatus 10b. Although the compression-coding method is not particularly limited, a method corresponding to the decoding method of an image decoding unit 32b provided on the side of the instructor mixed reality apparatus 10b must be used.

The voice encoding/decoding unit 34a receives an operator's voice signal input through the microphone 28a and compression-codes the signal to transmit it to the side of the instructor mixed reality apparatus 10b. The voice transmitting/receiving unit 35a transmits the voice signal to the instructor mixed reality apparatus 10b. An instructor's voice signal is also compression-coded and transmitted from the side of the instructor mixed reality apparatus 10b. The voice transmitting/receiving unit 35a receives the voice signal and inputs it to the voice encoding/decoding unit 34a. The voice encoding/decoding unit 34a decodes the signal and outputs it to the speaker 27a as a voice signal.

When the operator inputs voice of his/her own to the microphone 28a, the input voice can be transmitted to the side of the instructor mixed reality apparatus 10b. The operator can hear instructor's voice through the speaker 27a. Hence, the operator and instructor can talk to each other.

The instructor HMD 20b will be described next. The instructor HMD 20b comprises a 3D position/orientation sensor 21b and display device 23b, which are the same as the 3D position/orientation sensor 21a and display device 23a provided in the operator HMD 20a, respectively. That is, the instructor HMD 20b has no camera to sense the physical space.

The instructor mixed reality apparatus 10b will be described next. The instructor mixed reality apparatus 10b comprises a voice encoding/decoding unit 34b, voice transmitting/receiving unit 35b, image decoding unit 32b, image receiving unit 33b, position/orientation measuring unit 11b, and stylus information transmitting unit 31b.

The position/orientation measuring unit 11b executes the same operation as that of the position/orientation measuring unit 11a on the side of the operator mixed reality apparatus 10a. That is, the position/orientation measuring unit 11b receives a signal from the 3D position/orientation sensor 21b and a signal from the magnetic sensor provided in the stylus 41b and acquires these signals as "data representing the position/orientation of the 3D position/orientation sensor 21b in the world coordinate system" and "data representing the position/orientation of the stylus 41b in the world coordinate system". By using these data, the "position/orientation relationship between the 3D position/orientation sensor 21b and the stylus 41b" is obtained. The position/orientation measuring unit 11b also receives, from the stylus 41b, a signal representing whether a button provided on the stylus 41b is pressed and acquires the signal as data.

The stylus information transmitting unit 31b outputs, to the stylus information receiving unit 31a on the side of the operator mixed reality apparatus 10a, stylus information containing a set of the "data representing whether a button provided on the stylus 41b is pressed" and the "position/orientation relationship between the 3D position/orientation sensor 21b and the stylus 41b".

The voice encoding/decoding unit 34b is the same as the voice encoding/decoding unit 34a on the side of the operator mixed reality apparatus 10a. The voice encoding/decoding unit 34b receives an instructor's voice signal input through the microphone 28b and compression-codes the signal to transmit it to the side of the operator mixed reality apparatus 10a. The voice transmitting/receiving unit 35b transmits the voice signal to the operator mixed reality apparatus 10a. An operator's voice signal is also compression-coded and transmitted from the side of the operator mixed reality apparatus 10a. The voice transmitting/receiving unit 35b receives the voice signal and inputs it to the voice encoding/decoding unit 34b. The voice encoding/decoding unit 34b decodes the signal and outputs it to the speaker 27b as a voice signal.

When the instructor inputs voice of his/her own to the microphone 28b, the input voice can be transmitted to the side of the operator mixed reality apparatus 10a. The instructor can hear operator's voice through the speaker 27b. Hence, the operator and instructor can talk to each other.

The image receiving unit 33b receives the compression-coded left mixed reality space image and right mixed reality space image which are transmitted from the image transmitting unit 33a on the side of the operator mixed reality apparatus 10a. The image decoding unit 32b decodes the data to the left mixed reality space image and right mixed reality space image. The left mixed reality space image is output to the left display device of the display device 23b. The right mixed reality space image is output to the right display device of the display device 23b.

Hence, the instructor sees, through the HMD 20b, the same image as that seen by the operator.

<Environment>

The environment of spaces where the operator and instructor exist will be described next. FIG. 2A is a view showing a space where an operator is doing an operation by manipulating a virtual object. In this space, an operator 40 who holds the stylus 41a in the hand is manipulating a virtual object 43. The operator 40 has the HMD 20a on the head and can see the virtual object 43 in front of him/her through the HMD 20a. Referring to FIG. 2A, reference number 42 denotes a physical object. The virtual object 43 simulates the physical object 42.

As shown in FIG. 2A, a world coordinate system is set in this space. The world coordinate system has the origin at a predetermined point and three axes, i.e., x-, y-, and z-axes perpendicularly crossing each other at the origin. Any point in this space can be expressed by coordinate values in the world coordinate system. Hence, the position of the virtual object 43 can be expressed by coordinate values in the world coordinate system. The position or orientation of the virtual object 43 can be changed by the stylus 41a. The virtual object manipulation method using the stylus 41a will be described later. A pointer 41c is a virtual object which indicates the position of the stylus 41a. The pointer 41c is displayed while being superimposed on the stylus 41a as a real object.

The virtual object 43 can be manipulated not only by the operator but also by the instructor. The instructor can manipulate the virtual object 43 in a similar manner by operating the stylus 41b. A pointer 41d in FIG. 2A is a virtual object which indicates the position of the stylus 41b. This will be described with reference to FIG. 2B.

Figure 2B:
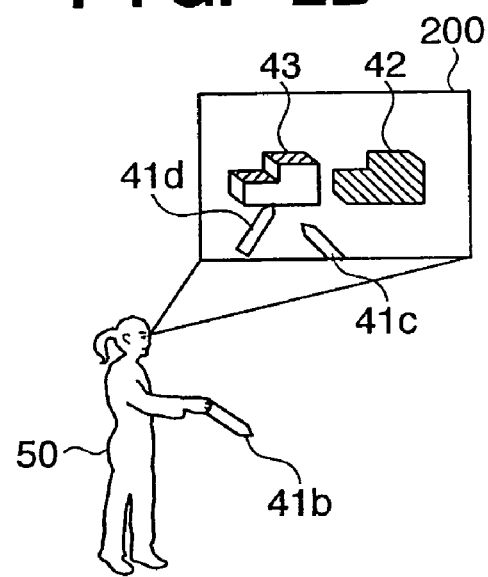
FIG. 2B is a view showing a space where an instructor exists.

FIG. 2B is a view showing a space where an instructor exists. The instructor manipulates the virtual object 43 from a remote site. An instructor 50 holds the stylus 41b in the hand and manipulates the virtual object 43 by using it.

The instructor 50 has the HMD 20b on the head. As described above, the same image as that displayed on the display device 23a of the HMD 20a is displayed on the display device 23b of the HMD 20b. An image 200 is displayed on the display devices 23a and 23b. The image 200 shows the mixed reality space viewed from the viewpoint of the operator, i.e., the physical object 42, virtual object 43, stylus 41a, and pointer 41d.

When the instructor 50 changes the position/orientation of the stylus 41b, the position/orientation relationship between the stylus 41b and the viewpoint of the instructor 50 is changed. Hence, the layout position/orientation of the pointer 41d in the space shown in FIG. 2A is determined such that the relative position/orientation relationship between the stylus 41b and the viewpoint of the instructor 50 equals the position/orientation relationship based on the viewpoint of the operator 40.

Since the operator 40 and instructor 50 share the viewpoint, each of them can show an image manipulated in the mixed reality space viewed from his/her viewpoint to the partner from the same viewpoint.

<Virtual Object Manipulation Method>

As described above, the virtual object can be manipulated by the styluses held in the hands of the operator and instructor. For example, the point of the stylus is moved and brought into contact with a virtual object to be manipulated. In this state, a button provided on the stylus is pressed to set a virtual object holding mode. When the position or orientation of the stylus is changed then, the position or orientation of the virtual object to be manipulated also changes in response to it (e.g., the virtual object to be manipulated is laid out in the position/orientation of the stylus). When the button provided on the stylus is pressed during the virtual object holding mode, the virtual object holding mode is canceled. After that, the position/orientation of the virtual object does not change even if the position/orientation of the stylus is changed.

<Processing Executed by Operator Mixed Reality Apparatus 10a>

Processing executed by the operator mixed reality apparatus 10a will be described next with reference to the flowchart shown in FIG. 3.

First, the apparatus is initialized (step S100). In this initialization, a table (to be described later) managed by the virtual object information management unit 16 is initialized, and virtual objects are laid out in the virtual space.

Network connection to the instructor mixed reality apparatus 10b is started to enable data communication (step S110).

Voice communication with the instructor mixed reality apparatus 10b is started to enable voice signal communication (step S120).

A physical space image for the left eye and a physical space image for the right eye are sensed by the camera 22 (left camera and right camera). The image input unit 12 receives the two captured images and outputs them to the image compositing unit 15a of the succeeding stage (step S130). The image compositing unit 15a separately holds the physical space image for the left eye and that for the right eye.

The 3D position/orientation sensor 21a measures a magnetic change corresponding to the position/orientation of the sensor in the world coordinate system and outputs a signal representing the measurement result to the position/orientation measuring unit 11a. The position/orientation measuring unit 11a acquires the signal as data (step S140). As described above, this data represents the position/orientation of the 3D position/orientation sensor 21a in the world coordinate system. This data contains a set of six parameters (x, y, z, $\alpha$, $\beta$, $\gamma$). In this case, $\alpha$ is the rotation angle about the x-axis, $\beta$ is the rotation angle about the y-axis, and $\gamma$ is the rotation angle about the z-axis.

The magnetic sensor provided on the stylus 41a measures a magnetic change corresponding to the position/orientation of the sensor in the world coordinate system and outputs a signal representing the measurement result to the position/orientation measuring unit 11a. The position/orientation measuring unit 11a acquires the signal as data (step S150). This data also contains the above-described set of six parameters.

The data acquired by the position/orientation measuring unit 11a in steps S140 and S150 are output to the virtual object information management unit 16.

The stylus information receiving unit 31a receives stylus information transmitted from the instructor mixed reality apparatus 10b. The virtual object information management unit 16 acquires "data representing the position/orientation relationship between the 3D position/orientation sensor 21b and the stylus 41b used by the instructor" in the stylus information (step S160).

The virtual object information management unit 16 determines whether the operator is manipulating the virtual object, i.e., whether the virtual object holding mode is set (step S170). If YES in step S170, the processing advances to step S180 through step S170. If NO in step S170, the processing advances to step S190 through step S170.

Whether the virtual object holding mode is set is determined by looking up a table shown in FIG. 11. FIG. 11 is a view showing a structure example of a table which registers piece of information representing whether the operator or instructor is manipulating a virtual object, and if so, which virtual object is being manipulated. The operator manipulation object ID in the table shown in FIG. 11 indicates a code unique to the virtual object which is being manipulated by the operator. In FIG. 11, the operator manipulation object ID is "null". That is, the operator is not manipulating any virtual object now. On the other hand, the instructor manipulation object ID indicates a code unique to the virtual object which is being manipulated by the instructor. In FIG. 11, the instructor manipulation object ID is "virtual object C". That is, the instructor is currently manipulating the virtual object C.

By looking up the table shown in FIG. 11, whether the operator is manipulating the virtual object can be determined in step S170.

If the operator is currently manipulating the virtual object, the image generation unit 13 lays out the virtual object to be manipulated (the virtual object specified by the operator manipulation object ID) in the position/orientation of the stylus 41a by using the "data representing the position/orientation of the stylus 41a operated by the operator in the world coordinate system" acquired in step S150. In addition, the image generation unit 13 registers the layout result in the virtual object information management unit 16 in a scene graph format (step S180).

Although not illustrated in the flowchart of FIG. 3, if the instructor is manipulating the virtual object now, the image generation unit 13 lays out the virtual object to be manipulated (the virtual object specified by the instructor manipulation object ID) in the current position/orientation of the pointer and registers the result in the virtual object information management unit 16 in a scene graph format.

Next, the viewpoint of the operator, i.e., the positions/orientations of the left camera and right camera of the camera 22 in the world coordinate system are obtained (step S190). The position/orientation of the left camera in the world coordinate system and the position/orientation of the right camera in the world coordinate system are obtained by using the bias data and the "data representing the position/orientation of the 3D position/orientation sensor 21a in the world coordinate system" acquired in step S140.

The image generation unit 13 generates images of the virtual space viewed from the left camera and right camera, in which the virtual objects according to the virtual object scene graphs that reflect the manipulation results by the styluses 41a and 41b are laid out, and pointers indicating the positions/orientations of the styluses 41a and 41b are also laid out (step S200).

The pointer 41d is laid out in the virtual space by using the data representing the position/orientation relationship acquired in step S160 such that the position/orientation relationship between the pointer laid out and the viewpoint of the operator equals the position/orientation relationship between the stylus 41b based on the viewpoint of the instructor.

The positions/orientations of the left camera and right camera are specified using the data obtained in step S190. When a conventional technique of generating an image of a virtual space viewed from a viewpoint with a predetermined position/orientation is used, a virtual space image viewed from each camera can be generated.

The image compositing unit 15a generates a right mixed reality space image by superimposing the "virtual space-image viewed from the right camera" input from the image generation unit 13 on the "physical space image sensed by the right camera" input through the image input unit 12 and outputs the right mixed reality space image to the right display device of the display device 23a. The image compositing unit 15a also generates a left mixed reality space image by superimposing the "virtual space image viewed from the left camera" input from the image generation unit 13 on the "physical space image sensed by the left camera" input through the image input unit 12 and outputs the left mixed reality space image to the left display device of the display device 23a (step S210). Hence, the left mixed reality space image and right mixed reality space image can be displayed on the display device 23a.

The two images (left mixed reality space image and right mixed reality space image) are compression-coded by the image encoding unit 32a and transmitted to the instructor mixed reality apparatus 10b from the image transmitting unit 33a (step S220).

Unless a processing end instruction is input to the apparatus, the processing returns to step S130 through step S230 to repeat the processing. If a processing end instruction is input, the processing advances to step S240 through step S230 to disconnect the network connection established in step S120 (step S240) and disconnect the network connection established in step S110 (step S250).

<Processing Executed by Instructor Mixed Reality Apparatus 10b>

Processing executed by the instructor mixed reality apparatus 10b will be described next with reference to the flowchart shown in FIG. 4.

First, the apparatus is initialized (step S300).

Network connection to the operator mixed reality apparatus 10a is started to enable data communication (step S310).

Voice communication with the operator mixed reality apparatus 10a is started to enable voice signal communication (step S320).

The position/orientation measuring unit 11b receives a signal from the 3D position/orientation sensor 21b and a signal from the magnetic sensor provided in the stylus 41b and acquires these signals as "data representing the position/orientation of the 3D position/orientation sensor 21b in the world coordinate system" and "data representing the position/orientation of the stylus 41b in the world coordinate system". By using these data, the "position/orientation relationship between the 3D position/orientation sensor 21b and the stylus 41b" (instructor stylus relative position) is obtained (step S330).

The processing in step S330 will be described in more detail. A position $X_{dw}$ of the stylus 41b in the world coordinate system is represented by a position $X_{dc}$ in a coordinate system based on the "position/orientation of the 3D position/orientation sensor 21b in the world coordinate system", i.e., a camera coordinate system. This is coordinate transformation called viewing transformation known in the CG technology. The position $X_{dc}$ is obtained by multiplying the world coordinate data $X_{dw}$ by a viewing transformation matrix $M_{wonc}$ ($X_{dc}=M_{wonc}X_{dw}$). Viewing transformation processing is described in, e.g., Japanese Patent Laid-Open No. 2003-279310, and a detailed description thereof will be omitted.

The obtained data $X_{dc}$ of the instructor stylus relative position is transmitted from the stylus information transmitting unit 31b to the operator mixed reality apparatus 10a (step S340).

The image receiving unit 33b receives the compression-coded left mixed reality space image and right mixed reality space image, which are transmitted from the operator mixed reality apparatus 10a, and outputs them to the image decoding unit 32b (step S350). The image decoding unit 32b decodes the data and outputs them to the left display device and right display device of the display device 23b (step S360).

If a processing end instruction is input to the apparatus, the processing advances to step S400 through step S370 to disconnect the network connection established in step S320 (step S400) and disconnect the network connection established in step S310 (step S410).

If no processing end instruction is input to the apparatus, the processing advances to step S380 through step S370. If a signal representing that the button provided on the stylus 41b is pressed is input to the position/orientation measuring unit 11b, the processing advances to step S390. The stylus information transmitting unit 31b transmits data representing the pressed state to the operator mixed reality apparatus 10a as an event (step S390).

<Data Reception Processing on Side of Operator Mixed Reality Apparatus 10a>

Figure 5:
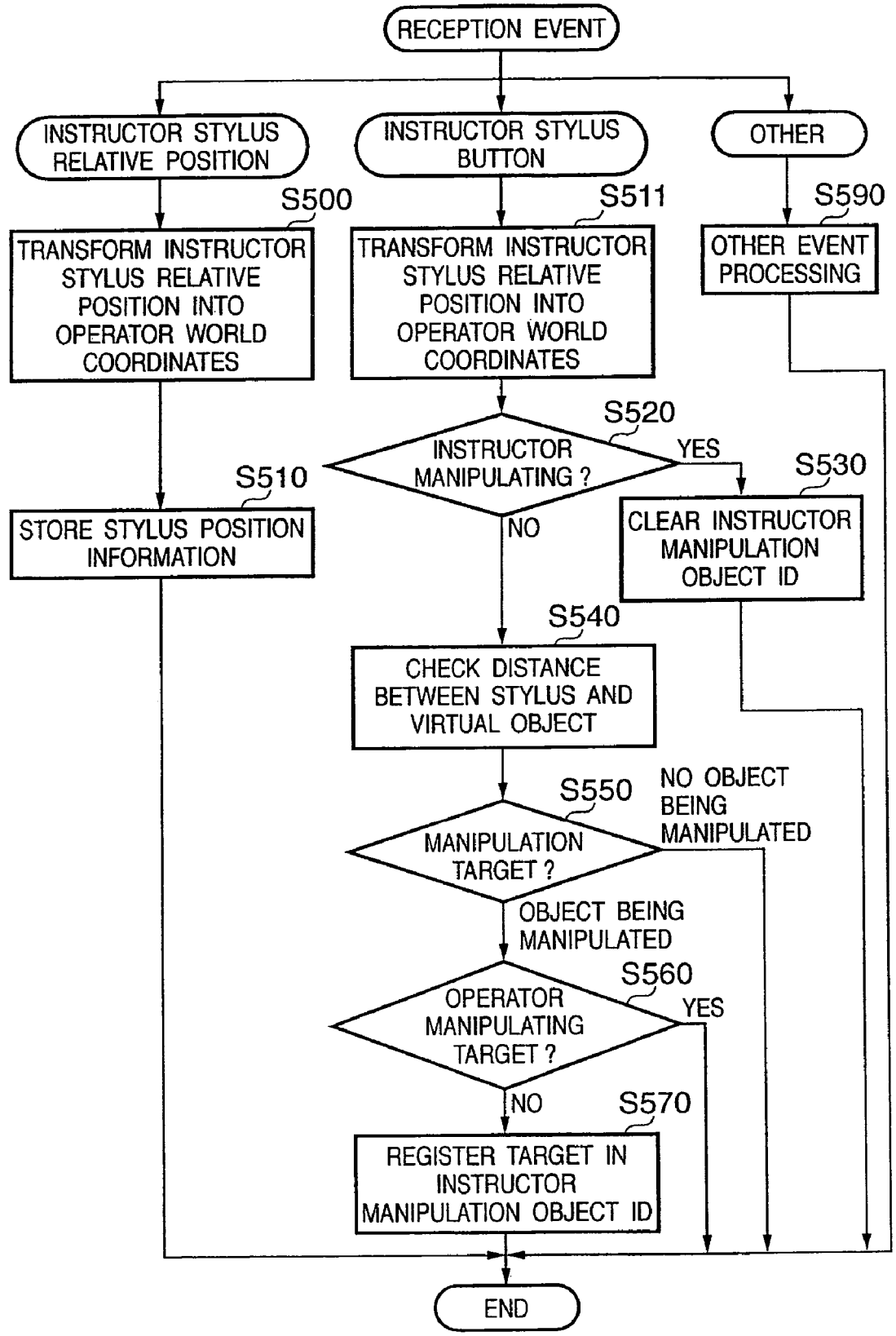
FIG. 5 is a flowchart of reception processing (reception event processing) executed by the operator mixed reality apparatus 10a to receive data (stylus information) transmitted from the instructor mixed reality apparatus 10b.

Reception processing (reception event processing) executed by the operator mixed reality apparatus 10a to receive data (stylus information) transmitted from the instructor mixed reality apparatus 10b will be described next with reference to the flowchart shown in FIG. 5. The processing according to the flowchart in FIG. 5 is executed on the background separately from the processing according to the flowchart in FIG. 3.

The processing branches in accordance with the type of the received event.

<When Received Event is Instructor Stylus Relative Position>

When the received event is an instructor stylus relative position, processing in steps S500 and S510 is executed.

When the stylus information receiving unit 31a receives the instructor stylus relative position $X_{dc}$, the image generation unit 13 transforms the position $X_{dc}$ into data $X_w$ in the operator world coordinate system to lay out, in the space where the operator exists, $X_{dc}$ as values in the camera coordinate system (xw, yw, zw, αw, βw, γw) as the operator viewpoint (left camera and right camera of the camera 22). $X_{dc}$ can be transformed into data in the operator world coordinate system by executing inverse transformation of the viewing transformation in step S330. This processing is given by $X_w = M_{conw} X_{dc} = M_{wonc}^{-1} X_{dc} \cdot M_{conw}$ is a matrix of inverse transformation of viewing transformation and equals the inverse matrix $M^{wonc-1}$ of the viewing transformation matrix. This processing is also implemented by a known technique such as Japanese Patent Laid-Open No. 2003-279310 (step S500).

The data representing the position/orientation obtained in step S500 is stored in the virtual object information management unit 16 for various purposes (step S510).

<When Received Event is Data Representing that Button Provided on Stylus 41b is Pressed>

When the received event is data representing that the button provided on the stylus 41b is pressed, processing in steps S511 to S570 is executed.

As in step S500, the position/orientation of the "pointer representing the position/orientation of the stylus 41a" laid out in the space where the operator exists is obtained (step S511).

It is determined by looking up the table shown in FIG. 11 whether the instructor manipulation object ID is NULL, i.e., whether the instructor is manipulating the virtual object (step S520). If YES in step S520, the processing advances to step S530 to clear the instructor manipulation object ID to NULL to cancel the virtual object holding mode (step S530).

If NO in step S520 the processing advances to step S540 to calculate the distance between the virtual object and the current pointer position by using the "data representing the current position/orientation of the pointer" obtained in step S511 (step S540). If a plurality of virtual objects exist in the virtual space, the distance to each virtual object is calculated.

If there is a virtual object whose distance to the pointer is equal to or less than a predetermined value (if there are a plurality of virtual objects spaced part from the pointer by a predetermined value or less, a virtual object with the shortest distance to the pointer is selected), the processing advances to step S560 through step S550. If the ID unique to the "virtual object closest to the pointer", which is specified in step S550, does not equal the operator manipulation object ID in the table shown in FIG. 11, the processing advances to step S570 through step S560 to register the ID unique to the "virtual object closest to the pointer", which is specified in step S550, in the instructor manipulation object ID.

<When Received Event is None of Above Events>

When the received event is none of the above-described events, i.e., so-called "another event", processing in step S590, i.e., processing corresponding to the event is executed (step S590).

<Processing Executed by Operator Mixed Reality Apparatus 10a when Button Provided on Stylus 41a is Pressed>

Figure 6:
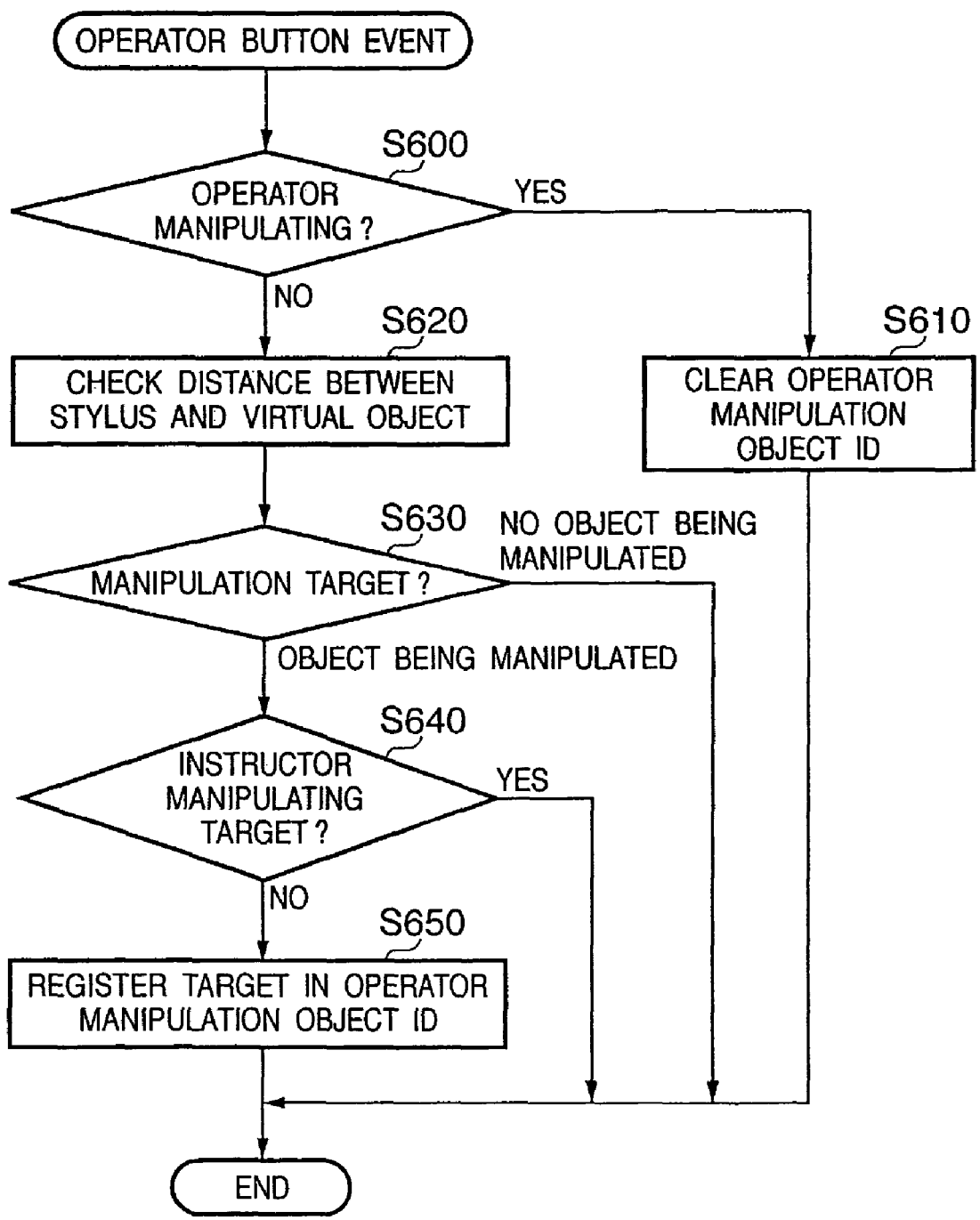
FIG. 6 is a flowchart of processing executed by the operator mixed reality apparatus 10a when a button provided on a stylus 41a is pressed.

Processing executed by the operator mixed reality apparatus 10a when the button provided on the stylus 41a is pressed will be described with reference to the flowchart shown in FIG. 6. The processing according to the flowchart in FIG. 6 is executed on the background (separately) concurrently from the processing according to the flowchart in FIG. 3.

It is determined by looking up the table shown in FIG. 11 whether the operator manipulation object ID (is NULL) exists, i.e., whether the operator is manipulating the virtual object (step S600). If YES in step S600, the processing advances to step S610 to clear the operator manipulation object ID to NULL to cancel the virtual object holding mode (step S610).

If NO in step S600, the processing advances to step S620 to calculate the distance between the virtual object and the current position of the stylus 41a by using the "data representing the current position/orientation of the stylus 41a in the world coordinate system" (step S620). If a plurality of virtual objects exist in the virtual space, the distance to each virtual object is calculated.

If there is a virtual object whose distance to the stylus 41a is equal to or less than a predetermined value (if there are a plurality of virtual objects spaced part from the stylus 41a by a predetermined value or less, a virtual object with the shortest distance to the stylus 41a is selected), the processing advances to step S640 through step S630. If the ID unique to the "virtual object closest to the stylus 41a", which is specified in step S630, does not-equal the instructor manipulation object ID in the table shown in FIG. 11, the processing advances to step S650 through step S640 to register the ID unique to the "virtual object closest to the stylus 41a", which is specified in step S630, in the operator manipulation object ID.

As described above, the processing according to the flowchart shown in FIG. 5 and the processing according to the flowchart shown in FIG. 6 are executed in different processes (or threads) and look up the table shown in FIG. 11 individually. Hence, access from another process (or thread) is inhibited when the table is rewritten. In this way, the floor control for each virtual object can be managed.

As described above, according to this embodiment, the mixed reality space image observed by the operator is transmitted to the instructor in a remote site. The instructor can seamlessly perceive the space of the operator and give various three-dimensional operation instructions to the operator while observing the image. Hence, operation support or operation education for the operator can conveniently be done from the remote site.

In this embodiment, all the sensors have been explained as magnetic sensors. However, any other sensor such as an optical sensor or ultrasonic sensor may be used.

In this embodiment, both the operator and instructor wear the HMDs on their heads. In place of the HMD, a 3D display may be used. In a polarizing display or liquid crystal shutter display, the instructor wears polarizing glasses or liquid crystal shutter glasses instead of a HMD. If 3D vision can be obtained with the naked eye by, e.g., a lenticular method, no glasses are necessary. In either case, the 3D-position/orientation sensor must be worn because the position/orientation of the head must be measured.

In this embodiment, after network connection is established between the operator mixed reality apparatus 10a and the instructor mixed reality apparatus 10b, they always execute data communication. However, ON/OFF of communication may be switched on the image generation unit side or instructor side.

Second Embodiment

In the first embodiment, the pointer representing the position/orientation of the stylus 41b is laid out in the position/orientation obtained by transforming the relative position/orientation relationship between 3D position/orientation sensor 21b and the stylus 41b into the relative position/orientation relationship from the viewpoint of the operator. Hence, a feeling can be obtained as if the operator reached out the hand and pointed from his/her viewpoint. However, when the operator changes the position/orientation of the head, the position of the pointer also moves. For this reason, the pointer may move to an undesired position for the instructor.

Figure 7A:
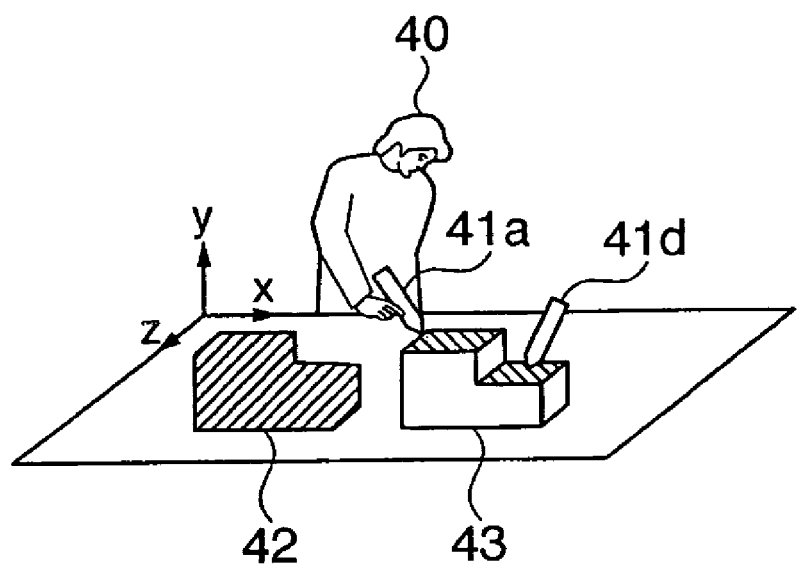
FIG. 7A is a view showing a space where an operator exists.
Figure 7B:
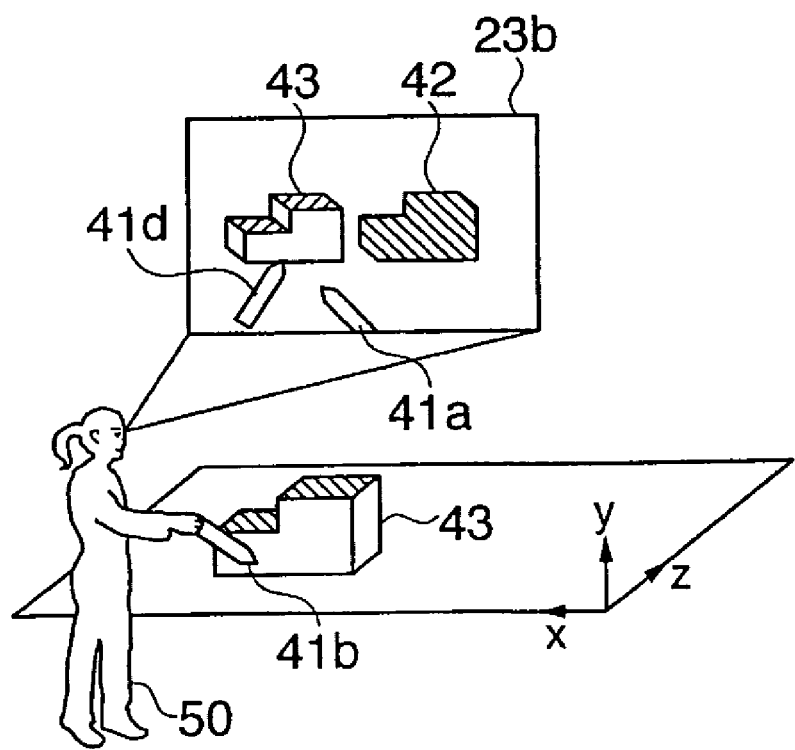
FIG. 7B is a view showing a space where an instructor exists.

In the second embodiment, to solve this problem, a world coordinate system is set on the instructor side, too. FIG. 7A is a view showing a space where an operator exists. FIG. 7B is a view showing a space where an instructor exists. As shown in FIG. 7B, a world coordinate system corresponding to the operator's world coordinate system is set in the space where the instructor exists.

Figure 4:
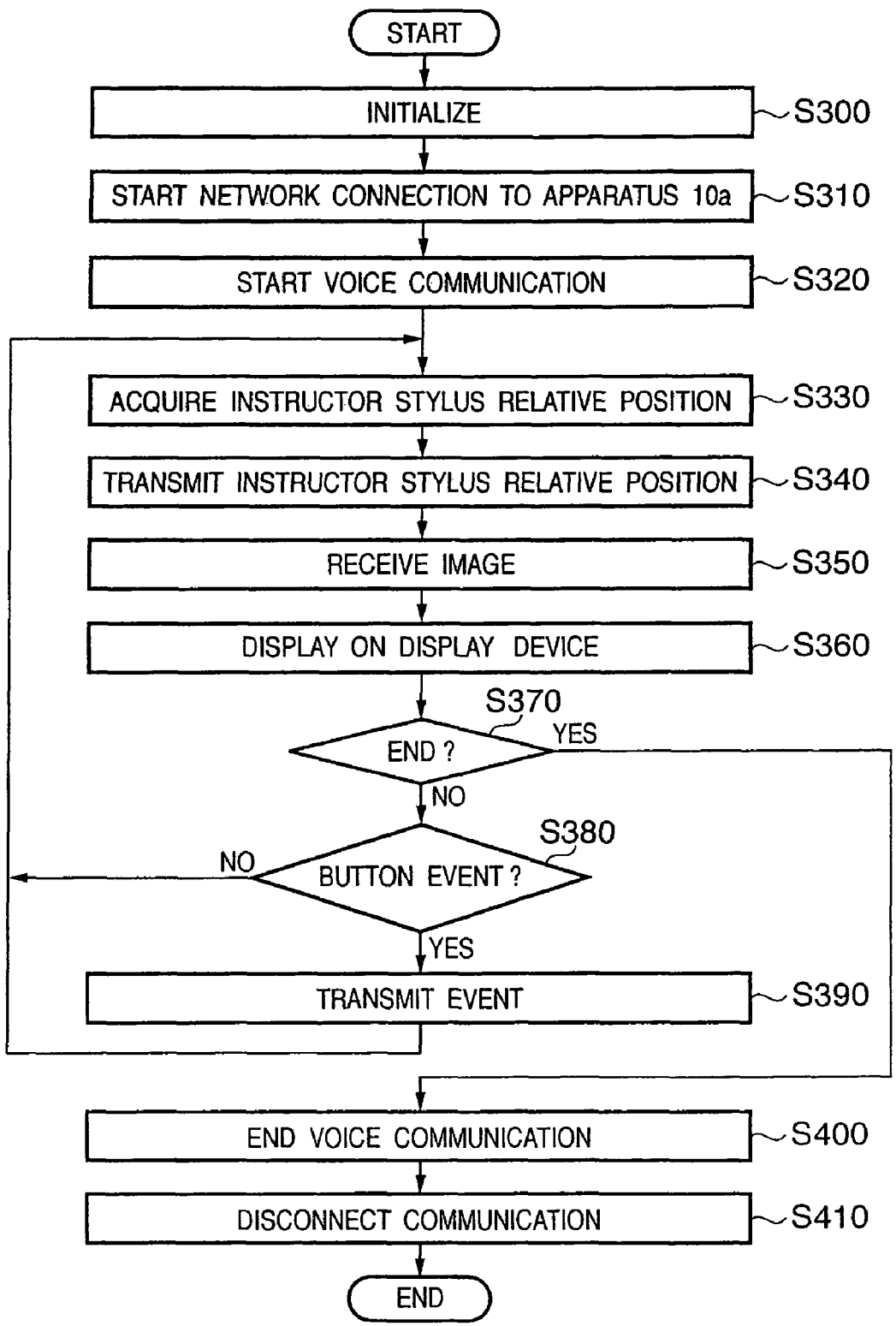
FIG. 4 is a flowchart of processing executed by an instructor mixed reality apparatus 10b.

In this embodiment, an instructor mixed reality apparatus 10b executes processing according to the flowchart shown in FIG. 4. In step S330, a position/orientation measuring unit 11b receives a signal from a magnetic sensor provided in a stylus 41b and acquires this signal as data representing the "position/orientation of the stylus 41b in the world coordinate system set in the space where the instructor exists". In step S340, this data is transmitted to an operator mixed reality apparatus 10a.

Processing executed by the operator mixed reality apparatus 10a is basically the same as in the first embodiment. The pointer is laid out in the position/orientation transmitted in step S340. Hence, the instructor can point the same position by the pointer independently of the motion of the operator's head.

Third Embodiment

In the above-described embodiments, a virtual space image is always superimposed on a physical space image. Hence, the image of a virtual object is always rendered in foreground of a physical object. When the virtual object (including a pointer) is located behind the physical object viewed from the observer (operator or instructor), the virtual object must be occluded by the physical object. However, the virtual object is rendered in foreground of the physical object because of the above-described processing, resulting in a visual error. In this embodiment, to solve this problem, a physical object is recognized in advance by an image recognition technique, or its shape is measured in advance by using various kinds of sensors so that the 3D model of the physical object is known in advance.

Figure 8:
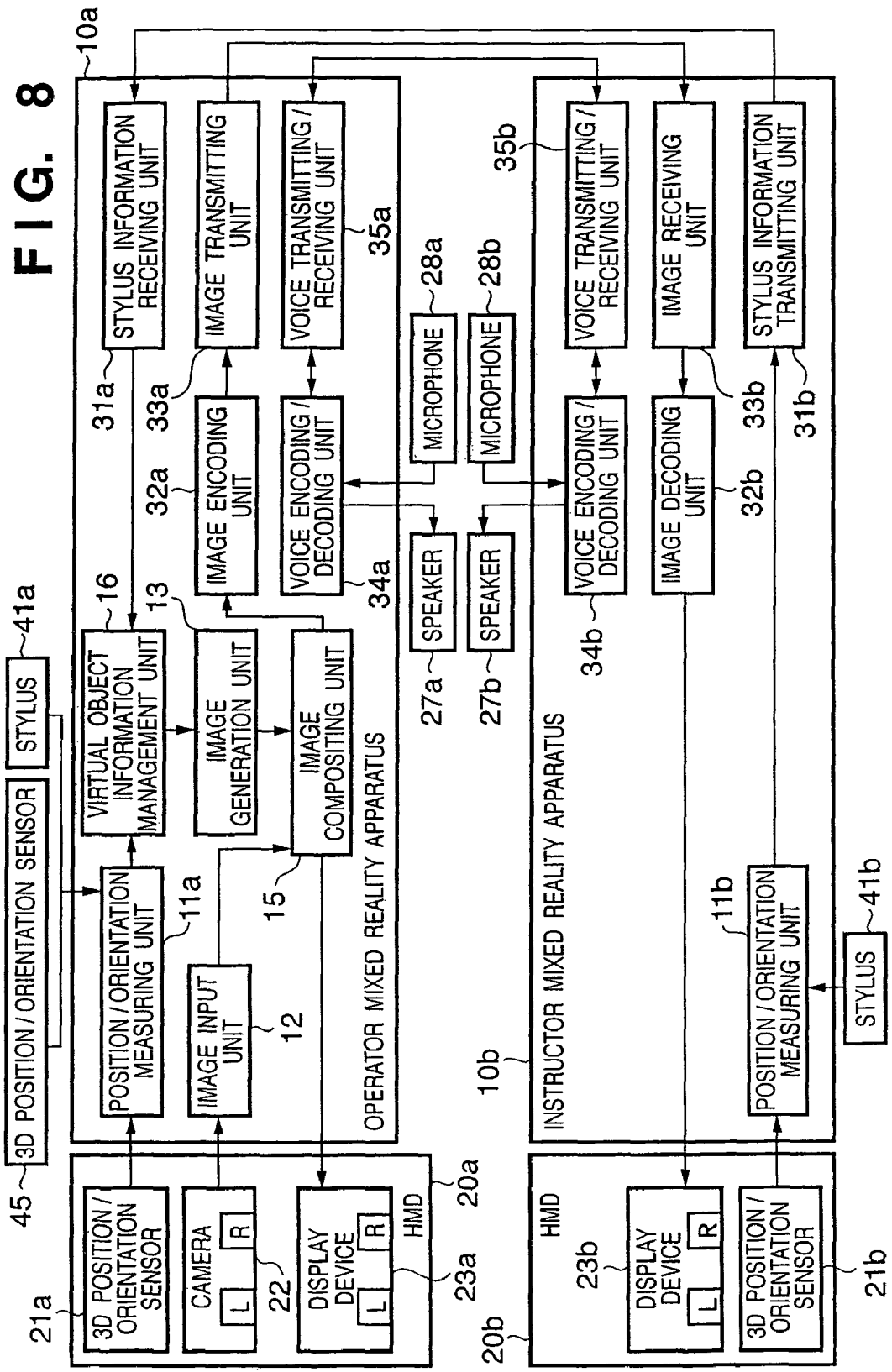
FIG. 8 is a block diagram showing the functional configuration of a system according to the third embodiment of the present invention.

FIG. 8 is a block diagram showing the functional configuration of a system according to this embodiment of the present invention. In the system according to this embodiment, a 3D position/orientation sensor 45 is added to the system configuration of the first embodiment shown in FIG. 1. The 3D position/orientation sensor 45 is connected to a position/orientation measuring unit 11a.

The 3D position/orientation sensor 45 is a magnetic sensor, like the remaining sensors, and measures the position/orientation of a physical object in the world coordinate system.

Processing executed by an operator mixed reality apparatus 10a included in the system with the above-described configuration will be described first with reference to the flowchart shown in FIG. 3. The operator mixed reality apparatus 10a according to this embodiment basically executes processing according to the flowchart shown in FIG. 3. Additionally, in step S150, the position/orientation measuring unit 11a receives a signal of a measurement result of the 3D position/orientation sensor 45 and acquires the signal as data. The acquired data represents the position/orientation of the physical object in the world coordinate system, as described above. This data contains a set of six parameters, like the above-described stylus data.

As described above, the 3D model of the physical object is already obtained. The 3D model and the data acquired in step S150 can be stored in the world coordinate as a scene graph.

Rendering of the virtual object in step S200 is done on the basis of the occlusion relationship between the virtual object and the physical object. Hidden surface removal processing is used for rendering here.

A Z buffer method is often used in hidden surface removal of a CG system. The Z buffer is a two-dimensional array buffer having the same resolution as the display device and stores depth information of each pixel.

For the polygons of all virtual objects, a Z value as depth information is obtained by using the Z buffer for each pixel which is scan-converted by perspective projection from the viewpoint position. If the value is smaller than the Z value already stored in the Z buffer, the pixel is located in foreground. The Z value of the pixel is newly stored in the Z buffer, and the color of the pixel is written in a corresponding frame buffer. This processing is repeated.

Figure 9:
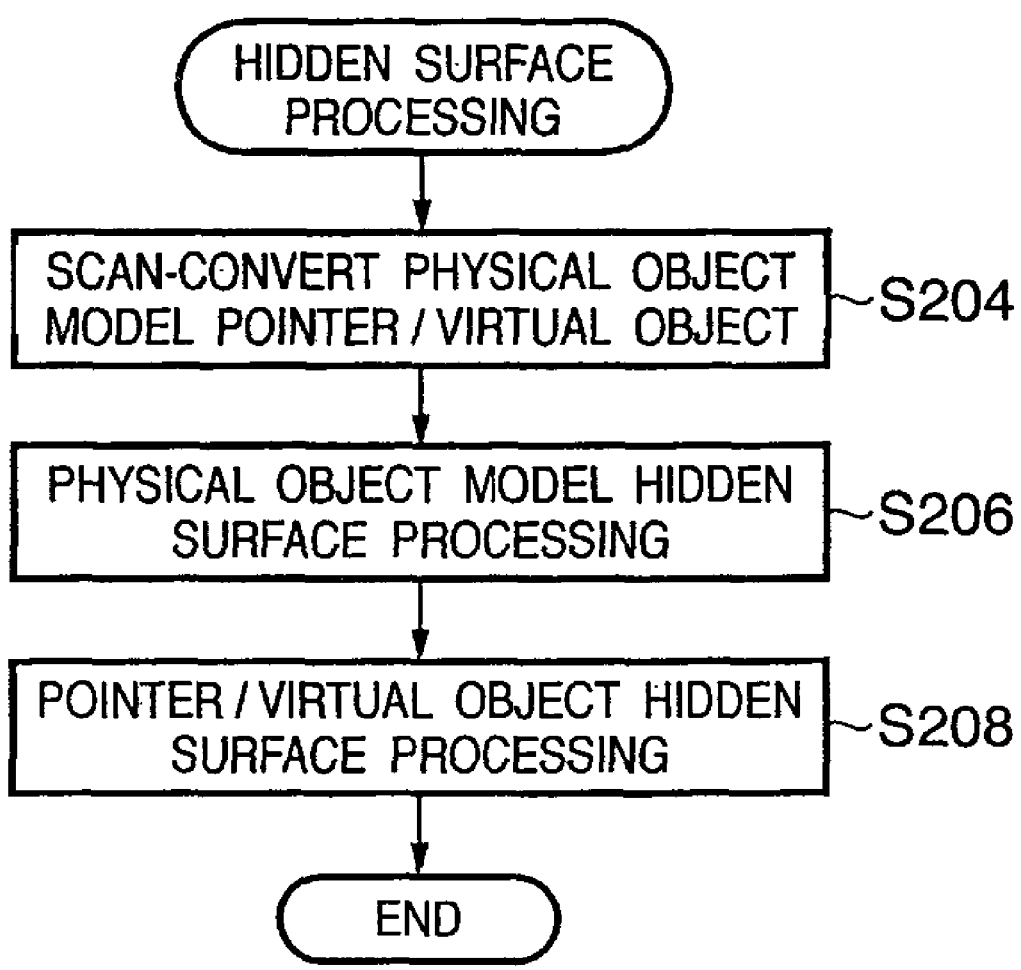
FIG. 9 is a flowchart of virtual object rendering processing using hidden surface processing in step S200 based on a Z buffer method.

Virtual object rendering processing using the hidden surface processing in step S200 based on the Z buffer method will be described with reference to the flowchart shown in FIG. 9.

Scan conversion is executed for all objects such as the 3D model (physical object model) of the physical object, pointer, and other virtual objects. Scan conversion is executed to make all pixels correspond to buffer positions in an image compositing unit 15 serving as a frame buffer corresponding to the display screen (step S204).

Before the processing in step S204 is executed, a captured image from a camera 22 is input to the image compositing unit 15 in step S130. The value of the farthest point is stored in the Z buffer.

The Z value of each pixel of the physical object model is obtained and compared with the value in the Z buffer. If the value is smaller than the Z value already stored in the Z buffer, the Z value is newly stored in the Z buffer. However, the processing of writing the color of the pixel in a corresponding frame buffer is omitted (step S206). As a result, although the Z value is rewritten, the contents of the frame buffer are not rewritten. That is, a transparent object is present at the position of the depth value stored in the Z buffer.

Next, the Z value of each pixel of the pointer and other virtual objects is obtained and compared with the value in the Z buffer. If the value is smaller than the Z value already stored in the Z buffer, the Z value is newly stored in the Z buffer. In addition, the color of the pixel is written in a corresponding frame buffer (step S208). Then, the hidden surface processing is ended.

With the above-described processing, the pointer of the operator or instructor can point both the real object and virtual objects in the operator's mixed reality space seamlessly without contradiction.

Fourth Embodiment

An operator mixed reality apparatus 10a or instructor mixed reality apparatus 10b can be implemented by a computer such as a general PC (Personal Computer) or WS (WorkStation).

Figure 10:
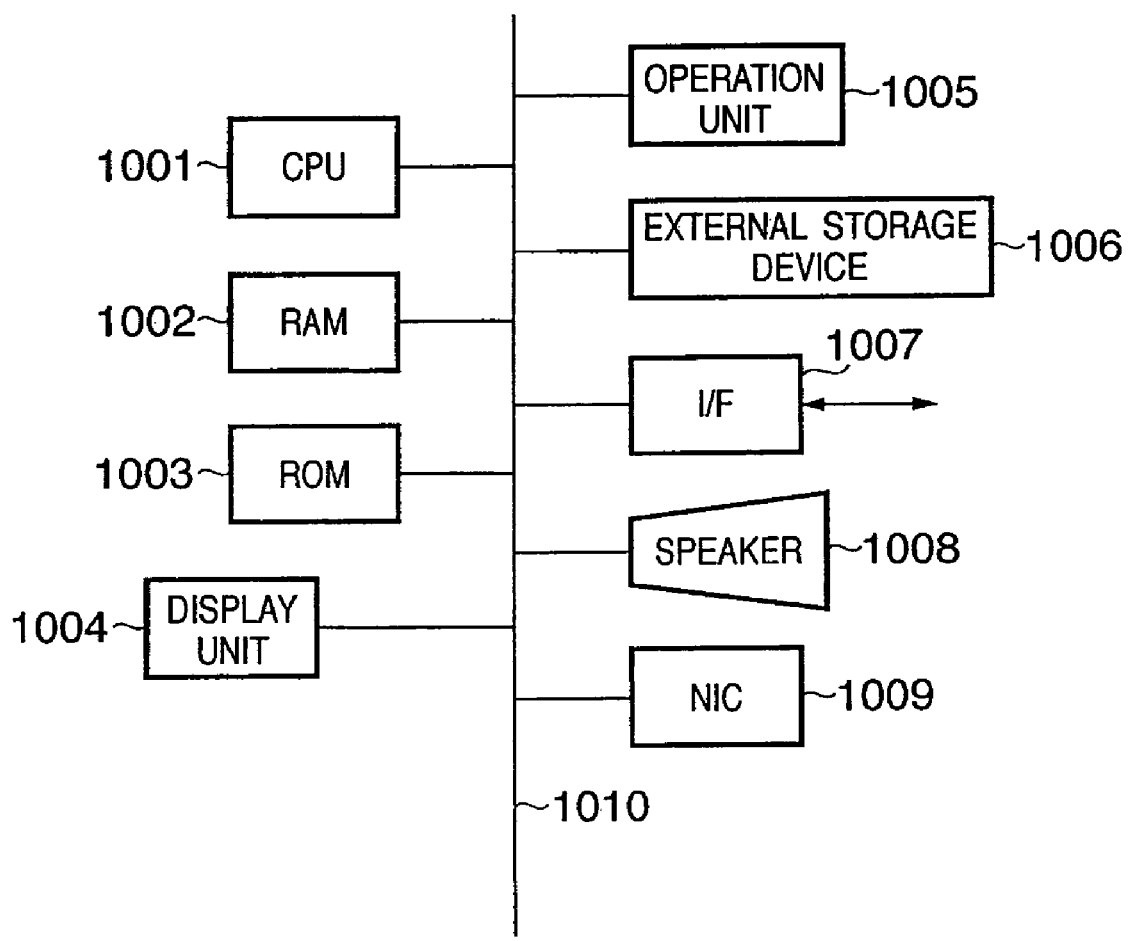
FIG. 10 is a block diagram showing the-hardware configuration of a computer applicable to the operator mixed reality apparatus 10a or instructor mixed reality apparatus 10b.

FIG. 10 is a block diagram showing the hardware configuration of a computer applicable to the operator mixed reality apparatus 10a or instructor mixed reality apparatus 10b. For the descriptive convenience, computers with identical configurations are used as the operator mixed reality apparatus 10a and instructor mixed reality apparatus 10b. However, computers with different configurations may be applied, as a matter of course.

Referring to FIG. 10, a CPU 1001 controls the entire computer by using programs and data stored in a RAM 1002 and ROM 1003 and executes processing (e.g., processing according to the above-described flowcharts) to be performed by the apparatus using the computer.

The RAM 1002 can appropriately provide an area to temporarily store a program or data loaded from an external storage device 1006, an area to temporarily store data transmitted/received through an I/F 1007, and a work area to be used by the CPU 1001 to execute various kinds of processing.

The ROM 1003 stores boot programs and setting data of the apparatus using the computer.

A display unit 1004 includes a CRT or liquid crystal screen and can display a processing result of the CPU 1001 as an image or text.

An operation unit 1005 includes a keyboard and mouse and can input various instructions to the CPU 1001. An instruction to be input to the apparatus in the above-described processing operations is input by using the operation unit 1005.

The external storage device 1006 is a mass storage device represented by a hard disk drive. An OS (Operating System) and program data to cause the CPU 1001 to execute the above-described processing which should be executed by the apparatus using the computer are saved in the external storage device 1006. Some or all of the data are loaded in the RAM 1002 as needed under the control of the CPU 1001 and processed by the CPU 1001.

For example, when the computer is applied to the operator mixed reality apparatus 10a of the first embodiment, programs and data to cause the CPU 1001 to execute the functions of the units of the operator mixed reality apparatus 10a in FIG. 1 are saved in the external storage device 1006. When the computer is applied to the instructor mixed reality apparatus 10b of the first embodiment, programs and data to cause the CPU 1001 to execute the functions of the units of the instructor mixed reality apparatus 10b in FIG. 1 are saved in the external storage device 1006. When the computer is applied to the operator mixed reality apparatus 10a of the third embodiment, programs and data to cause the CPU 1001 to execute the functions of the units of the operator mixed reality apparatus 10a in FIG. 8 are saved in the external storage device 1006. When the computer is applied to the instructor mixed reality apparatus 10b of the third embodiment, programs and data to cause the CPU 1001 to execute the functions of the units of the instructor mixed reality apparatus 10b in FIG. 8 are saved in the external storage device 1006.

The I/F 1007 is connected to hardware to be connected to the apparatus using the computer. For example, when the computer is applied to the operator mixed reality apparatus 10a of the first embodiment, the HMD 20a, microphone 28a, and stylus 41a are connected to the I/F 1007. When the computer is applied to the instructor mixed reality apparatus 10b of the first embodiment, the HMD 20b, microphone 28b, and stylus 41b are connected to the I/F 1007. When the computer is applied to the operator mixed reality apparatus 10a of the third embodiment, the 3D position/orientation sensor 45 is also connected to the I/F 1007. Various devices are connected to one I/F here. However, an I/F may be provided for each device.

When the computer is applied to the operator mixed reality apparatus 10a, a speaker 1008 corresponds to the speaker 27a. When the computer is applied to the instructor mixed reality apparatus 10b, the speaker 1008 corresponds to the speaker 27b.

A NIC (network interface) 1009 connects the computer to a network. When the computer is applied to the operator mixed reality apparatus 10a or instructor mixed reality apparatus 10b, each computer executes data communication through the NIC 1009.

A bus 1010 connects the above-described units.

Fifth Embodiment

FIG. 12 is a block diagram showing the functional configuration of a mixed reality remote control system according to this embodiment. The configuration includes an operator mixed reality apparatus 510a shown on the upper side of FIG. 12 and an instructor mixed reality apparatus 510b shown on the lower side of FIG. 12. These apparatuses are connected by a network through a management server 560. Both apparatuses have HMDs (Head Mounted Displays) 520a and 520b so that both the operator and instructor can see the mixed reality space image of the space where the operator exists through the HMDs. The apparatuses also comprise microphones 528a and 528b and speakers 527a and 527b for conversation between the operator and instructor.

The operator HMD 520a comprises a 3D position/orientation sensor 521a to measure the position/orientation of the HMD by using magnetism, a stereo camera 522 (L indicates the left camera, and R indicates the right camera) capable of sensing the physical space and obtaining an image, and a stereo display device 523a (L indicates the left display device, and R indicates the right display device) capable of displaying an image. The positional relationship between the 3D position/orientation sensor 521a and the camera 522 is measured in advance and fixed. The 3D position/orientation sensor 521a outputs a position/orientation signal as a measurement result to a position/orientation measuring unit 511a (to be described later). The camera 522 outputs an image sensing result to an image input unit 512 (to be described later). The display device 523a receives left and right image signals from an image compositing unit 515 and displays the images on a left display device 523aL and right display device 523aR, respectively.

The position/orientation measuring unit 511a in the operator mixed reality apparatus 510a receives a 3D position/orientation signal output from the 3D position/orientation sensor 521a of the HMD 520a and a 3D position/orientation signal of a stylus serving as a 3D pointing device in the mixed reality space and outputs these data to a virtual object management unit 516a. The virtual object management unit 516a receives the position/orientation data of the operator stylus and HMD from the position/orientation measuring unit 511a and stores them together with the data of all virtual objects used for the operation. A virtual object transmitting/receiving unit 531a transmits/receives all pieces of virtual object information shared with the instructor mixed reality apparatus 510b to/from the management server 560. Event information for a virtual object, which is received from the management server 560, is sent to the virtual object management unit 516a so that the scene graph of the virtual object stored there is changed. An image generation unit 513a renders left and right virtual space CGs by seeing the scene graphs of all virtual objects stored in the virtual object management unit 516a from operator viewpoint information (HMD position/orientation information), thereby generating images.

The image compositing unit 515 receives captured images from the left camera 522L and right camera 522R through the image input unit 512 and composites the left and right virtual space CG images generated by the image generation unit 513a on the input images. Consequently, the virtual space data from the operator viewpoint are superimposed on the captured images from the cameras and displayed on the left and right display devices of the display device 523a, respectively. The superimposed images are compression-coded by an image encoding unit 532a and transmitted to the management server 560 through an image transmitting unit 533a.

The configuration of the instructor mixed reality apparatus 510b is almost the same as the operator mixed reality apparatus 510a except that no camera is mounted on the HMD 520a so no image is Input from the camera. As the mixed reality space image of the operator space, stereoscopic Images from the cameras of the operator HMD are received by an image receiving unit 533b through the management server 560, decoded by an image decoding unit 532b, and displayed on a left display device 523bL and right display device 523bR of a display device 523b. The positions/orientation of the HMD of the instructor is acquired-from a 3D position/orientation sensor 521b. Input to a position/orientation measuring unit 511b together with the 3D position/orientation of a stylus 541b, and sent to a virtual object management unit 516b. The virtual object management unit 516b stores all virtual object data shared between the operator and instructor, like the virtual object management unit 516a of the operator mixed reality apparatus 510a. An event for a virtual object from the instructor side is sent to the management server 560 through a virtual object transmitting/receiving unit 531b. An event for a virtual object, which is received from the management server 560, is sent to the virtual object management unit 516b through the virtual object transmitting/receiving unit 531b so that the scene graph is changed. The function of an image generation unit 513b is the same as that of the image generation unit 513a, and a description thereof will be omitted. An image output unit 517 selectively outputs, to the display device 523b, the operator mixed reality space image received from the image decoding unit 532b or the virtual object CD image received from the image generation unit 513b.

After connection between the operator mixed reality apparatus and the instructor mixed reality apparatus is established, an image communication module and voice communication module are activated. The operator mixed reality space image is transmitted from the image transmitting unit 533a to the image receiving unit 533b by one-way communication. Voice information is exchanged by two-way communication. Hence, the operator can talk to the instructor by using the speaker 527a and microphone 528a, and the instructor can talk to the operator by using the speaker 527b and microphone 528b.

The management server 560 manages virtual object information. A virtual object communication management unit 561 manages information communication between the operator mixed reality apparatus and the instructor mixed reality apparatus. A virtual object management unit 562 manages the information of scene graphs of shared virtual objects, including the operator and instructor styluses and HMDs, and the floor control for the shared virtual objects. Any change of virtual object information from the operator or instructor is transmitted to the virtual object management unit 562 as an event. After the shared scene graph is changed in the virtual object management unit 562, the same event is distributed to the operator mixed reality apparatus 510a and instructor mixed reality apparatus 510b, and the virtual object scene graph stored in each apparatus is changed.

Figure 13A:
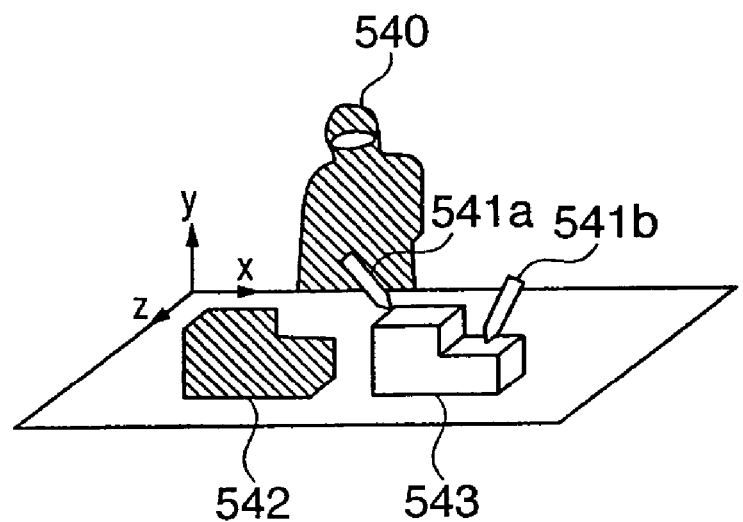
FIGS. 13A and 13B are views showing an operator mixed reality space and a screen display example of an instructor mixed reality apparatus in a remote site, respectively.

An operation example of the above-described configuration will be described with reference to FIGS. 13A and 13B. FIG. 13A shows a state wherein an operator 540 who wears the HMD is doing an operation in the mixed reality space. Reference number 542 denotes a real operation target; and 543, a 3D CG image of the 3D model of the operation target. The virtual object 543 is shared by the instructor. An operation instruction or operation example from the instructor is implemented through the virtual object 543. A world coordinate system (x,y,z) as shown in FIG. 13A is set in the physical space where the operator exists. The virtual object 543 as an example model placed in the coordinate system can be observed through the HMD as if it were placed next to the real operation target 542. Interaction is possible to, e.g., select and move parts of the virtual object by using a stylus with a magnetic sensor. Reference number 541a denotes a pointer generated by superimposing a CG on the operator's stylus; and 541b, a CG image of the instructor's stylus.

Figure 13B:
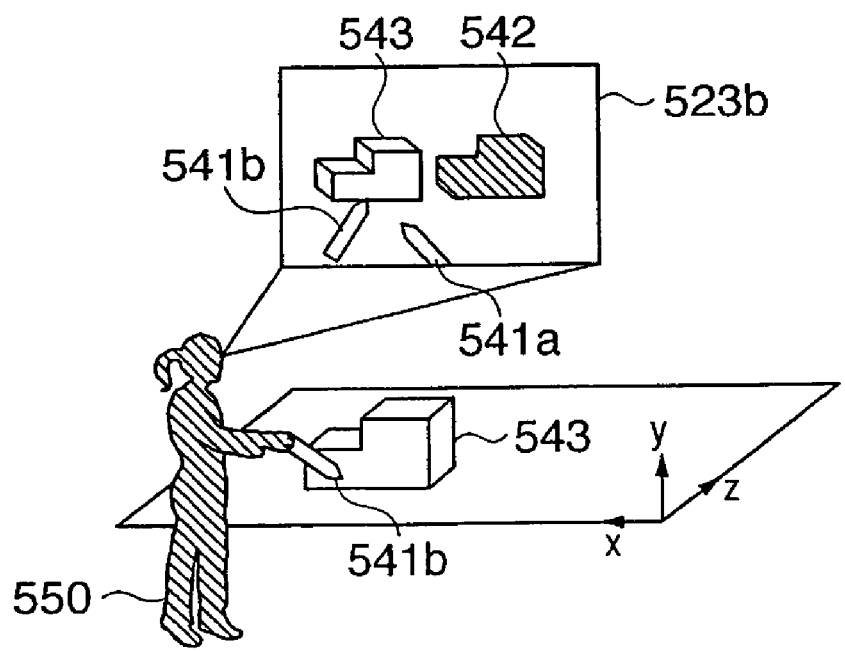

FIG. 13B shows the space of an instructor in a remote site. An instructor 550 wears the HMD 520b, The operation target 542 and 3D model CG 543 are displayed on the display device 523b of the HMD 520b as a 3D image. This image is the same as that the operator 540 sees. The pointer 541a indicates the position of the operator's stylus, and the pointer 541b indicates the position of the instructor's stylus. An instructor world coordinate system (x,y,z) corresponding to the world coordinate system of the operator mixed reality space is set even in the space where the instructor exists, as shown in FIG. 13B. In the two world coordinate systems, the position/orientation of a virtual object is expressed by coordinate values common to the operator and instructor. Since the HMD 520*b* and stylus 541*b* of the instructor have magnetic sensors, the relative positional relationship between the viewpoint position and the stylus in the hand can be measured. The position of the instructor's stylus from the operator viewpoint can be determined by transforming the positional relationship into the positional relationship from the operator viewpoint. For this reason, the instructor can give a feeling as if the operator could manipulate the pointer from his/her viewpoint. The state wherein the operator viewpoint mixed reality space image is shared between the operator and instructor, and the instructor's pointer is displayed on the basis of the operator viewpoint position will be called a work space mode.

The instructor 550 gives an operation instruction to the operator by pointing the virtual object 543 with the pointer 541*b* or moving parts of the virtual object while seeing the same image 523*b* as that the operator sees.

Figure 14:
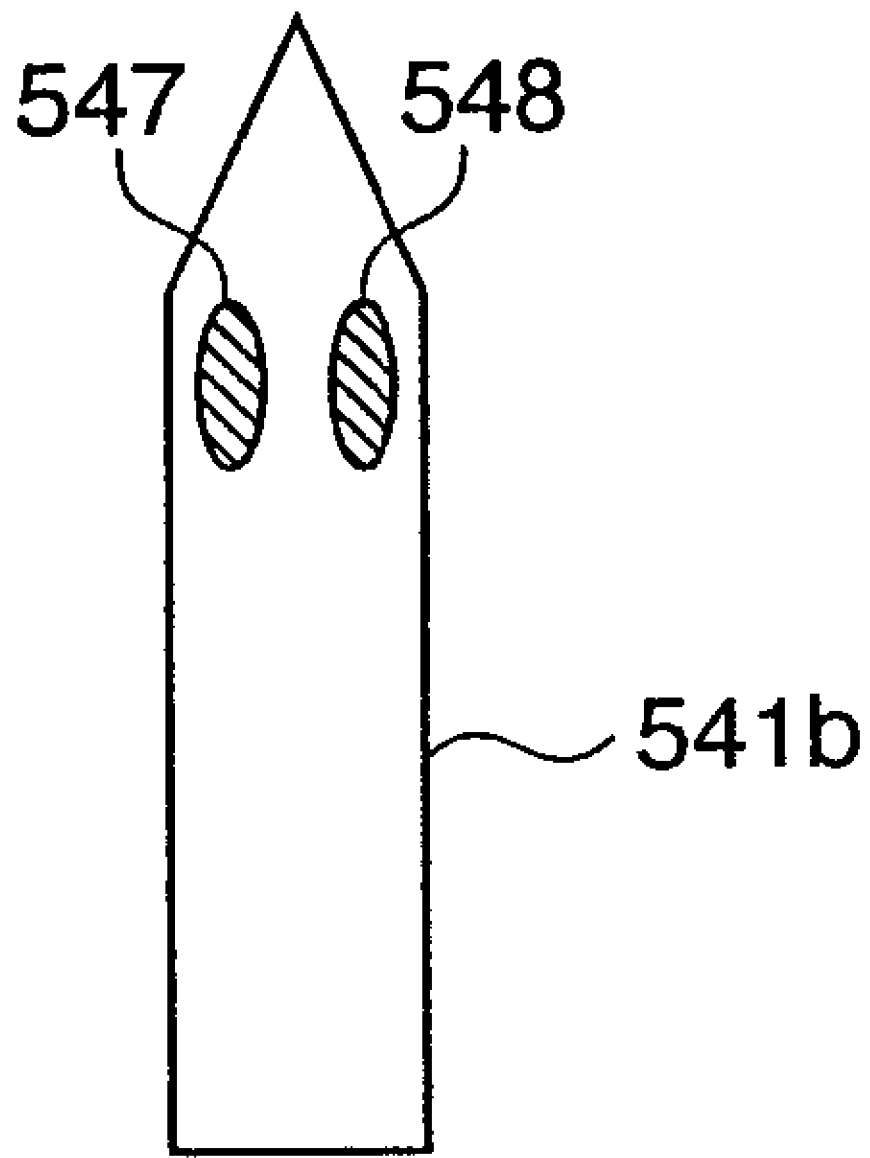
FIG. 14 is a view showing a layout example of buttons of an instructor stylus used in the instructor mixed reality apparatus.

To move the virtual object, the stylus 541*b* is so moved that it contacts the virtual object, and a stylus first button 547 shown in FIG. 14 is pressed. A virtual object grip mode is set, and the gripped virtual object moves together with the stylus. When the button of the stylus is pressed during the grip mode, the grip mode is canceled, and the virtual object is released. The operator can also manipulate the virtual object by the same operation. The operator's stylus has only one button (not shown). To prevent any concurrence of operator and instructor manipulations, only one of the styluses can be set in the grip mode to move the virtual object.

Figure 15A:
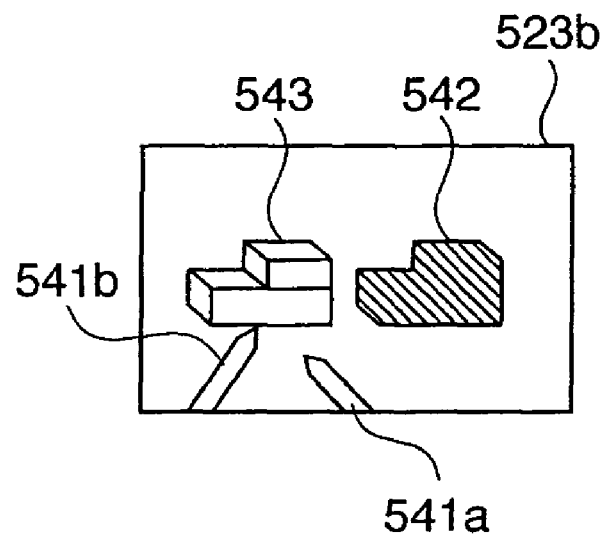
FIGS. 15A to 15C are views showing screen display examples in mode change of the instructor mixed reality apparatus.

In the operator space mode, the relative positional relationship between the instructor's head and the stylus in the hand is transformed into the relative positional relationship from the position/orientation of the operator's head, thereby displaying the instructor's pointer in the mixed reality space of the operator. Hence, a feeling can be obtained as if the operator reached out the hand and pointed from his/her viewpoint. However, when the operator changes the position/orientation of the head, the position of the pointer also moves. For this reason, the pointer may move to an undesired position for the instructor. To prevent this, when the instructor presses a stylus second button 548 shown in FIG. 14, a virtual space (FIGS. 15A to 15C) containing only the virtual object from the instructor viewpoint is displayed on the display device 523*b*. In this example, a virtual space containing the virtual object 543, operator pointer 541*a*, and instructor pointer 541*b* is displayed from the instructor viewpoint. The instructor manipulates the virtual object by, e.g., pointing or moving it while seeing this space. When the result is reflected on the operator mixed reality apparatus, the virtual object can be shared between the instructor and operator. That is, the instructor can see and manipulate the virtual object from the viewpoint of his/her own independently of the motion of the operator's head. This state will be called a shared virtual mode. In this mode, the operator sees the mixed reality space on which the virtual object changed by the instructor is superimposed.

Figure 15B:
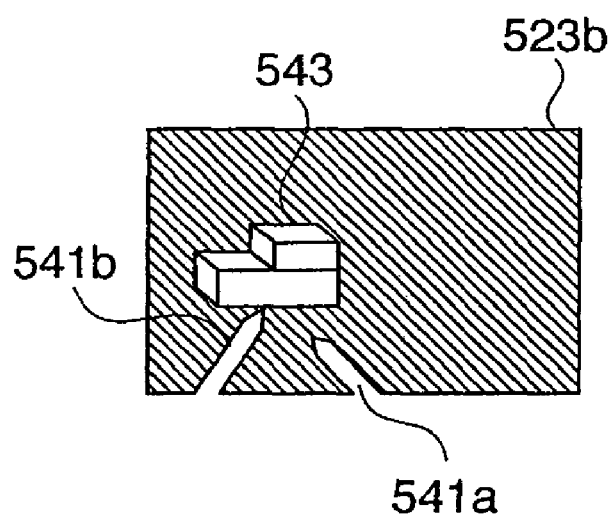
Figure 15C:
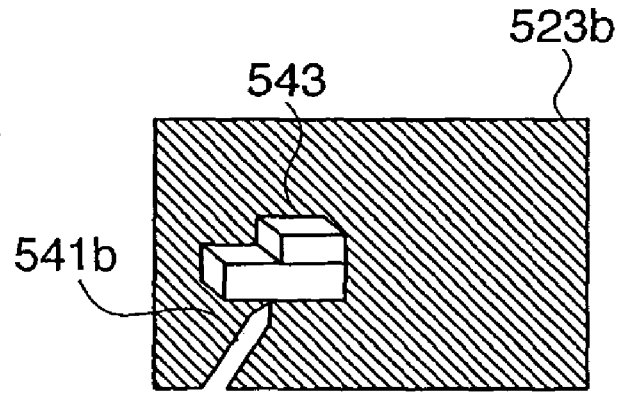

When the instructor presses the stylus second button 548 during the shared virtual mode, an image in an independent virtual mode shown in FIG. 15C is displayed. In this mode, the virtual object 543 is not shared by the operator, and only the instructor pointer 541*b* is displayed as a pointer. In this state, pointing by the instructor or a change of the virtual object is done in only the instructor mixed reality apparatus and is not reflected on the operator mixed reality apparatus. The instructor can independently manipulate the virtual object by trial and error. When the instructor presses the stylus second button during this mode, the virtual object edited in the independent virtual mode is uploaded to the management server and then downloaded to the operator mixed reality apparatus. The image shown in FIG. 15A on which the manipulation result is reflected is displayed on the display device of the instructor HMD, and the mode returns to the work space mode described first. In this way, the instructor can efficiently give an operation instruction by switching the mode appropriately in accordance with the instruction contents.

FIG. 16 is a flowchart for explaining the operation of the operator mixed reality apparatus 510*a* to execute an operation in the mixed reality work space. Although not illustrated in FIGS. 13A and 13B, the apparatus 510*a* can be connected to the HMD 520*a* and stylus 541*a* of the operator and is connected to the instructor mixed reality apparatus 510*b* by a network through the management server 560.

In step S5100, the operator mixed reality apparatus 510*a* is initialized. In this step, the world coordinate system of the mixed reality work space is set. The output from the sensor (to be described later) is expressed as data containing a set of six parameters (x, y, z, α, β, γ) in the coordinate system. In this case, α is the rotation angle about the x-axis, β is the rotation angle about the y-axis, and γ is the rotation angle about the z-axis. Initial data of the virtual object 543 serving as the reference of the real object 542 is laid out in the world coordinate system and stored in the virtual object management unit 516*a* as scene graph data.

In step S5110, network connection to the management server 560 is established to enable data transmission/reception between the apparatuses. The virtual object information set in step S5100 is uploaded to the management server 560 through the virtual object transmitting/receiving unit 531*a*.

In step S5120, voice communication connection between the operator mixed reality apparatus 510*a* and the instructor mixed reality apparatus 510*b* is started. After the voice communication connection is set, voice is output from the speakers 527*a* and 527*b* and input to the microphones 528*a* and 528*b*. Hence, the operator and instructor can talk by voice. Image communication connection is also set so that images can be transmitted from the image transmitting unit 533*a* to the image receiving unit 533*b*.

In step S5130, an image from the camera 522 mounted on the operator HMD is input to the image compositing unit 515 through the image input unit 512. The camera 522 includes two, left (L) and right (R) cameras corresponding to the operator's eyes. The images are stored in separate buffers of the image compositing unit 515.

In step 55140, the position/orientation of the operator's head is input to the position/orientation measuring unit 511*a* as a value from the HMD 3D position sensor 521*a* so that data containing a set of six parameters in the world coordinate system is generated.

In step S5150, the 3D position/orientation information of the operator stylus 541*a* is input to the position/orientation measuring unit 511*a* in the same format as the data from the HMD 3D position sensor and held in the virtual object management unit 516*a*.

In step S5160, the position/orientation information of the operator HMD and stylus obtained in step S5150 is transmitted to the management server 560 through the virtual object transmitting/receiving unit 531*b* as an event.

In step S5170, it is checked whether the button of the operator stylus is pressed. If YES in step S5170, the flow advances to step S5180. Otherwise, the flow advances to step S5190.

In step S5180, the pressed button event is transmitted to the management server 560 through the virtual object transmitting/receiving unit 531a.

In step S5190, information about the operator pointer, instructor pointer, and a change of the virtual object is received through the virtual object transmitting/receiving unit 531a as an event from the management server 560.

In step S5210, the scene graph stored in the virtual object management unit 516a is changed on the basis of the change information obtained in step S5190.

In step S5220, the image generation unit 513a generates a left CG image and right CG image viewed from the position/orientation of the operator HMD on the basis of the scene graph of the virtual object, operator pointer 541a, and instructor pointer 541b on which the manipulation result is reflected.

In step S5240, the image compositing unit 515 superimposes the left CG image and right CG image generated in step S5220 on the left captured image and right captured image from the camera, thereby obtaining composited images of the virtual object and physical object. The positional relationship between the 3D position/orientation sensor 521a, the left camera 522L, and the right camera 522R is fixed. Since a transformation formula can be obtained in advance by calibration, the position/orientation of the camera viewpoint is determined by using the formula. The left composited image and right composited image are displayed on the left display device 523aL and right display device 523aR of the operator HMD, respectively.

In step S5250, the same binocular images as those displayed on the display device 23a of the operator HMD are encoded by the image encoding unit 532a and transmitted to the image receiving unit 533b of the instructor mixed reality apparatus through the image transmitting unit 533a.

In step S5260, if an end command of the operator mixed reality apparatus is input, the flow advances to voice communication end processing in step S5270. Otherwise, the flow returns to step S5130.

In step S5270, the voice connection is disconnected by ending voice communication processing, and the image communication connection is also disconnected.

In step S5280, communication with the management server 560 is disconnected, thereby ending the processing.

Figure 17A:
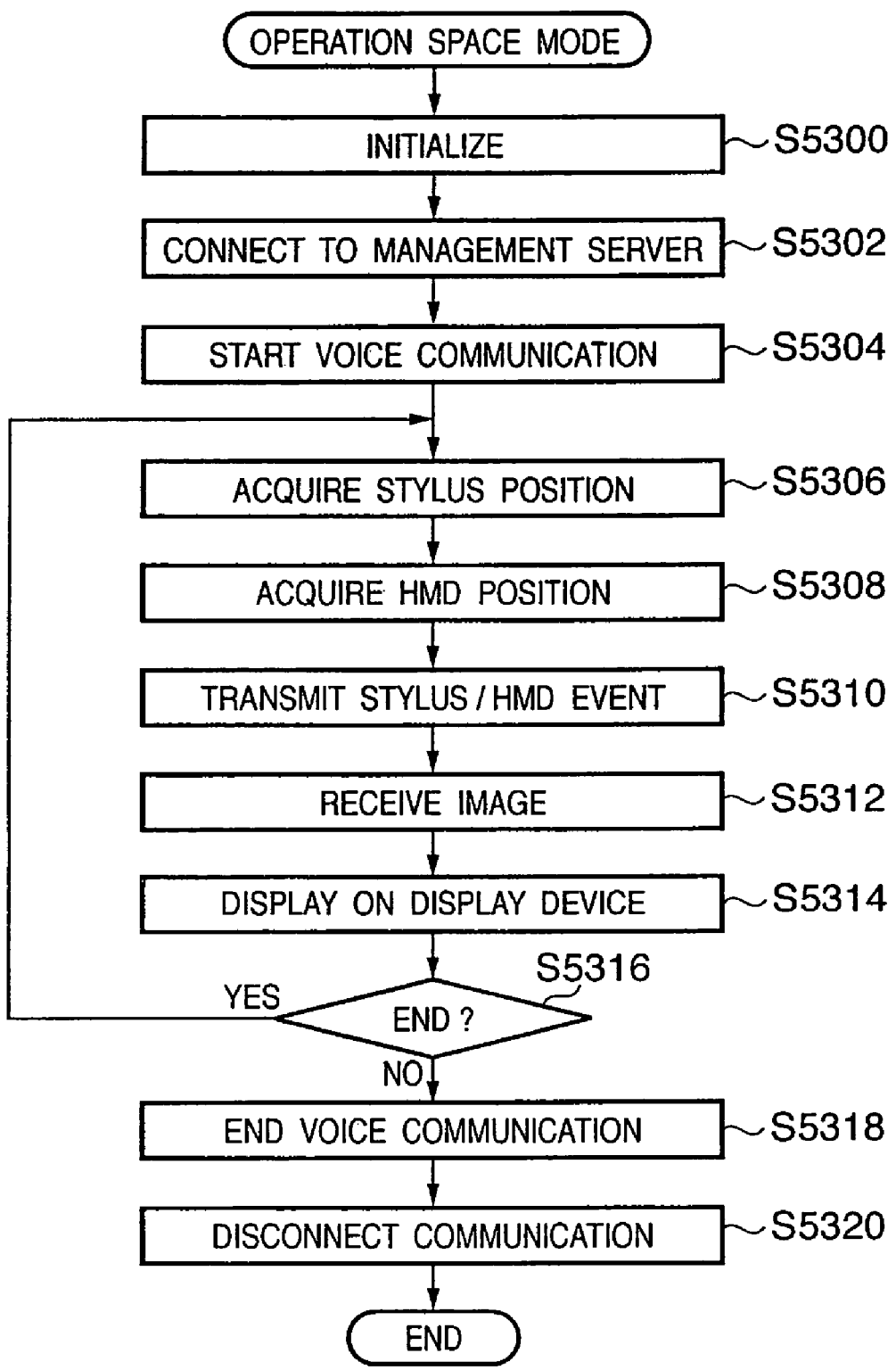
FIGS. 17A to 17C are flowcharts of instructor processing of the instructor mixed reality apparatus according to the fifth embodiment.
Figure 17B:
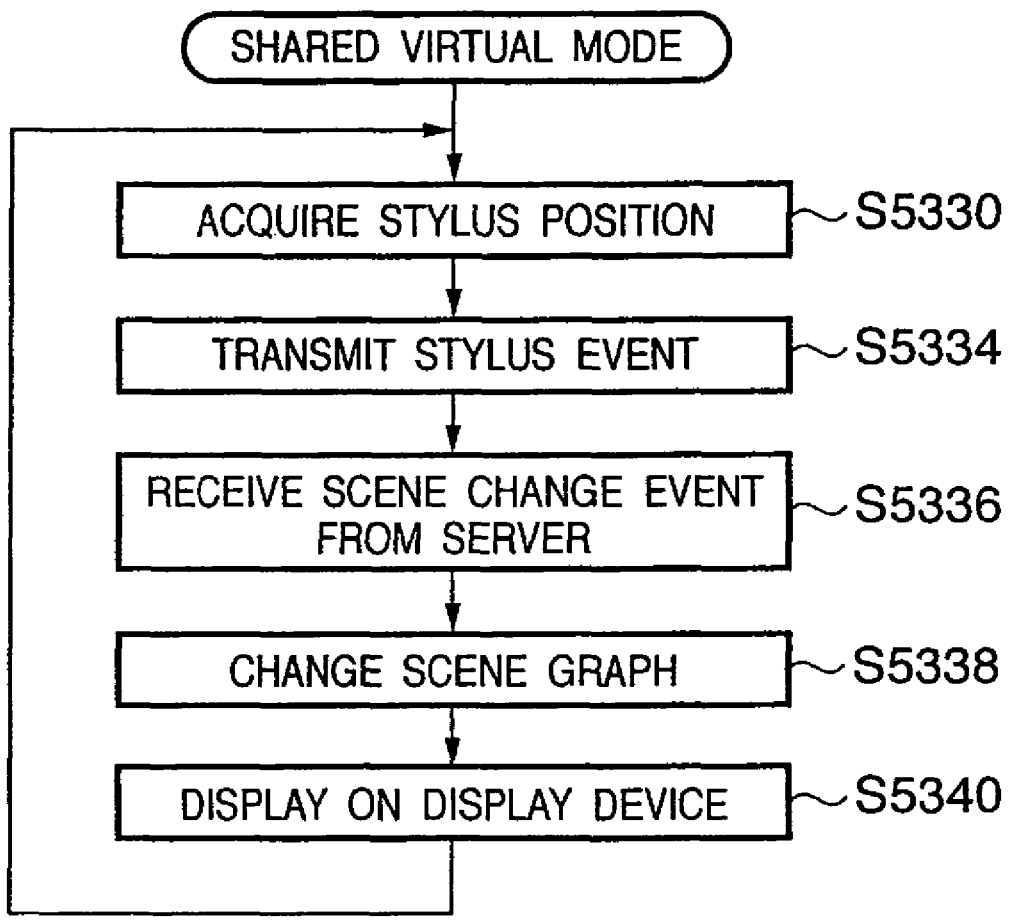
Figure 17C:
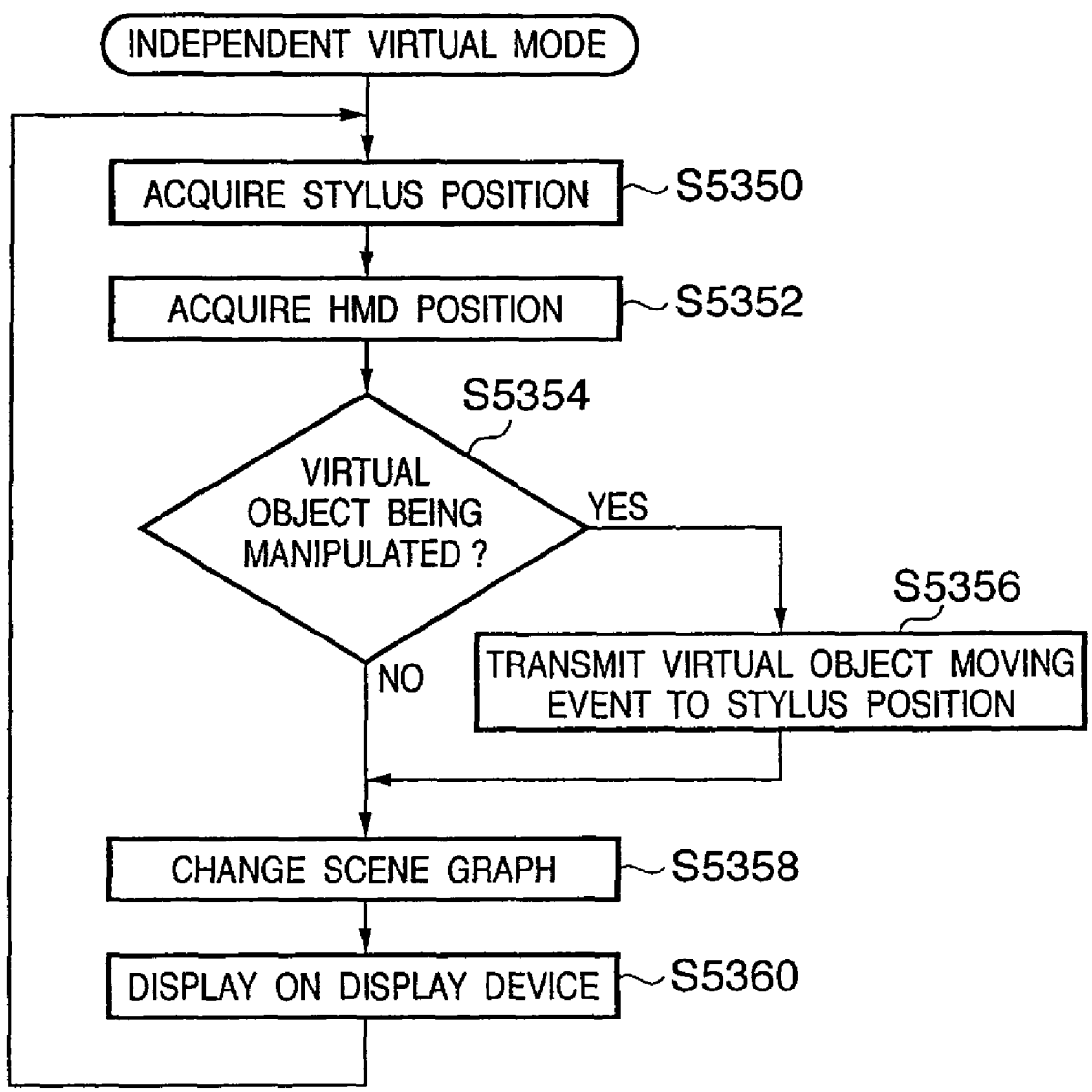

FIGS. 17A to 17C are flowcharts for explaining the operation of the instructor mixed reality apparatus 510b to instruct/support an operation in the mixed reality work space. Processing in the work space mode is executed first from step S5300.

In step S5300, the instructor mixed reality apparatus 510b is initialized. In this step, the position/orientation measuring unit 511b sets the world coordinate system of the space where the instructor exists. The output from the 3D sensor (to be described later) is expressed as data containing a set of six parameters, as in the above-described operator mixed reality apparatus 510a. An instructor manipulation object ID table (to be described later) is cleared.

In step S5302, network connection to the management server 560 is established to enable data transmission/reception between the apparatuses. Data such as virtual object information is downloaded through the virtual object transmitting/receiving unit 531b and stored in the virtual object management unit 516b.

In step S5304, voice communication connection and image communication connection to the operator mixed reality apparatus 510a are set, and voice communication is started. Instructor's voice is output from the speaker 527b and input to the microphone 528b. Hence, conversation by voice is possible during the operation. Images from the operator mixed reality apparatus can be received through the image receiving unit 533b.

In step S5306, the 3D position/orientation information (xs, ys, zs, αs, βs, γs) of the instructor stylus 541b is read out, input to the position/orientation measuring unit 511b, and held in the virtual object management unit 516b.

In step S5308, the position/orientation (xh, yh, zh, αh, βh, γh) of the instructor viewpoint is read out from the HMD 3D position sensor 521b, input to the position/orientation measuring unit 511b, and held in the virtual object management unit 516b.

In step S5310, the 3D position/orientation data of the stylus and HMD obtained in steps S5306 and S5308 are transmitted to the management server 560.

In step S5312, left and right images from the image transmitting unit 533a of the operator mixed reality apparatus are received by the image receiving unit 533b and decoded by the image decoding unit 532b.

In step S5314, the decoded left and right images are written in the image output unit 517 and displayed on the left display device 523bL and right display device 523bR of the instructor HMD 520b, respectively.

In step S5316, if an end command of the instructor mixed reality apparatus is input, the flow advances to voice communication end processing in step S5318. Otherwise, the flow returns to step S5306 to repeat the processing.

In step S5318, the voice processing is ended by disconnecting the voice communication connection and image communication connection. In step S5320, communication with the management server 560 is disconnected, thereby ending the processing.

Figure 18A:
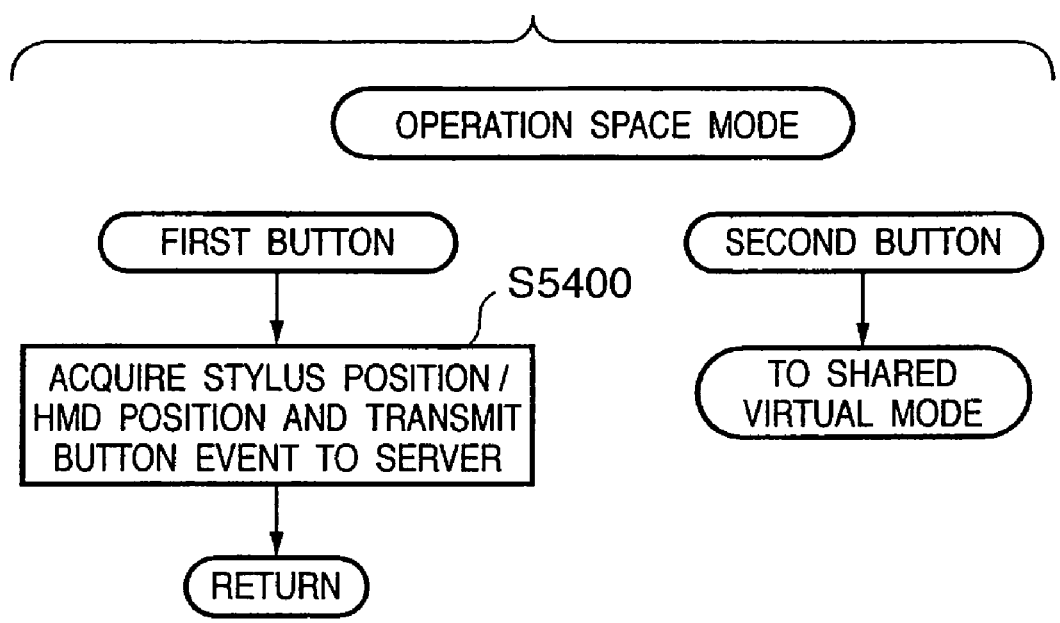
FIGS. 18A to 18C are flowcharts of button event processing of the instructor mixed reality apparatus according to the fifth embodiment.

FIG. 18A shows button event processing when the button of the instructor stylus is pressed in the work space mode. When the stylus first button 547 is pressed, step S5400 is activated. In step S5400, the positions/orientations of the stylus and HMD of the instructor are read out from the virtual object management unit 516b and transmitted to the management server 560. Then, the flow returns to the flow of the work space mode in FIG. 17A. When the stylus second button 548 is pressed, the flow advances to processing in the shared virtual mode (to be described later). The processing in the shared virtual mode will be described with reference to the flowchart shown in FIG. 17B.

In step S5330, the 3D position/orientation information (xs, ys, zs, αs, βs, γs) of the instructor stylus 541b is read out, input to the position/orientation measuring unit 511b, and held in the virtual object management unit 516b.

In step S5334, the 3D position/orientation data of the stylus obtained in steps S5330 and S5332 is transmitted to the management server 560.

In step S5336, information about the operator pointer, instructor pointer, and a change of the virtual object is received through the virtual object transmitting/receiving unit 531b as an event from the management server 560.

In step S5338, the scene graph stored in the virtual object management unit 516b is changed on the basis of the change information obtained in step S5336.

In step S5340, the image generation unit 513b generates a left CG image and right CG image viewed from the instructor viewpoint (position/orientation of the instructor HMD,) on the basis of the scene graph changed in step S5338. The CG images are output to the image output unit 517 and displayed on the display device 523b. The flow returns to steps 5330.

Figure 18B:
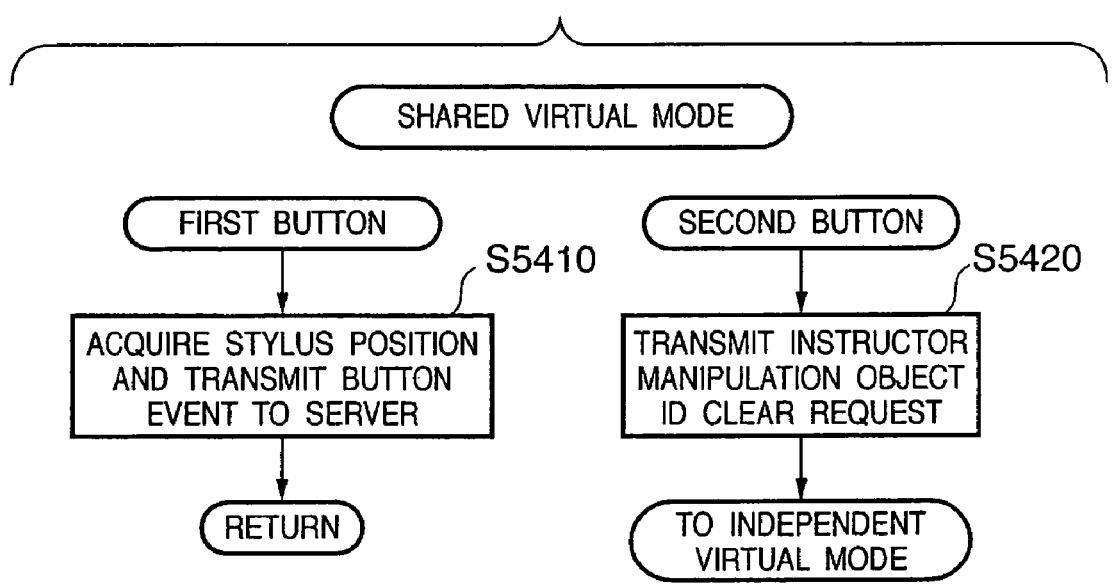

With the above-described processing, a virtual space image containing only the virtual object from the instructor viewpoint is displayed on the instructor HMD. FIG. 18B shows processing when the button of the instructor stylus is pressed in the shared virtual mode.

When the stylus first button 547 is pressed, step S5410 is activated. In step S5410, the position/orientation of the instructor stylus is read out from the virtual object management unit 516b and transmitted to the management server 560. Then, the flow returns to the flow of the shared virtual mode in FIG. 17B. When the stylus second button 548 is pressed, the flow advances to step S5420 to transmit, to the management server 560, a request to clear an appropriate field of the instructor manipulation object ID table stored in the virtual object management unit 562 of the management server. Then, the flow advances to processing in the independent virtual mode (to be described later).

The processing in the independent virtual mode will be described with reference to the flowchart shown in FIG. 17C.

In step S5350, the 3D position/orientation information (xs, ys, zs, αs, βs, γs) of the instructor stylus 541b is read out, input to the position/orientation measuring unit 511b, and held in the virtual object management unit 516b.

In step S5352, the position/orientation (xh, yh, zh, αh, βh, γh) of the instructor viewpoint is read out from the HMD 3D position sensor 521b, input to the position/orientation measuring unit 511b, and held in the virtual object management unit 516b.

Figure 24:
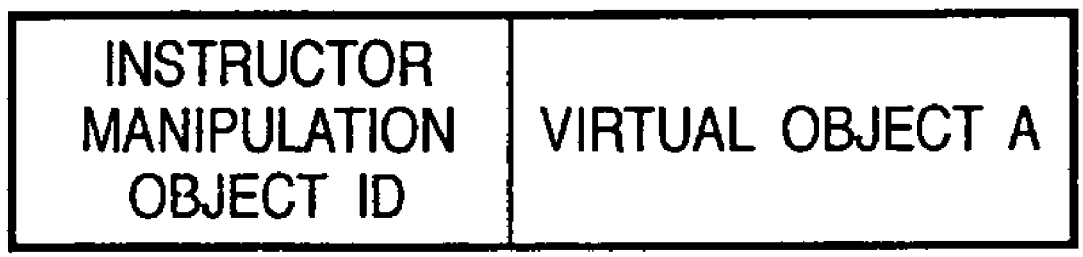
FIG. 24 is a view showing an example of an instructor manipulation object ID table.

In step S5354, it is determined by checking the instructor manipulation object ID table shown in FIG. 24 whether the instructor is currently manipulating the virtual object. This table is held in the virtual object management unit 516b of the instructor mixed reality apparatus and stores a value representing which virtual object is being manipulated by the instructor. The example shown in FIG. 24 indicates that the instructor is manipulating a virtual object A. If no virtual object is being manipulated, null is stored. When it is determined by checking this table that the instructor is manipulating the virtual object, the flow advances to step S5356. Otherwise, the flow advances to step S5358.

In step S5356, an event to move the virtual object to the instructor stylus position is issued.

In step S5358, if the instructor stylus position or virtual object is changed, the change is reflected on the scene graph, and the position/orientation data to the HMD is set to the viewpoint position.

In step S5360, the image generation unit 513b generates a left CG and right CG from the data of the scene graph. The CGs are written in the image output unit 517 and displayed on the display device 523b.

In the instructor mixed reality apparatus 510b, an event from the management server is received on the background, and a scene graph is appropriately changed, in addition to the above-described flow.

Figure 18C:
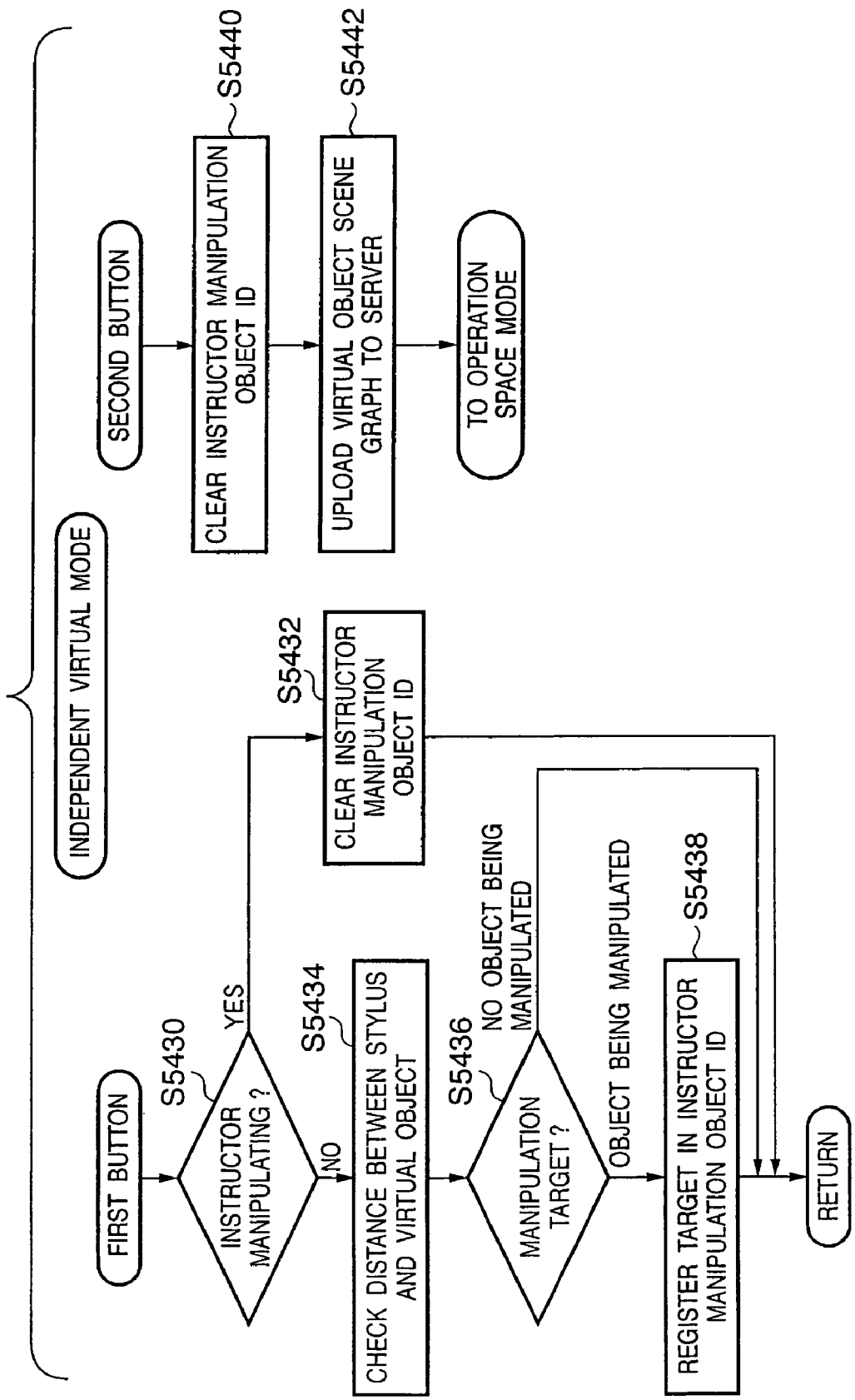

FIG. 18C shows processing when the button of the instructor stylus is pressed in the independent virtual mode. When the stylus first button 547 is pressed, step S5430 is activated. In step S5430, it is determined by checking the instructor manipulation object ID table shown in FIG. 24 whether the instructor is manipulating a virtual object. If YES in step S5430, the flow advances to step S5432. Otherwise, the flow advances to step S5434.

In step S5432, the instructor manipulation object ID table in FIG. 24 is cleared, null is stored, and the flow returns to the flow of the independent virtual mode in FIG. 17C.

In step S5434, the distances between the instructor stylus position and all virtual objects present in the virtual space are compared. The flow advances to step S5436.

In step S5436, if there is a virtual object whose distance is equal to or less than a predetermined threshold value (if there are a plurality of virtual objects, one with the shortest distance is selected), the virtual object is set to the manipulation target, and the flow advances to step S5438. Otherwise, the flow returns to the flow of the independent virtual mode in FIG. 17C.

In step S5438, the manipulation target ID obtained in step S5436 is written in the instructor manipulation object ID table in FIG. 24, and the first button event processing is end.

When the stylus second button 548 is pressed, step S5440 is activated. In step S5440., the instructor manipulation object ID table in FIG. 24 is cleared, and null is stored.

In step S5442, a request to upload the whole scene graph of the virtual object stored in the virtual object management unit 516b to the virtual object management unit 562 of the management server is sent to the management server. The data is uploaded, and processing is executed from step S5306 of the flow of the work space mode.

Processing in the management server 560 will be described next with reference to the flowcharts shown in FIGS. 19A to 19H. The management server receives and processes requests and events from the operator mixed reality apparatus 510a and instructor mixed reality apparatus 510b.

Operator stylus processing is activated upon receiving a stylus/HMD position event from the operator mixed reality apparatus. In step S5500, the positions/orientations of the operator stylus and HMD are reflected on the scene graph stored in the virtual object management unit 562.

In step S5502, it is determined by checking the operator/instructor manipulation object ID table shown in FIG. 23 whether the operator is manipulating a virtual object. The operator/instructor manipulation object ID table is present in the virtual object management unit 562 and stores the IDs of virtual objects which are being manipulated by the operator and instructor. In the example shown in FIG. 23, since the operator is manipulating no virtual object, null is stored. The instructor is manipulating a virtual object C. If a virtual object ID is present in the operator manipulation object ID, the flow advances to step S5504. Otherwise, the flow advances to step S5506.

In step S5504, the virtual object which is being manipulated is moved to the stylus position updated in step S5500, and the scene graph stored in the virtual object management unit 562 is changed. Then, the flow advances to step S5506.

In step S5506, the pieces of updated information of the operator stylus, HMD, and virtual object are transmitted to the operator host, and the operator stylus processing is ended.

Operator button processing is activated when the operator presses the button of the stylus. In step S5510, it is determined by checking the operator manipulation object ID in FIG. 23 whether the operator is currently manipulating a virtual object. If null is stored, it is determined that the operator is not manipulating any virtual object, and the flow advances to step S5514. If an operator manipulation object ID is stored, it is determined that the operator is manipulating a virtual object, and the flow advances to step S5512.

In step S5512, the contents of the operator manipulation object ID in FIG. 23 are replaced with null, and the operator button event processing is ended.

In step S5514, the received current operator stylus position is compared with the positions of all virtual objects in the operator mixed reality space, and the flow advances to the next step.

In step S5516, if there is a virtual object whose distance is equal to or less than a predetermined threshold value (if there are a plurality of virtual objects, one with the shortest distance is selected), the virtual object is set to the manipulation target, and the flow advances to step S5518. Otherwise, the operator button event processing is ended.

In step S5518, the manipulation target ID obtained in the preceding step and the instructor manipulation object ID in FIG. 23 are checked. If the IDs coincide, it is determined that the instructor is manipulating a virtual object, and the operator button event processing is ended. Otherwise, the flow advances to step S5520.

In step S5520, the manipulation target ID obtained in step S5516 is written in the operator manipulation object ID in FIG. 23, and the operator button event processing is ended.

Instructor stylus processing I is an event processing flow transmitted in step S5310 in the work space mode in FIG. 17A. In step S5530, the position/orientation (xh, yh, zh, $\alpha$h, $\beta$h, $\gamma$h) as the viewpoint position of the instructor from the HMD 3D position sensor 521b and the 3D position/orientation information (xs, ys, zs, $\alpha$s, $\beta$s, $\gamma$s) of the instructor stylus 541b are received. These are values in the world coordinate system of the space where the instructor exists. The position/orientation of the stylus is transformed into the relative position from the viewpoint position/orientation, thereby calculating the instructor stylus relative position (xd, yd, zd, $\alpha$d, $\beta$d, $\gamma$d)=(xs−xh, ys−yh, zs−zh, $\alpha$s−$\alpha$h, $\beta$s−$\beta$h, $\gamma$s−$\gamma$h).

In step S5532, the scene graph in the virtual object management unit 562 is changed on the basis of the instructor stylus relative position calculated in the preceding step as a new stylus event.

In step S5534, it is determined by checking the instructor manipulation object ID in the operator/instructor manipulation object ID table whether the instructor is manipulating a virtual object. If the instructor manipulation object ID is null, it is determined that the instructor is manipulating no virtual object, and the flow advances to step S5538. Otherwise, it is determined that the instructor is manipulating a virtual object, and the flow advances to step S5536.

In step S5536, the virtual object which is being manipulated is moved to the stylus position updated in step S5532, and the scene graph stored in the virtual object management unit 562 is changed. Then, the flow advances to step S5538.

In step S5538, the pieces of updated information of the instructor stylus, HMD, and virtual object are transmitted to the operator mixed reality apparatus 510a, and the instructor stylus processing I is ended.

Instructor stylus processing II is an event processing flow transmitted in step S5334 in the shared virtual mode in FIG. 17B. In step S5540, the position/orientation as the viewpoint position of the instructor from the HMD 3D position sensor 521b and the 3D position/orientation information event of the instructor stylus 541b are received. The scene graph in the virtual object management unit 562 is changed on the basis of these pieces of information.

In step S5542, it is determined by checking the instructor manipulation object ID in the operator/instructor manipulation object ID table whether the instructor is manipulating a virtual object. If the instructor manipulation object ID is null, it is determined that the instructor is manipulating no virtual object, and the flow advances to step S5546. Otherwise, it is determined that the instructor is manipulating a virtual object, and the flow advances to step S5544.

In step S5544, the virtual object which is being manipulated is moved to the stylus position updated in step S5540, and the scene graph stored in the virtual object management unit 562 is changed. Then, the flow advances to step S5546.

In step S5546, the pieces of updated information of the instructor stylus and virtual object are transmitted to the operator mixed reality apparatus 510a and instructor mixed reality apparatus 510b, and the instructor stylus processing II is ended.

Instructor first button I processing is event processing transmitted to the server by the processing in step S5400 in FIG. 18A, which is activated when the instructor presses the stylus first button in the work space mode. In step S5550, the position/orientation (xh, yh, zh, $\alpha$h, $\beta$h, $\gamma$h) as the viewpoint position of the instructor from the HMD 3D position sensor 521b and the 3D position/orientation information (xs, ys, zs, $\alpha$s, $\beta$s, $\gamma$s) of the instructor stylus 541b are received. These are values in the world coordinate system of the space where the instructor exists. The position/orientation of the stylus is transformed into the relative position from the viewpoint position/orientation, thereby calculating the instructor stylus relative position (xd, yd, zd, $\alpha$d, $\beta$d, $\gamma$d)=(xs−xh, ys−yh, zs−zh, $\alpha$s−$\alpha$h, $\beta$s−$\beta$h, $\gamma$s−$\gamma$h).

In step S5552, it is determined by checking the instructor manipulation object ID shown in FIG. 23 whether the instructor is manipulating a virtual object now. If the instructor manipulation object ID is null, it is determined that the instructor is manipulating no virtual object, and the flow advances to step S5556. Otherwise, it is determined that the instructor is manipulating a virtual object, and the flow advances to step S5554.

In step S5554, the contents of the instructor manipulation object ID in FIG. 23 are replaced with null, and the instructor button event processing is ended.

In step S5556, the current instructor stylus position stored in the virtual object management unit 562 is compared with the positions of all virtual objects in the operator mixed reality space, and the flow advances to the next step.

In step S5558, if there is a virtual object whose distance is equal to or less than a predetermined threshold value (if there are a plurality of virtual objects, one with the shortest distance is selected), the virtual object is set to the manipulation target, and the flow advances to step S5560. Otherwise, the instructor button event processing is ended.

In step S5560, the manipulation target ID obtained in the preceding step and the operator manipulation object ID in FIG. 23 are checked. If the IDs coincide, it is determined that the operator is manipulating the manipulation target, and the instructor button event processing I is ended. Otherwise, the flow advances to step S5562.

In step S5562, the manipulation target ID obtained in step S5558 is written in the instructor manipulation object ID in FIG. 23, and the instructor button event processing I is ended.

Instructor first button II processing is event processing transmitted to the server by the processing in step S5410 in FIG. 18B, which is activated when the instructor presses the stylus first button in the shared virtual mode. In step S5570, it is determined by checking the instructor manipulation object ID shown in FIG. 23 whether the instructor is manipulating a virtual object now. If the instructor manipulation object ID is null, it is determined that the instructor is manipulating no virtual object, and the flow advances to step S5574. Otherwise, it is determined that the instructor is manipulating a virtual object, and the flow advances to step S5572.

In step S5572, the contents of the instructor manipulation object ID in FIG. 23 are replaced with null, and the instructor button event processing is ended.

In step S5574, the received current instructor stylus position is compared with the positions of all virtual objects in the operator mixed reality space, and the flow advances to the next step.

In step S5576, if there is a virtual object whose distance is equal to or less than a predetermined threshold value (if there are a plurality of virtual objects, one with the shortest distance is selected), the virtual object is set to the manipulation target, and the flow advances to step S5578. Otherwise, the instructor button event processing is ended.

In step S5578, the manipulation target ID obtained in the preceding step and the operator manipulation object ID in FIG. 23 are checked. If the IDs coincide, it is determined that the operator is manipulating the manipulation target, and the instructor button event processing II is ended. Otherwise, the flow advances to step S5580.

In step S5580, the manipulation target ID obtained in step S5576 is written in the instructor manipulation object ID in FIG. 23, and the instructor button event processing II is ended.

Instructor manipulation object ID clear processing is event processing transmitted to the server by the processing in step S5420 in FIG. 18B, which is activated when the instructor presses the stylus second button in the shared virtual mode. In step S5584, the contents of the instructor manipulation object ID in the instructor/operator manipulation object ID table stored in the virtual object management unit 562 are replaced with null, and the instructor manipulation object ID clear processing is ended.

Instructor scene graph upload processing is event processing transmitted to the server by the processing in step S5442 in FIG. 18C, which is activated when the instructor presses the stylus second button in the independent virtual mode. In step S5588, the scene graph stored in the virtual object management unit 562 is replaced with the scene graph of the virtual object uploaded from the instructor mixed reality apparatus. In step S5590, the information of the replaced scene graph is downloaded to the operator mixed reality apparatus, and the processing is ended.

In this embodiment, the stylus second button 548 shown in FIG. 14 is used as the operator mode switching button. However, the present invention is not limited to this. The mode switching function may be assigned to two buttons to advance to the next mode and return to the preceding mode. Alternatively, buttons equal in number to modes may be prepared and assigned functions of advancing to the respective modes.

The display device presented to the operator when the instructor is in the shared virtual mode shows an image in which a virtual object is laid out on the background of the virtual space as shown in FIG. 15B. However, a background in which the image of the operator mixed reality space (e.g., the image shown in FIG. 15A) is frozen at the moment when the instructor enters the shared virtual mode may be used. In this case, even when the operator changes the viewpoint, the background image does not change. However, since the viewpoint of the shared virtual object can be changed freely, the spirit of the present invention is not damaged.

Sixth Embodiment

In the fifth embodiment, the instructor can shift to the work space mode, shared virtual mode, or independent virtual mode at an arbitrary timing. However, the image on the operator display device 523a does not reflect the mode change of the instructor. Since the operator cannot determine the mode of the instructor, smooth communication may be impossible. In the sixth embodiment, the operator can identify the mode of the instructor while seeing the operator mixed reality space. More specifically, the color of an instructor pointer 541b is changed depending on the mode. For example, when the instructor is in the work space mode in FIG. 13A, the instructor pointer 541b changes to green. In the shared virtual mode, the instructor pointer 541b changes to blue. In the independent virtual mode, the instructor pointer 541b changes to brown. Hence, the operator can determine the mode of the instructor by the color of the instructor pointer in the operator mixed reality space. Detailed processing of this operation will be described below.

Figure 20A:
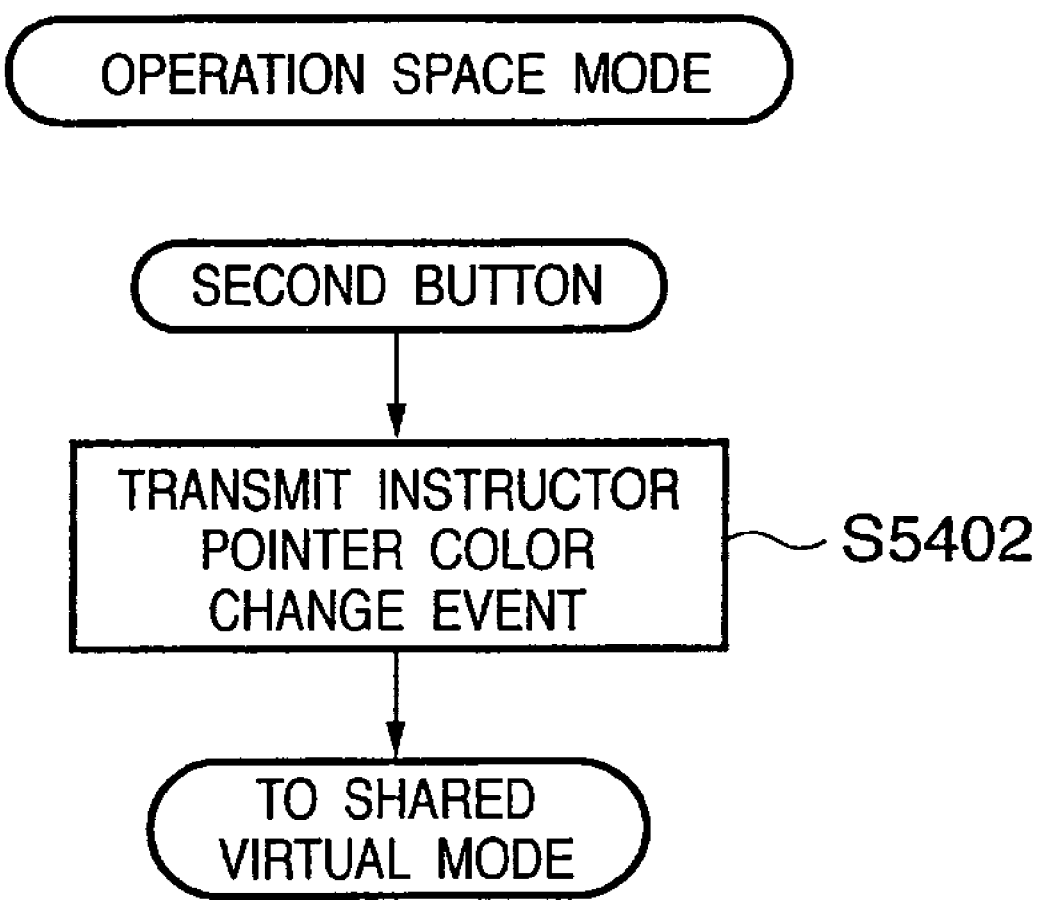
Figure 20C:
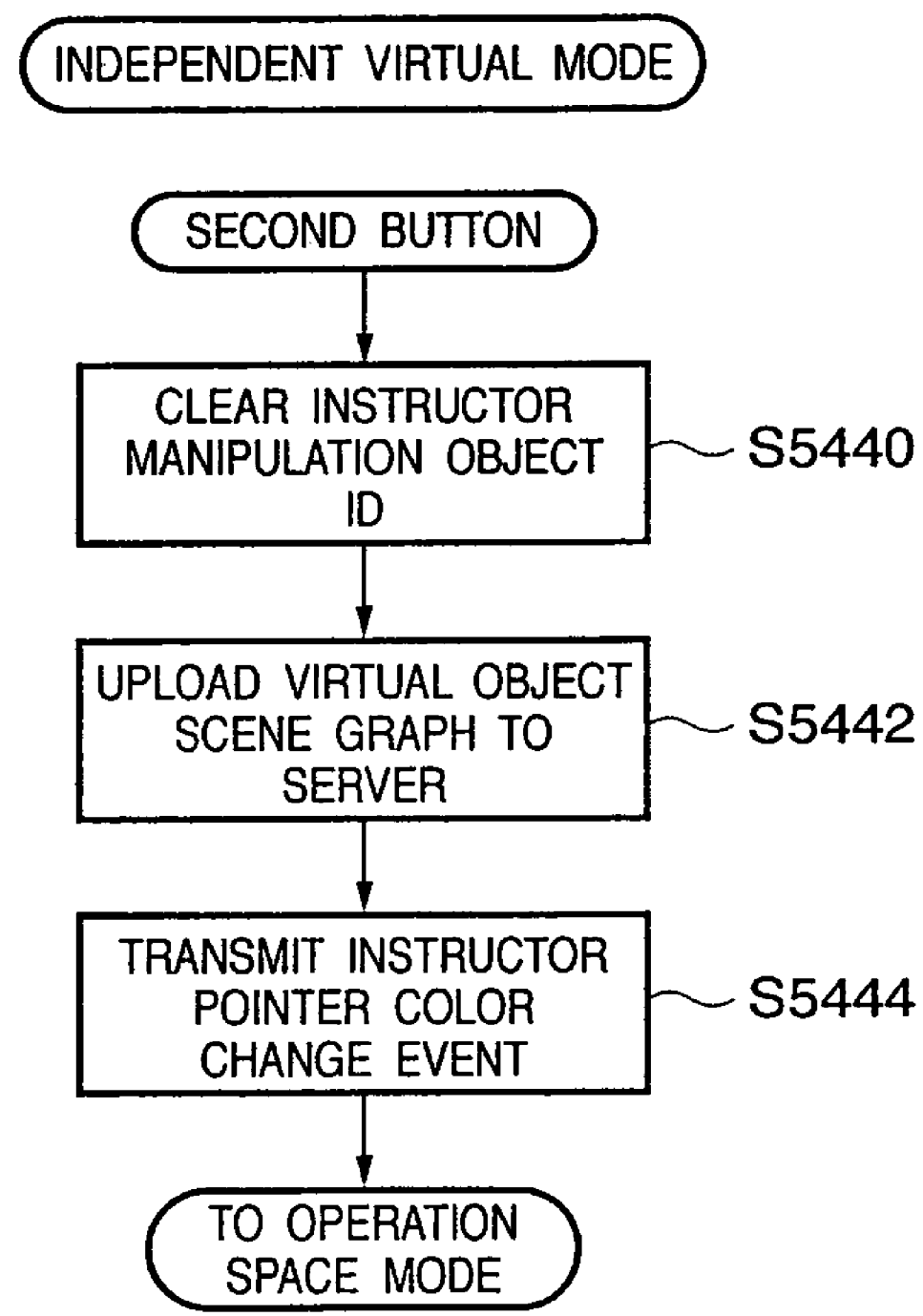
Figure 20D:
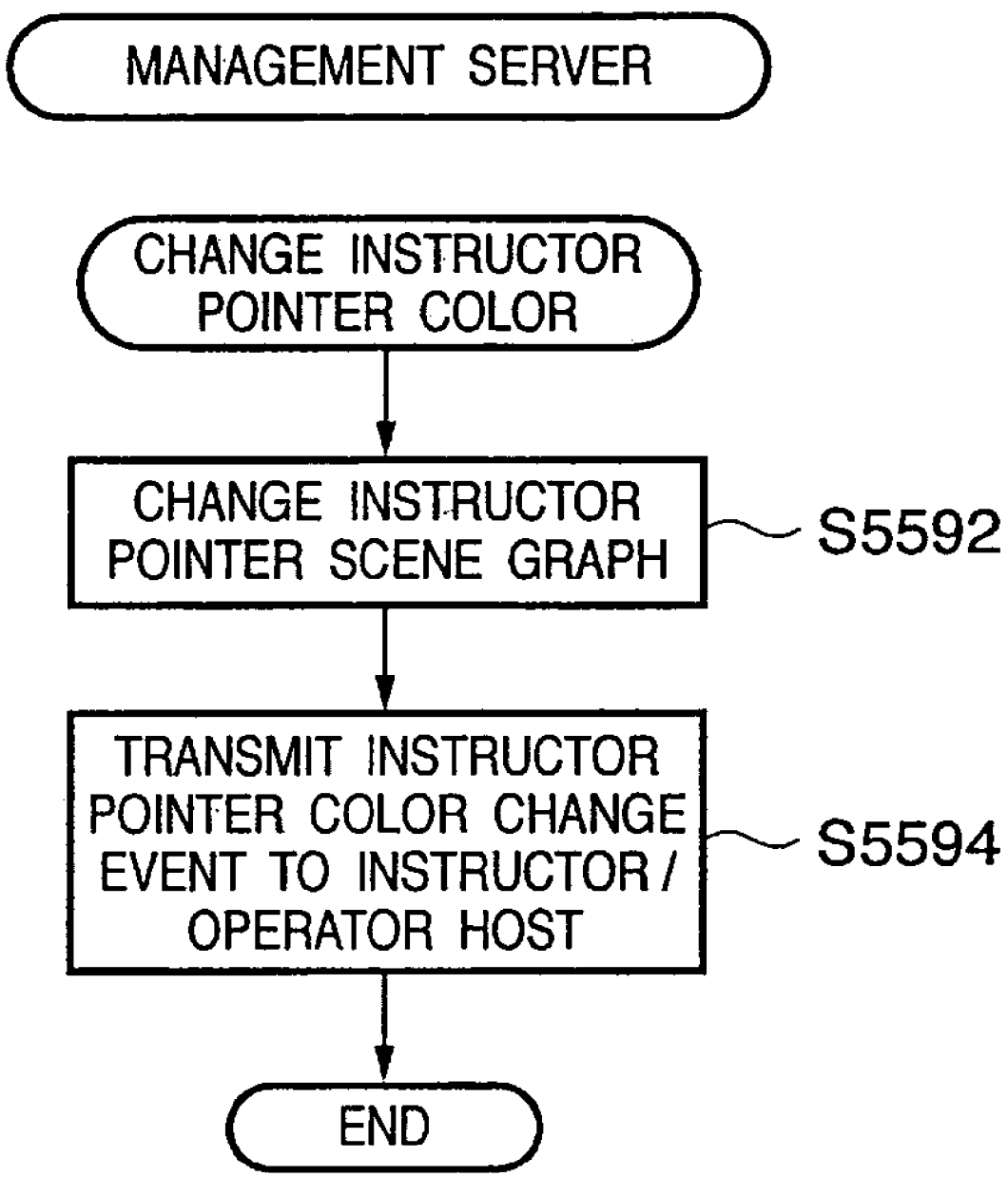

Assume that the color of the pointer in the work space mode is set at the time of initialization processing in step S5300 of the instructor processing flow shown in FIGS. 17A to 17C. In the above-described example, blue is set. Second button processing activated when the operator presses the stylus second button in each of the modes shown in FIGS. 18A to 18C is different from the first embodiment. This will be described with reference to FIGS. 20A to 20D. FIG. 20A shows second button processing in the work space mode. Step S5402 to transmit an operator pointer color change event (in the above-described example, a change event to green) to the management server is added to the fifth embodiment. In second button processing in the shared virtual mode, processing in step S5422 (in the above-described example, transmission of a change event to brown) is added. In second button processing in the independent virtual mode, processing in step S5444 (in the above-described example, transmission of a change event to blue) is added. FIG. 20D shows processing when the management server receives color change processing. In step S5592, the pointer in the scene graph stored in a virtual object management unit 562 is changed to the designated color. In step S5594, the color change event is transmitted to the operator mixed reality apparatus and instructor mixed reality apparatus. The operator mixed reality apparatus and instructor mixed reality apparatus change the color of the instructor pointer 541b in a scene graph stored in them by the color change event. With this processing, the operator pointer can be displayed in different colors depending on the mode of the operator.

In this embodiment, the operator can identify the mode of the instructor by the color of the instructor pointer. However, the present invention is not limited to the color, and any other visually identifiable thing such as the pointer shape may be used.

Seventh Embodiment

Figure 21A:
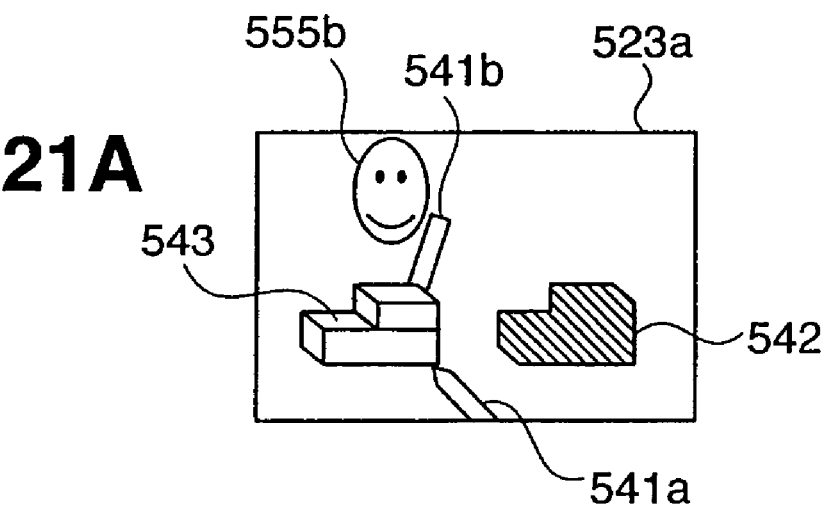
FIGS. 21A and 21B are views for explaining screen display examples of an operator mixed reality apparatus and instructor mixed reality apparatus according to the seventh embodiment.
Figure 21B:
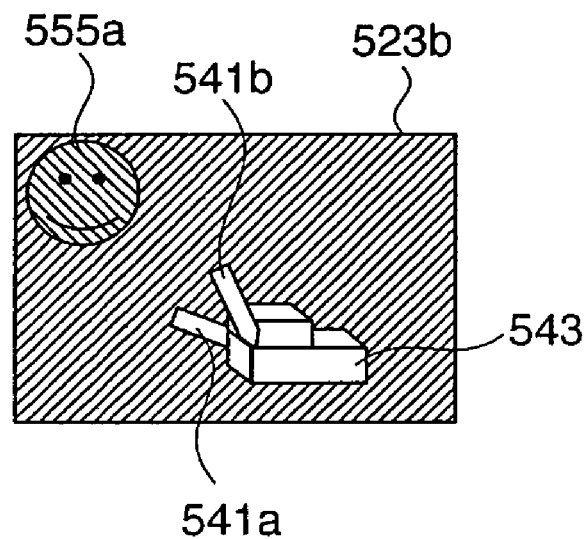

In the fifth embodiment, when the instructor is in the work space mode, both the instructor and operator share the operator viewpoint. When the instructor is in the shared virtual mode, the operator and instructor operate in separate viewpoints. At this time, the partner pointers are displayed in the images on the display devices seen by them. However, partner viewpoints cannot be known. In such a situation, since an operation instruction may be issued while seeing the shared virtual object from different viewpoints, misunderstanding may occur in communication. In the seventh embodiment, when the instructor is in the shared virtual mode, the instructor viewpoint is displayed on a display device 523a of the operator, and the operator viewpoint is displayed on a display device 523b of the instructor, allowing them to confirm partner viewpoints. FIGS. 21A and 21B show screen examples of the display devices when the instructor is in the shared virtual mode. FIG. 21A shows the screen of the operator display device 523a in which an instructor viewpoint 555b is displayed in addition to a virtual object 543, operator pointer 541a, and instructor pointer 541b. Similarly, an operator viewpoint 555a is shown in FIG. 21B. In this way, the operator and instructor can confirm partner viewpoints. Detailed processing of this operation different from the fifth embodiment will be described below.

Figure 19B:
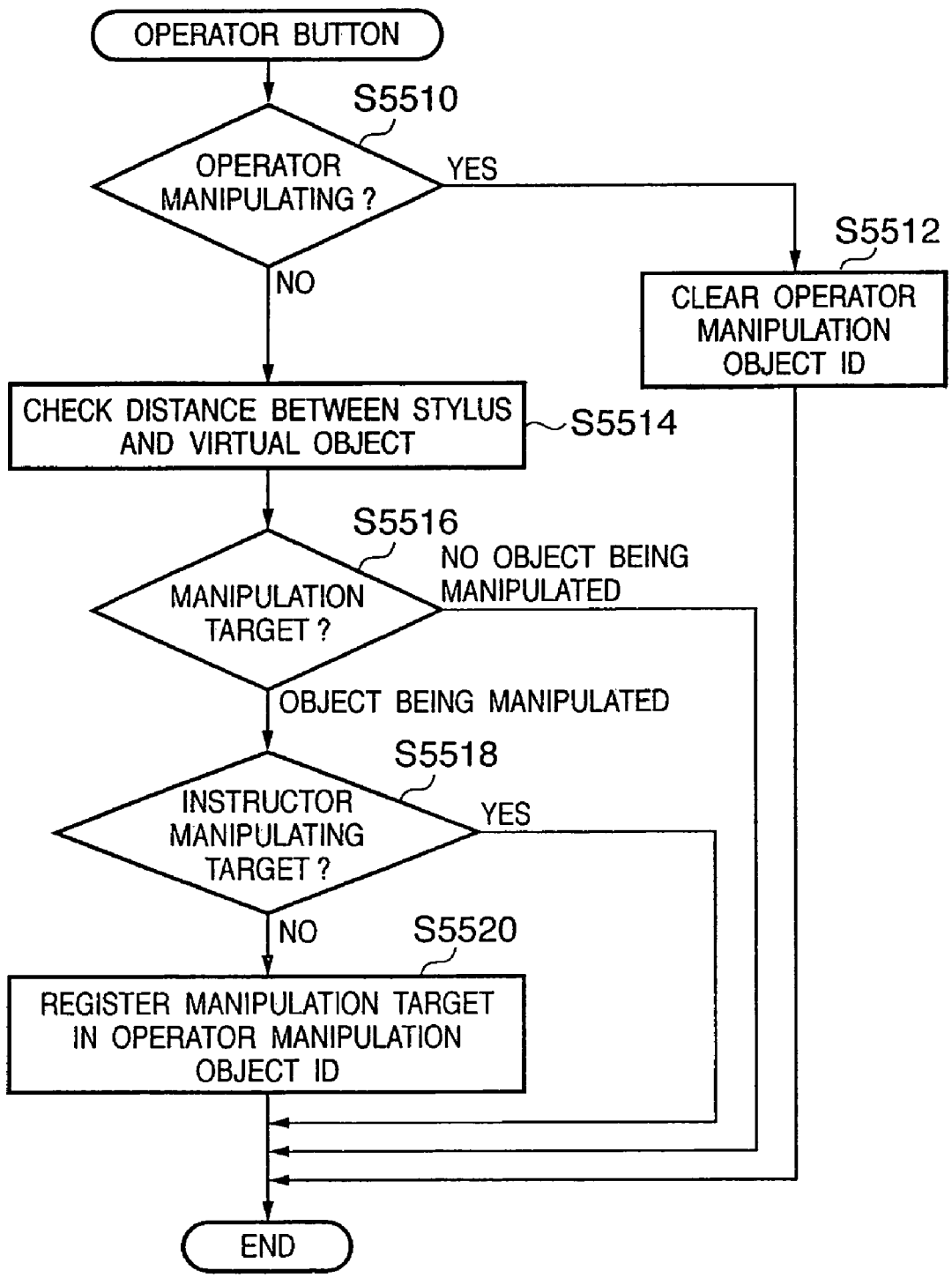
Figure 19C:
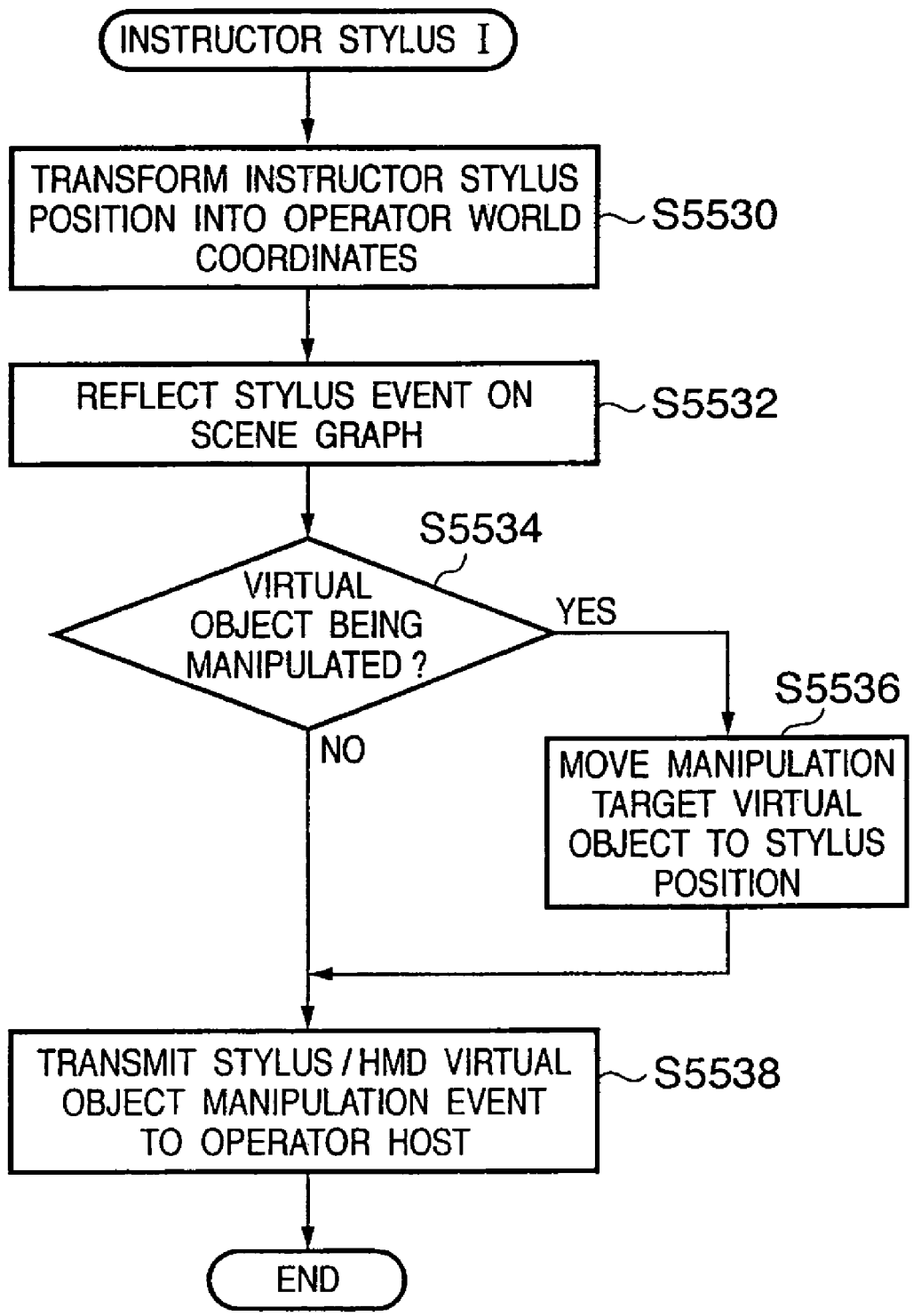
Figure 19D:
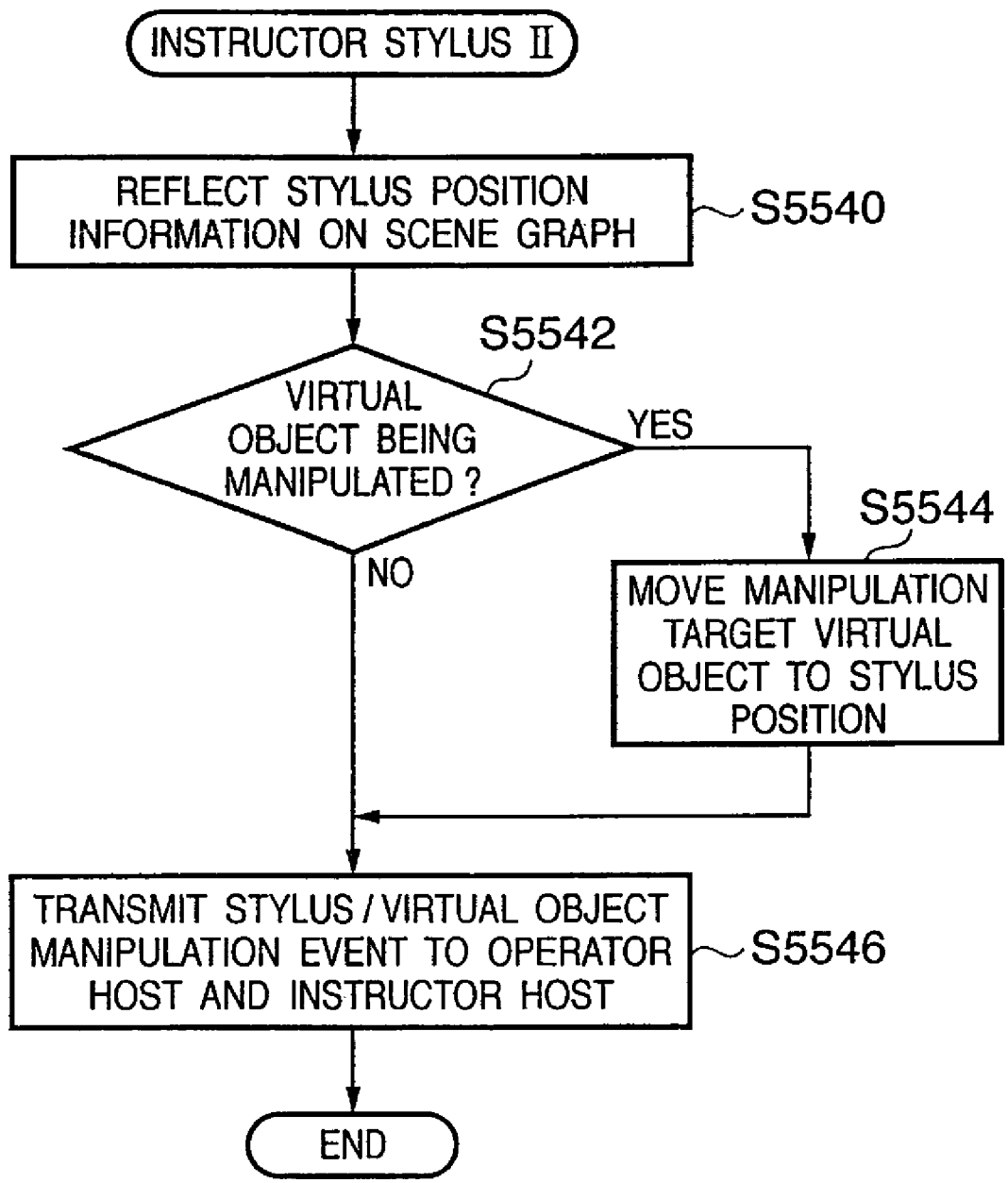
Figure 19E:
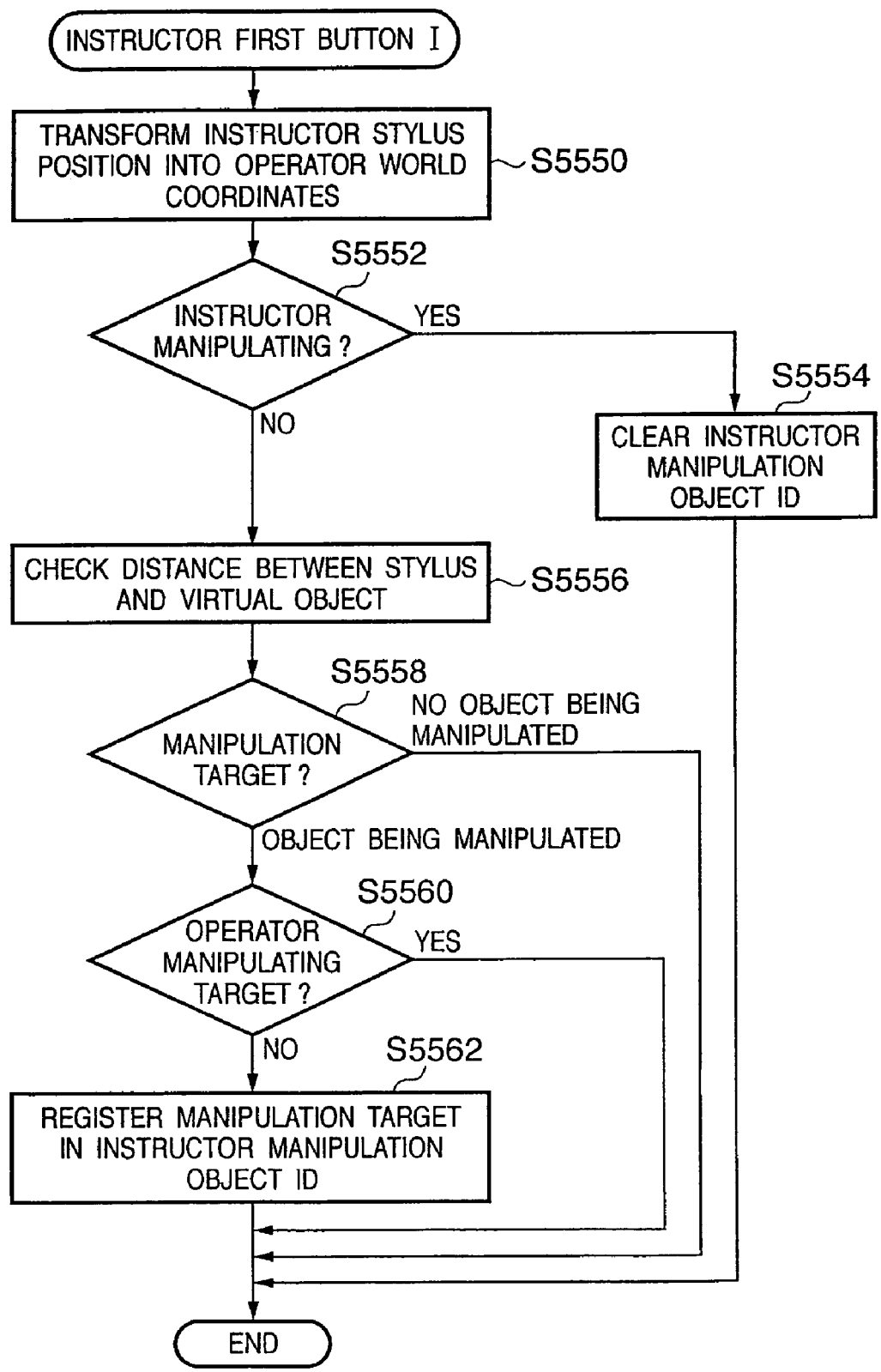
Figure 19F:
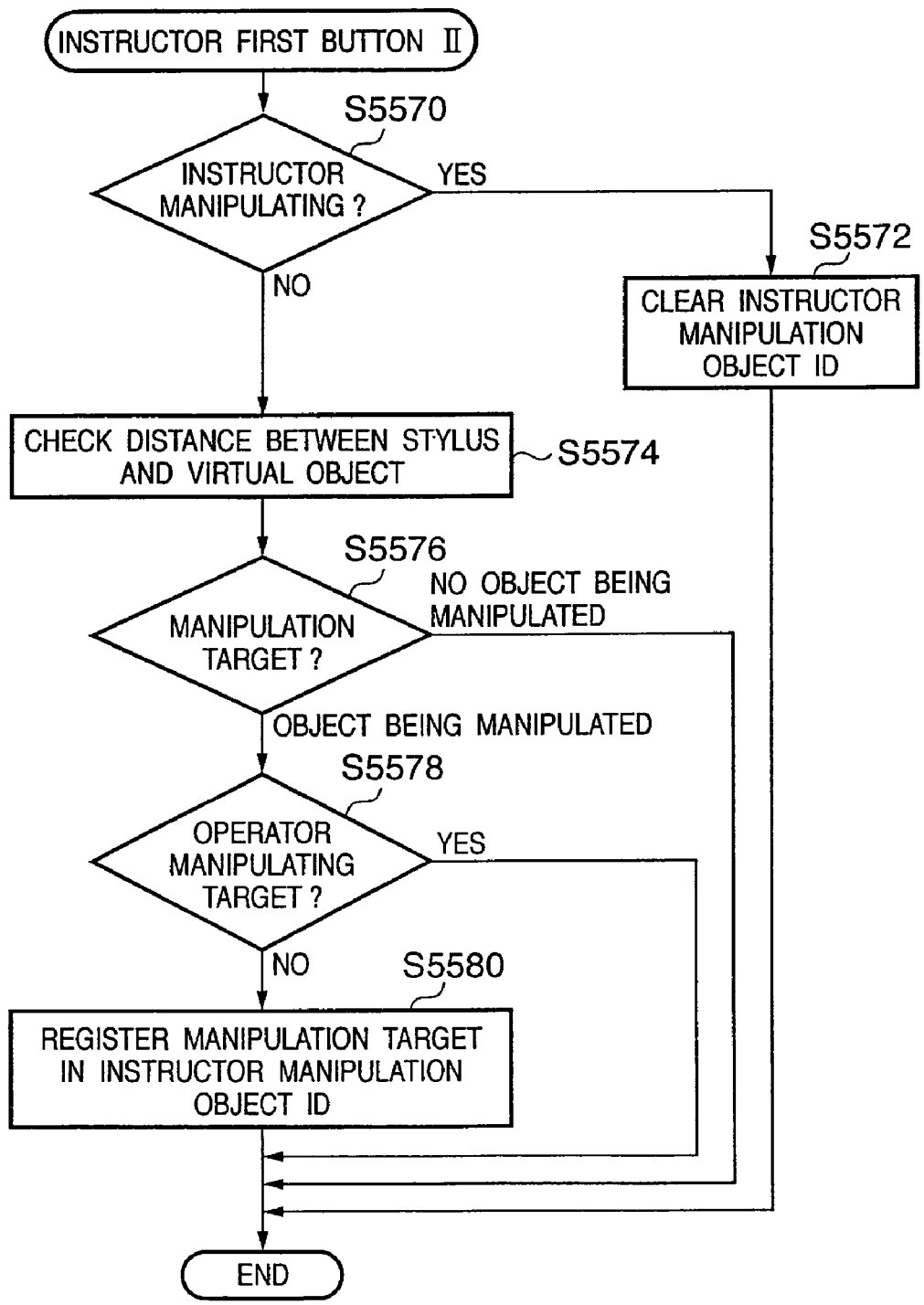
Figure 19G:
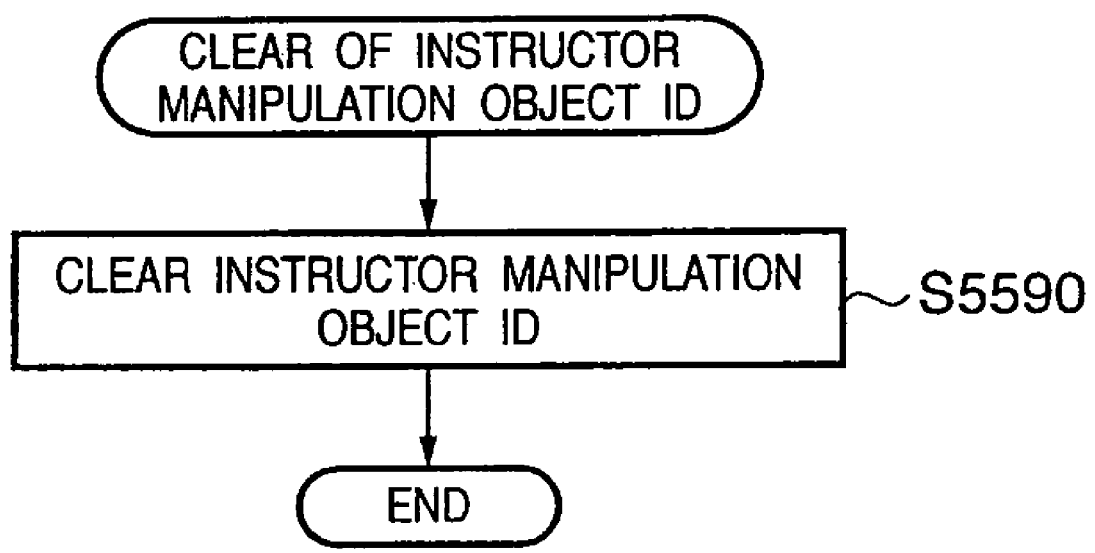
Figure 22A:
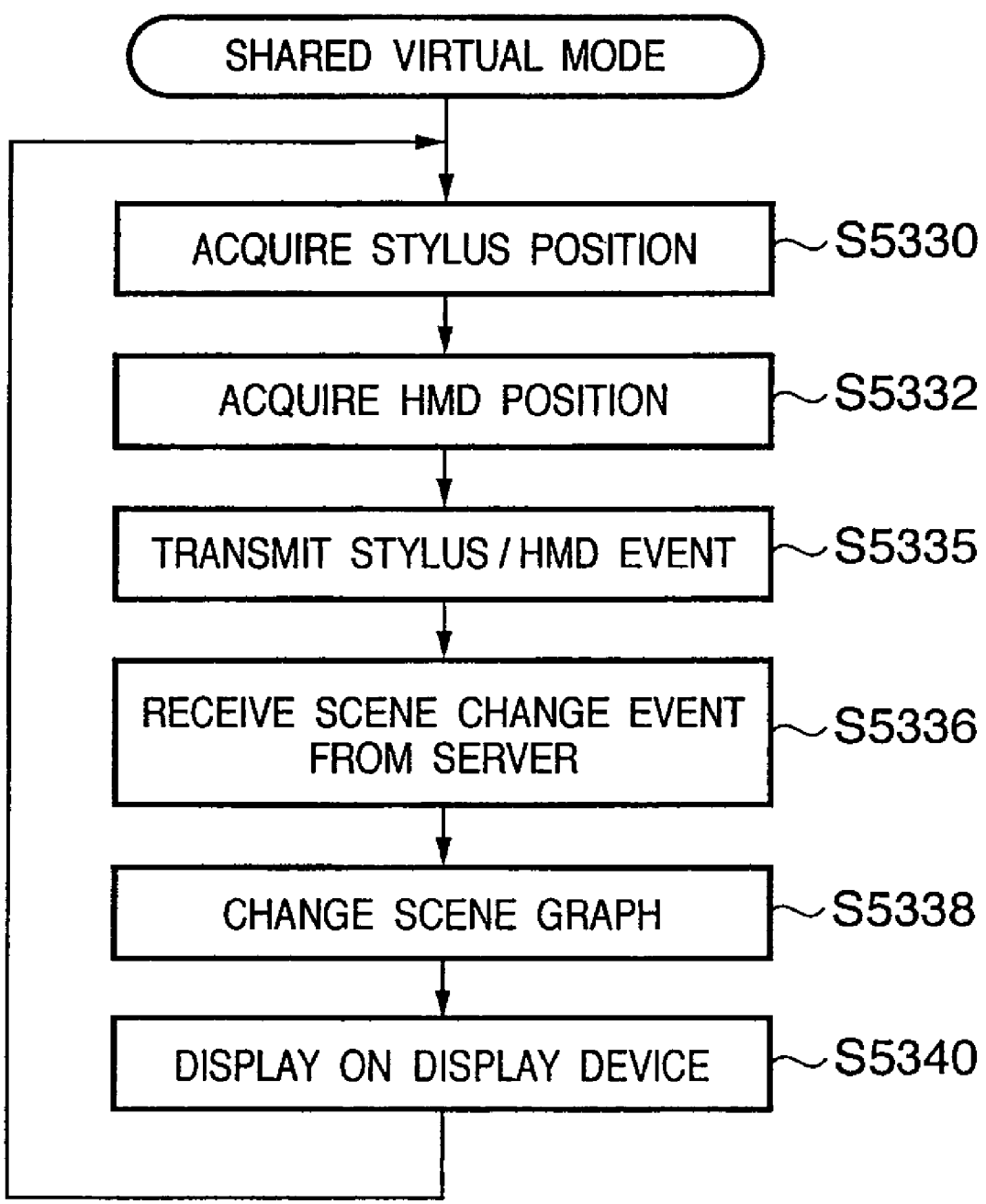
FIGS. 22A to 22C are flowcharts of part of instructor processing of the instructor mixed reality apparatus and reception event processing of the management server according to the sixth embodiment.
Figure 22B:
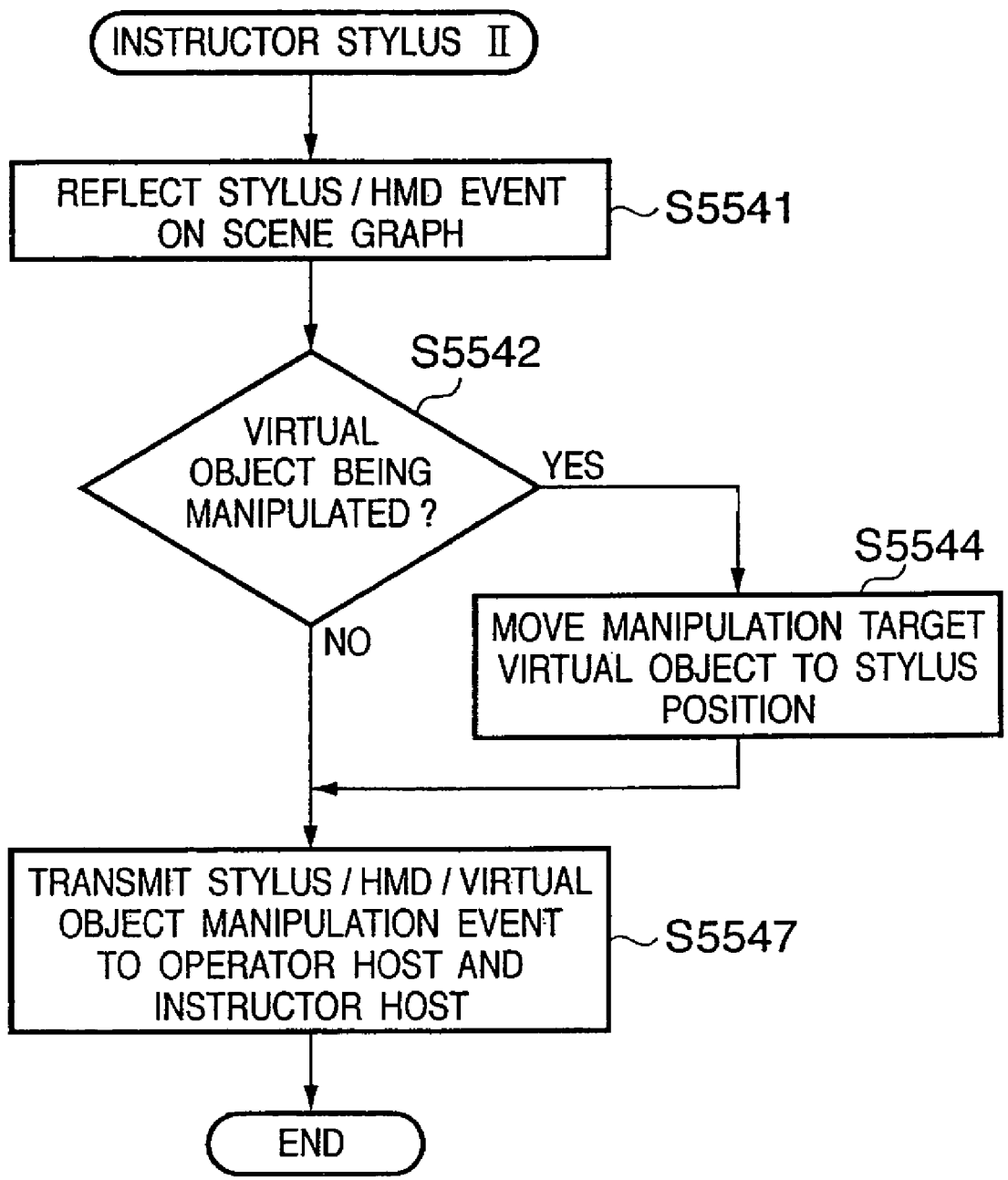
Figure 22C:
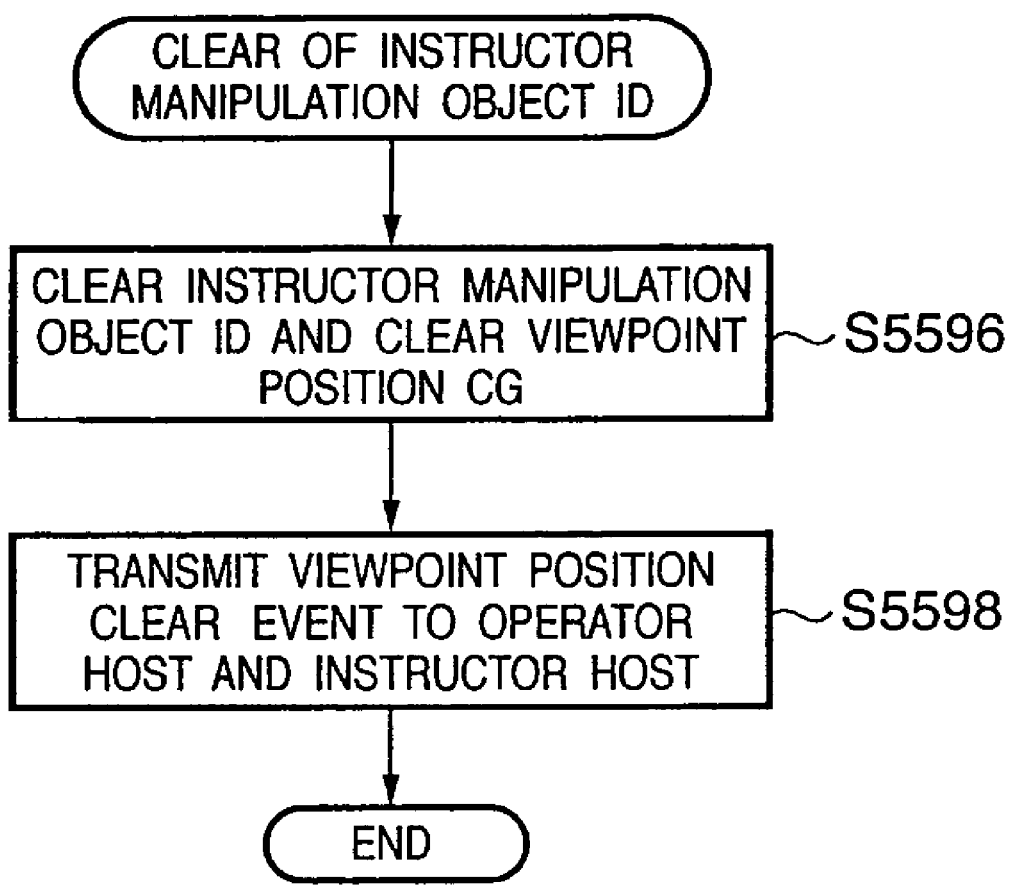

FIG. 22A shows, of the instructor processing flow in the instructor mixed reality apparatus, processing in the shared virtual mode shown in FIG. 17B. FIG. 22A is different from FIG. 17B in step S5332 in which the 3D position/orientation of the HMD is acquired from a position/orientation measuring unit 511b. In step S5335, an event of the stylus position/orientation obtained in step S5332 and the HMD position/orientation obtained in step S5335 is transmitted to a management server 560. In steps 5336, HMD information is received in addition to the pointer information so that CGs indicating the viewpoints shown in FIGS. 21A and 21B can be displayed. In addition, in step S5190 of the operator processing flow in the operator mixed reality apparatus shown in FIG. 16, HMD information is received in addition to the pointer and virtual object information so that CGs indicating the viewpoints can be displayed. Of processing in the management server 560, the instructor stylus processing II shown in FIG. 19D is changed as shown in FIG. 22B. In step S5541, processing of acquiring the 3D position/orientation of the HMD of the instructor is necessary in addition to processing in step S5540 in FIG. 19D. In step S5547, information of the HMD of the instructor is also transmitted in addition to step S5546 in FIG. 19D. The instructor manipulation object ID clear processing in FIG. 19G is changed as shown in FIG. 22C. In step S5596, the contents of the instructor manipulation object ID in the instructor/operator manipulation object ID table stored in a virtual object management unit 562 are replaced with null, and CGs representing the instructor and operator viewpoints are deleted from the scene graph. In step S5598, the instructor/operator viewpoint CG clear event is transmitted to the operator mixed reality apparatus and instructor mixed reality apparatus, and the processing is ended.

In this embodiment, a CG representing a face is used as the image representing the viewpoint. Instead, an arrow indicating the viewpoint or the photograph of the operator or instructor can also be used. The object of the present invention can be achieved if the viewpoint position is visually recognized.

Other Embodiment

The object of the present invention is achieved even by supplying a recording medium (or storage medium) which records software program codes for implementing the functions of the above-described embodiments to a system or apparatus and causing the computer (or CPU or MPU) of the system or apparatus to read out and execute the program codes stored in the recording medium. In this case, the program codes read out from the recording medium implement the functions of the above-described embodiments by themselves, and the recording medium which records the program codes constitutes the present invention.

The functions of the above-described embodiments are implemented not only when the readout program codes are executed by the computer but also when the operating system (OS) running on the computer performs part or all of actual processing on the basis of the instructions of the program codes.

The functions of the above-described embodiments are also implemented when the program codes read out from the recording medium are written in the memory of a function expansion card inserted into the computer or a function expansion unit connected to the computer, and the CPU of the function expansion card or function expansion unit performs part or all of actual processing on the basis of the instructions of the program codes.

When the present invention is applied to the recording medium, program codes corresponding to the above-described flowcharts are stored in the recording medium.

As many apparently widely different embodiments of the present invention can be made without departing from the spirit and scope thereof, it is to be understood that the invention is not limited to the specific embodiments thereof except as defined in the appended claims.

This application claims the benefit of Japanese Application No. 2005-023935, filed on Jan. 31, 2005, 2005-112109, filed on Apr. 8, 2005, which are hereby incorporated by reference herein in their entirety.

What is claimed is:

1. A system comprising:
a first position/orientation acquisition unit configured to acquire a first position/orientation of a first viewpoint of a first observer in a world coordinate system;
a first manipulation unit used by the first observer to manipulate a virtual object;
a second manipulation unit used by a second observer to manipulate the virtual object;
a first manipulation position acquisition unit configured to acquire a first position of said first manipulation unit in the world coordinate system;
a second manipulation position acquisition unit configured to acquire a second position of said second manipulation unit, wherein the second position is a relative position of said second manipulation unit from a second viewpoint position of the second observer;
an image generation unit configured (i) to transform the acquired second position of said second manipulation unit into a world coordinate position of said second manipulation unit using the first position/orientation of the first viewpoint of the first observer, so that a positional relationship between the world coordinate position of the second manipulation unit and the first viewpoint is equal to that between the acquired second position of the second manipulation unit and the second viewpoint position and (ii) to generate a virtual object image of the virtual object viewed from the first viewpoint based on the first position/orientation and object information managed by a management unit, and to generate a virtual pointer image of said second manipulation unit to be viewed from the first viewpoint based on the first position/orientation and the world coordinate position of said second manipulation unit;
said management unit configured to manage object information of the virtual object on the basis of the first position, the world coordinate position of said second manipulation unit, and operation contents of said first and second manipulation units;
an image acquisition unit configured to acquire an image of a physical space viewed from the first viewpoint;
an image compositing unit configured (i) to combine the virtual object image, the virtual pointer image, and the image of the physical space into a combined image and (ii) to output the combined image to a first head mounted display worn by the first observer and a second head mounted display worn by the second observer,
wherein manipulation results by said first manipulation unit and said second manipulation unit are reflected in the image of the virtual object.

2. The system according to claim 1, wherein each of said first manipulation unit and said second manipulation unit is a stylus.

3. The system according to claim 1, wherein said image acquisition unit acquires a right image of the physical space and a left image of the physical space from the first viewpoint, and said image generation unit generates a right image of the virtual object, a left image of the virtual object, a right image of said second manipulation unit, and a left image of said second manipulation unit, and said image compositing unit combines the right image of the physical space, the right image of the virtual object, and the right image of said second manipulation unit, and combines the left image of the physical space, the left image of the virtual object, and the left image of said second manipulation unit.

4. An image processing apparatus comprising:

a first position/orientation acquisition unit configured to acquire a first position/orientation of a first viewpoint of a first observer in a world coordinate system;

a first manipulation position acquisition unit configured to acquire a first position of a first manipulation unit in the world coordinate system;

a second manipulation position acquisition unit configured to acquire a second position of a second manipulation unit, wherein the second position is a relative position of the second manipulation unit from a second viewpoint position of the second observer;

an image generation unit configured (i) to transform the acquired second position of said second manipulation unit into a world coordinate position of said second manipulation unit using the first position/orientation of the first viewpoint of the first observer, so that a positional relationship between the world coordinate position of said second manipulation unit and the first viewpoint is equal to that between the acquired second position of the second manipulation unit and the second viewpoint position and (ii) to generate a virtual object image of a virtual object viewed from the first viewpoint based on the first position/orientation and object information managed by a management unit, and to generate a virtual pointer image of the second manipulation unit viewed from the first viewpoint based on the first position/orientation and the world coordinate position of said second manipulation unit;

said management unit configured to manage object information of the virtual object on the basis of the first position, the world coordinate position of said second manipulation unit, and operation contents of said first and second manipulation units;

an image acquisition unit configured to acquire an image of a physical space viewed from the first viewpoint;

an image compositing unit configured (i) to combine the virtual object image, the virtual pointer image, and the image of the physical space and (ii) ; to output the combined image to a first head mounted display worn by the first observer and a second head mounted display worn by the second observer who remote-controls manipulation of the virtual object by the first observer;

wherein manipulation results by the first manipulation unit used by the first observer to manipulate the virtual object and the second manipulation unit used by the second observer to manipulate the virtual object are reflected in the image of the virtual object.

5. A recording storage medium encoded with a computer program to operate a system including at least a first and second manipulation unit, an image generation unit, and a first and second head-mounted display units, the program causing the system to perform a method comprising the steps of:

acquiring a first position/orientation of a first viewpoint of a first observer in a world coordinate system;

manipulating a virtual object with the first manipulation unit used by the first observer;

manipulating the virtual object with the second manipulation unit used by a second observer;

acquiring a first position of the first manipulation unit in the world coordinate system;

acquiring a second position of the second manipulation unit, wherein the second position is a relative position of the second manipulation unit from a second viewpoint position of the second observer;

transforming, in the image generation unit, the acquired second position of the second manipulation unit into a world coordinate position of the second manipulation unit using the first position/orientation of the first viewpoint of the first observer, so that a positional relationship between the world coordinate position of the second manipulation unit and the first viewpoint is equal to that between the acquired second position of the second manipulation unit and the second viewpoint position;

managing object information of the virtual object to be manipulated by the first and second manipulation units based on the first position, the world coordinate position of said second manipulation unit, and operation contents of said first and second manipulation units;

generating, in the image generation unit, a virtual object image of the virtual object viewed from the first viewpoint based on the first position/orientation and the managed object information, and generating, in the image generation unit, a virtual pointer image of the second manipulation unit viewed from the first viewpoint based on the first position/orientation and the world coordinate position of said second manipulation unit;

acquiring an image of a physical space viewed from the first viewpoint;

combining the virtual object image, the virtual pointer image, and the image of the physical space into a combined image; and outputting the combined image to the first head mounted display worn by the first observer and the second head mounted display worn by the second observer, wherein manipulation results by the first manipulation unit and the second manipulation unit are reflected in the image of the virtual object.

6. A system-implemented image-generating method, the system including at least a first and second manipulation unit, an image generation unit, and first and second head-mounted display units, the method comprising the steps of:

acquiring a first position/orientation acquisition of a first viewpoint of a first observer in a world coordinate system;

manipulating a virtual object with the first manipulation unit used by the first observer;

manipulating the virtual object with the second manipulation unit used by a second observer;

acquiring a first position of the first manipulation unit in the world coordinate system;

acquiring a second position of the second manipulation unit, wherein the second position is a relative position of the second manipulation unit from a second viewpoint position of the second observer;

transforming, in the image generation unit, the acquired second position of said second manipulation unit into a world coordinate position of said second manipulation unit using the first position/orientation of the first viewpoint of the first observer, so that a positional relationship between the world coordinate position of said second manipulation unit and the first viewpoint is equal to that between the acquired second position of said second manipulation unit and the second viewpoint position;

managing object information of the virtual object on the basis of the first position, the world coordinate position of said second manipulation unit, and operation contents of said first and second manipulation units;

generating, in the image generation unit, a virtual object image of the virtual object viewed from the first viewpoint based on the first position/orientation and the managed object information, and generating, in the image generation unit, a virtual pointer image of the second manipulation unit viewed from the first viewpoint based on the first position/orientation and the world coordinate position of said second manipulation unit;

acquiring an image of a physical space viewed from the first viewpoint;

combining the virtual object image, the virtual pointer image and the image of the physical space into a combined image; and outputting the combined image to the first head mounted display worn by the first observer and the second head mounted display worn by the second observer, wherein manipulation results by the first manipulation unit and the second manipulation unit are reflected in the image of the virtual object.

* * * * *